United States Patent [19]
Ohtake

[11] Patent Number: 6,108,137
[45] Date of Patent: Aug. 22, 2000

[54] ZOOM LENS SYSTEM

[75] Inventor: Motoyuki Ohtake, Kawasaki, Japan

[73] Assignee: Nikon Corporation, Tokyo, Japan

[21] Appl. No.: 09/063,169

[22] Filed: Apr. 20, 1998

[30] Foreign Application Priority Data

| Apr. 18, 1997 | [JP] | Japan | 9-115086 |
| Apr. 23, 1997 | [JP] | Japan | 9-106316 |
| May 7, 1997 | [JP] | Japan | 9-131606 |

[51] Int. Cl.[7] .................................................. G02B 15/14
[52] U.S. Cl. ............................................. 359/695; 359/676
[58] Field of Search .................................. 359/695–698, 359/705, 676, 689

[56] References Cited

U.S. PATENT DOCUMENTS

| 4,054,371 | 10/1977 | Yasukuni | 39/705 |
| 4,226,520 | 10/1980 | Uesugi | 359/701 |
| 5,034,762 | 7/1991 | Kohmoto | 359/195.12 |
| 5,495,309 | 2/1996 | Shiina et al. | 359/694 |
| 5,973,855 | 10/1999 | Shibayama | 359/691 |

*Primary Examiner*—Ricky Mack
*Attorney, Agent, or Firm*—Vorys, Sater, Seymour and Pease LLP

[57] ABSTRACT

A zoom lens, especially, suitable for a stepped-zoom zoom lens system, which includes a zoom lens and a zoom lens barrel. The zoom lens barrel houses a zoom lens possessing a plurality of movable lens groups. The lens barrel includes a guide assembly to guide the movable lens groups along an optical axis to prescribed positional states. The zoom lens system is such that the total zoom lens length is not excessively long even during short-distance focusing. Also, during short-distance focusing, the lens barrel is configured such that the most imagewise negative lens group moves objectwise in the extreme wide-angle positional state and imagewise in the extreme telephoto positional state. Also, when the zoom lens is in the extreme telephoto positional state, short-distance focusing is accomplished by causing one or more of the multiple groups of the zoom lens to move imagewise. The zoom lenses of the zoom lens system preferably satisfy at least one of a number of design conditions.

17 Claims, 66 Drawing Sheets

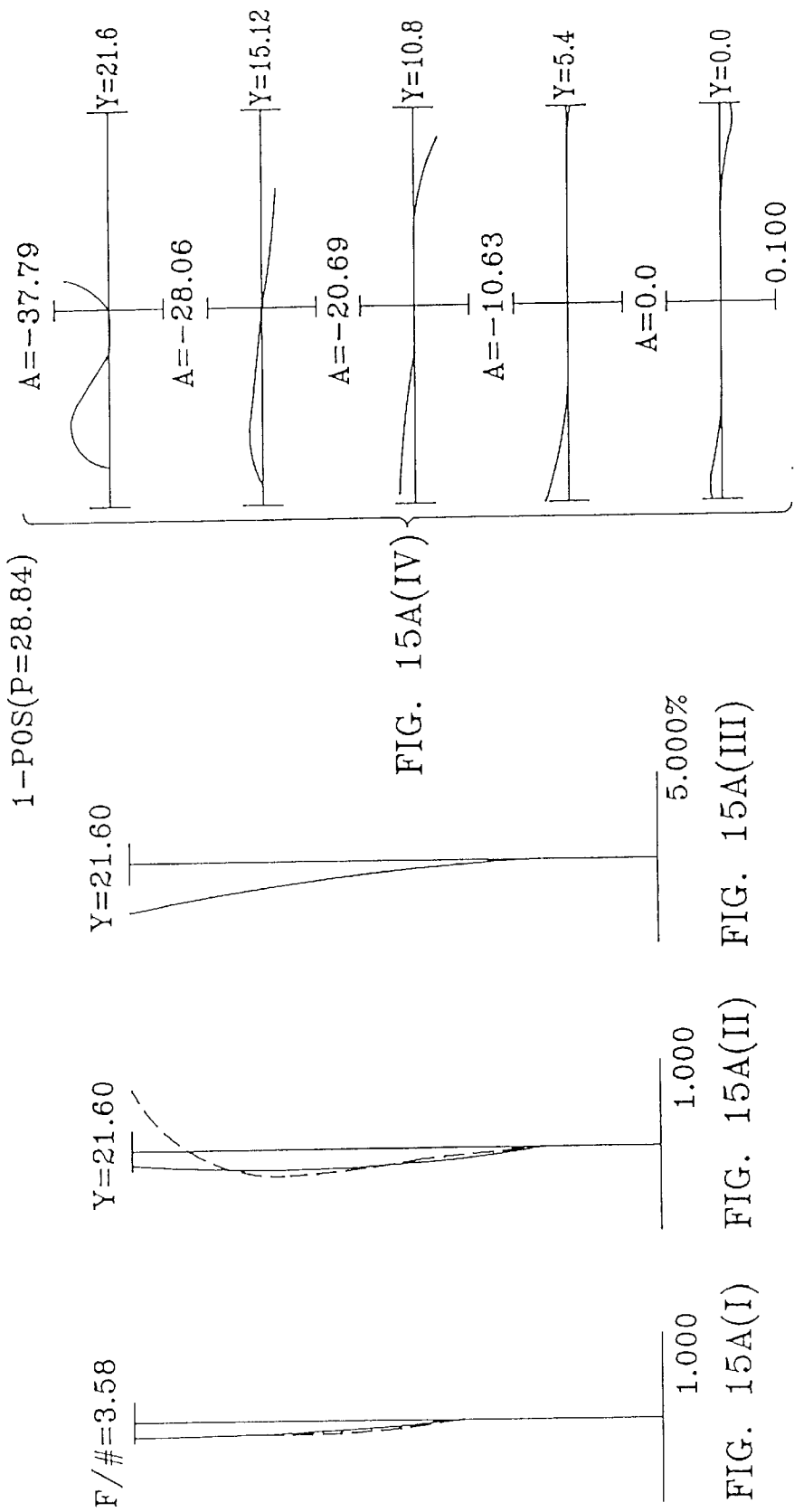

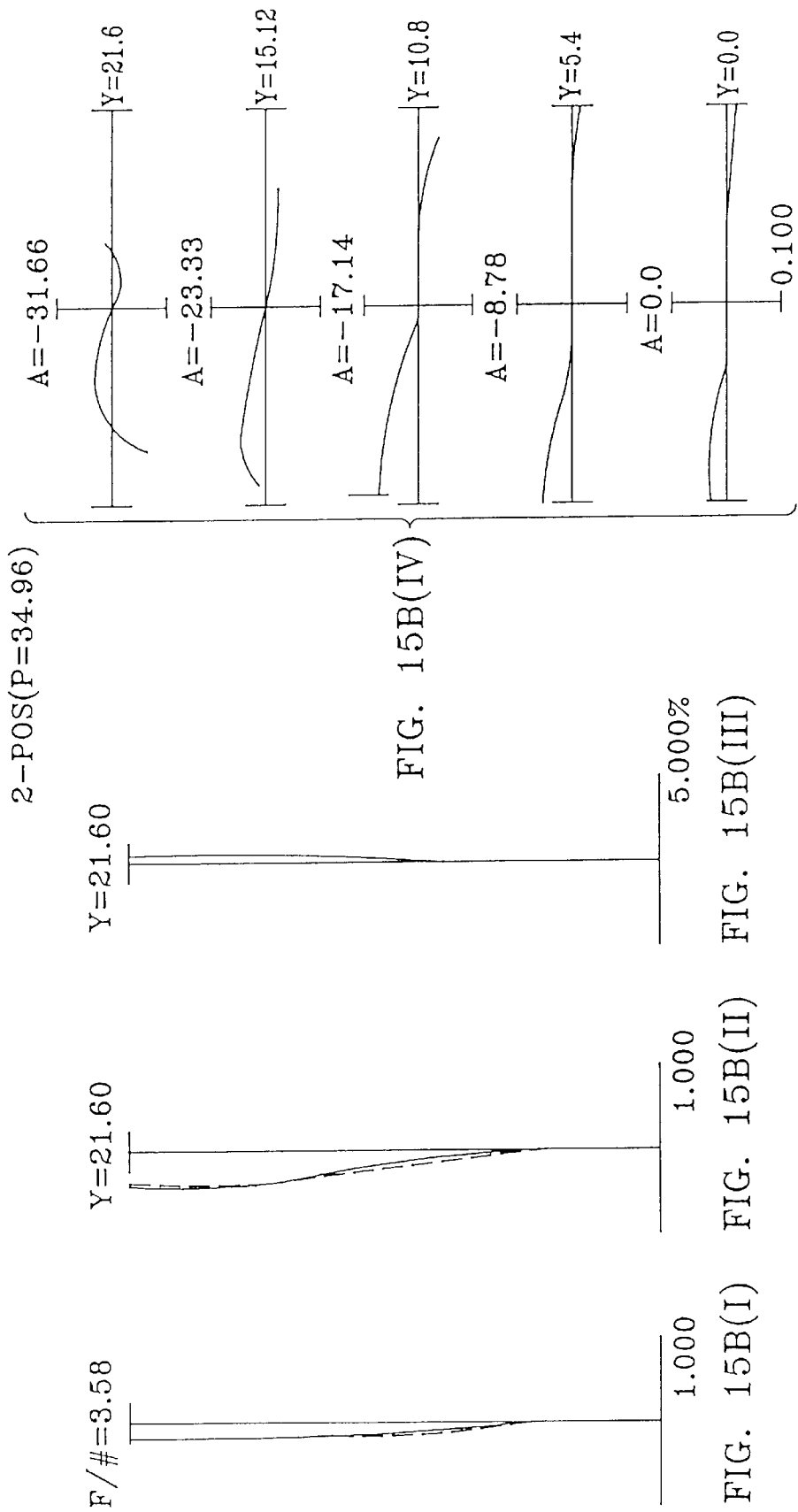

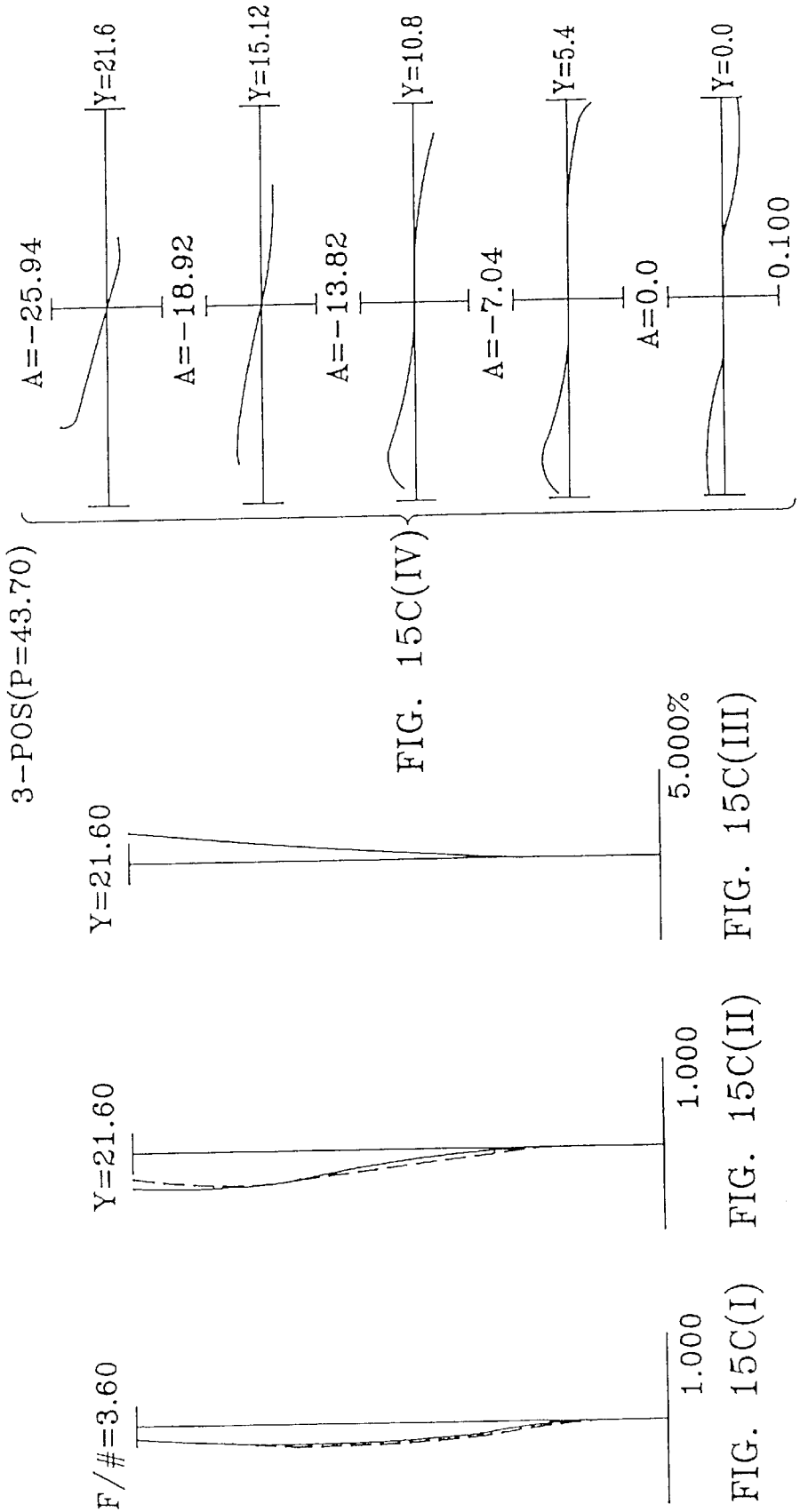

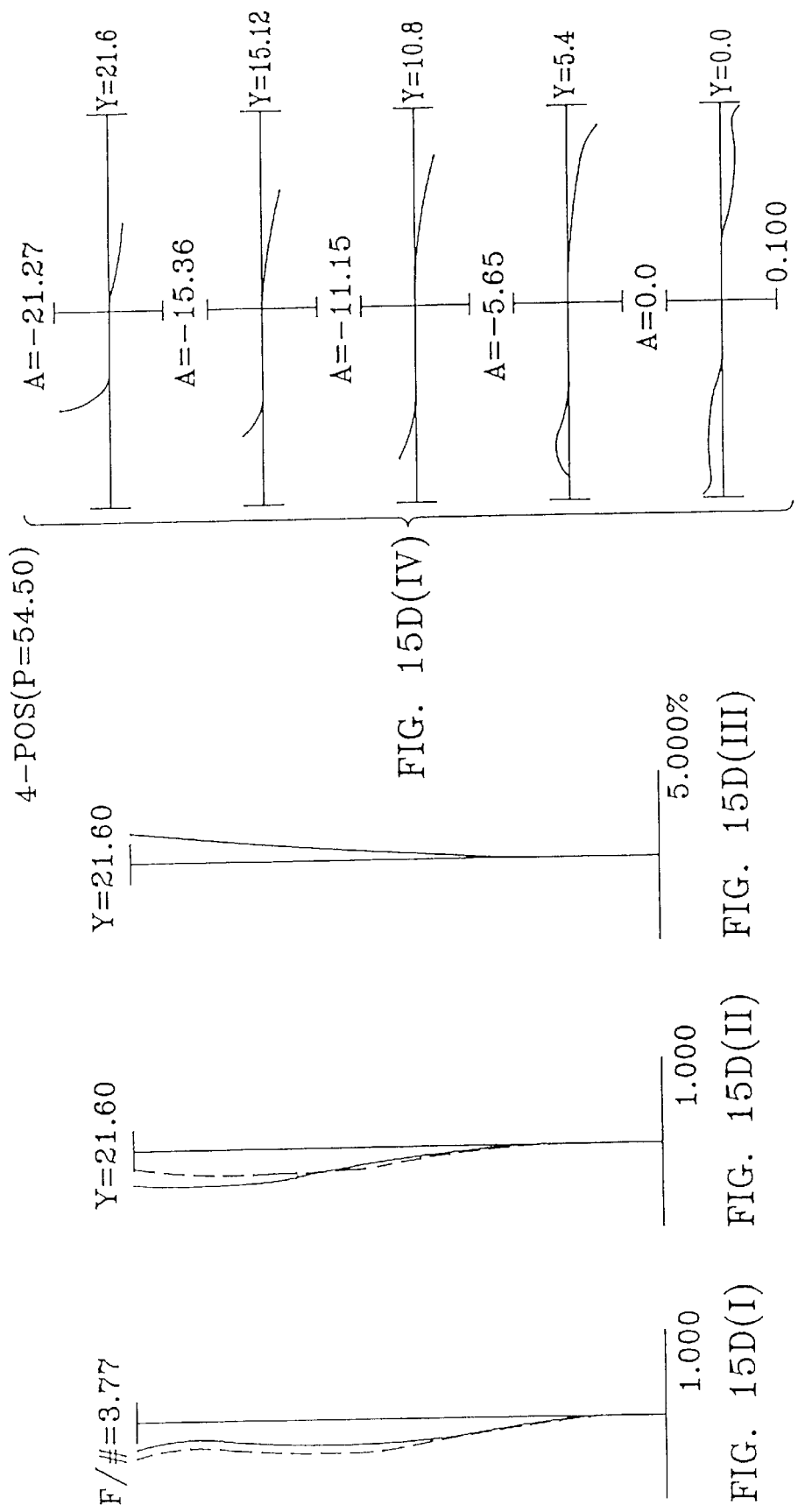

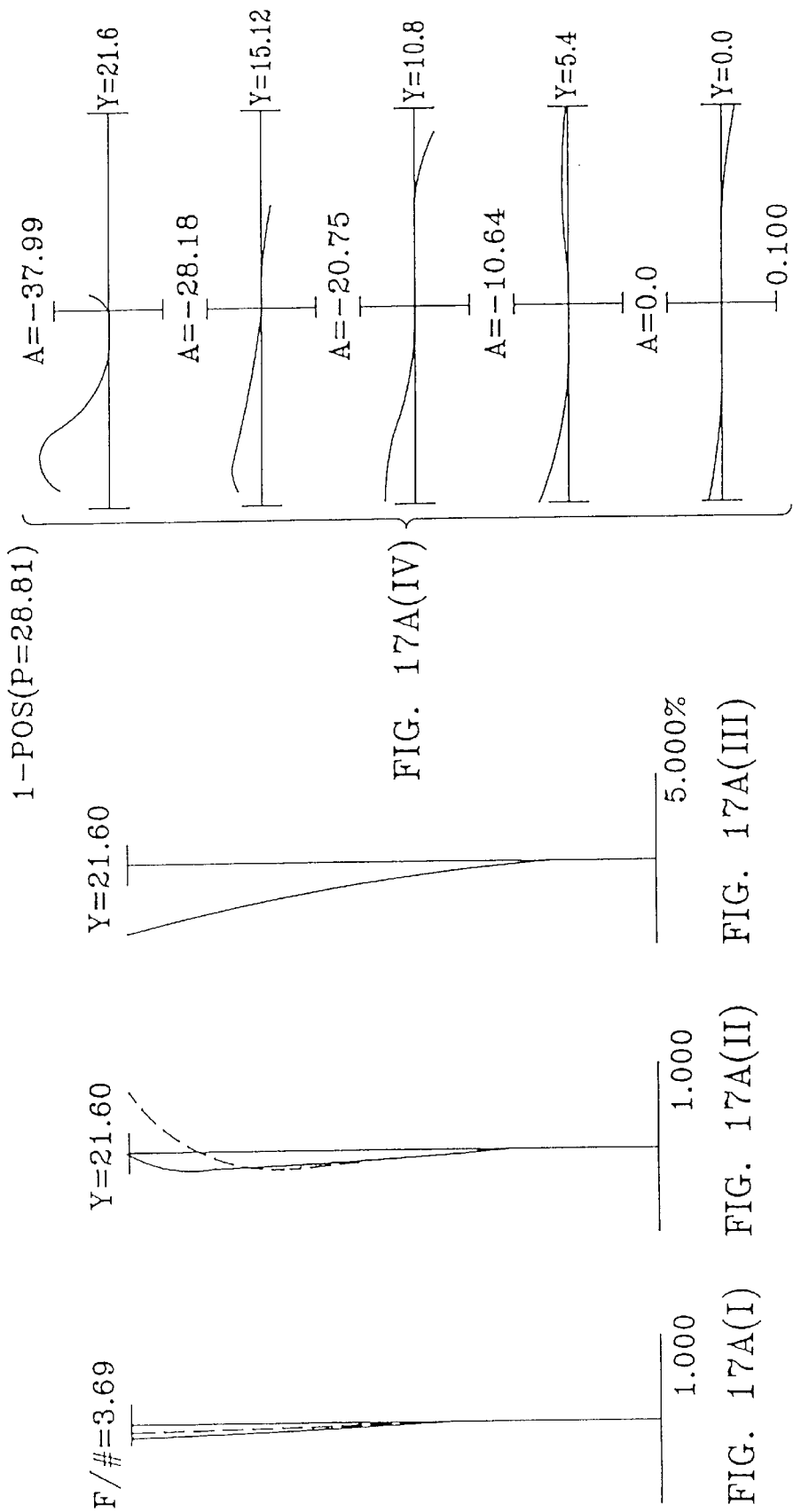

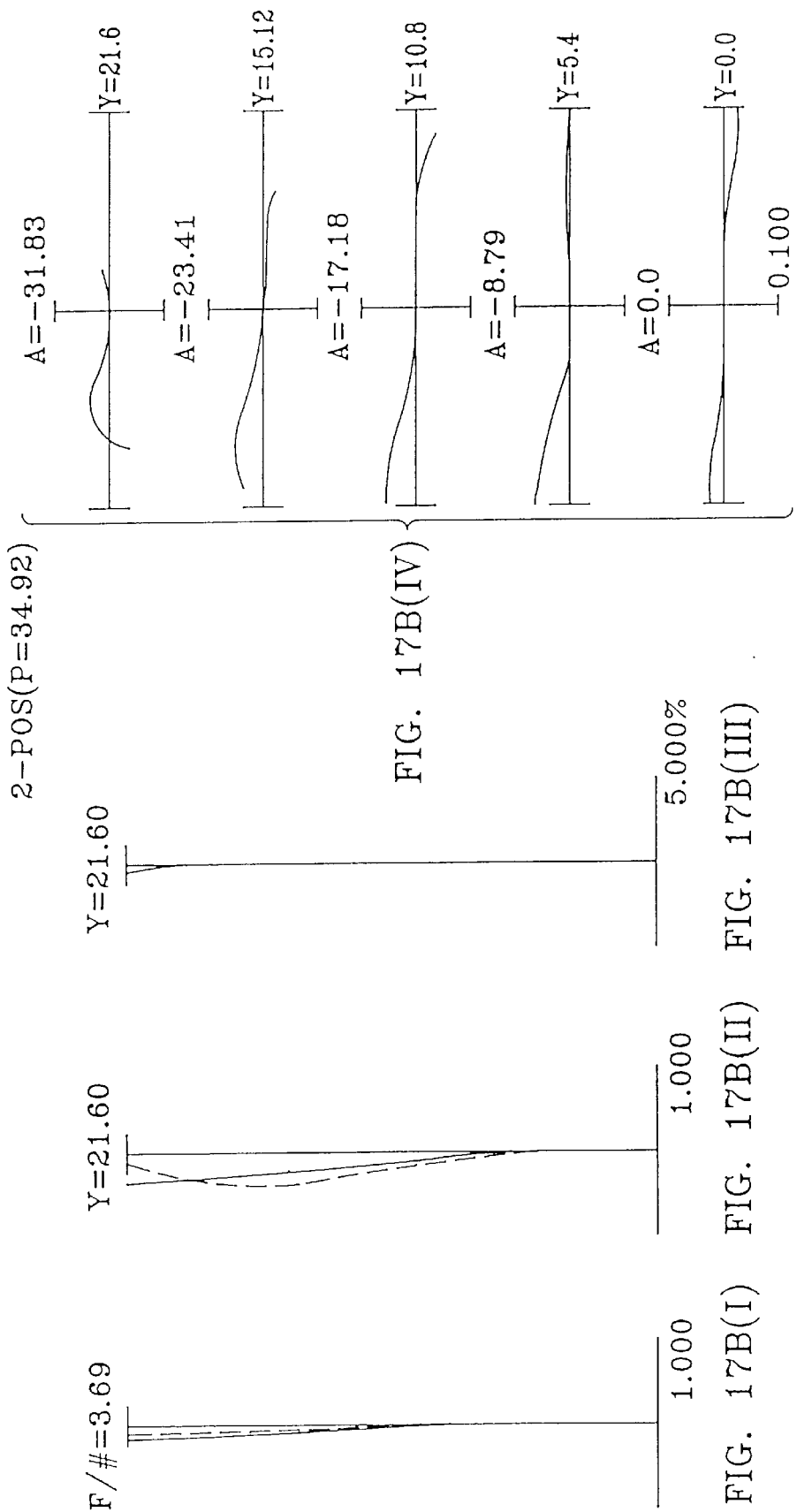

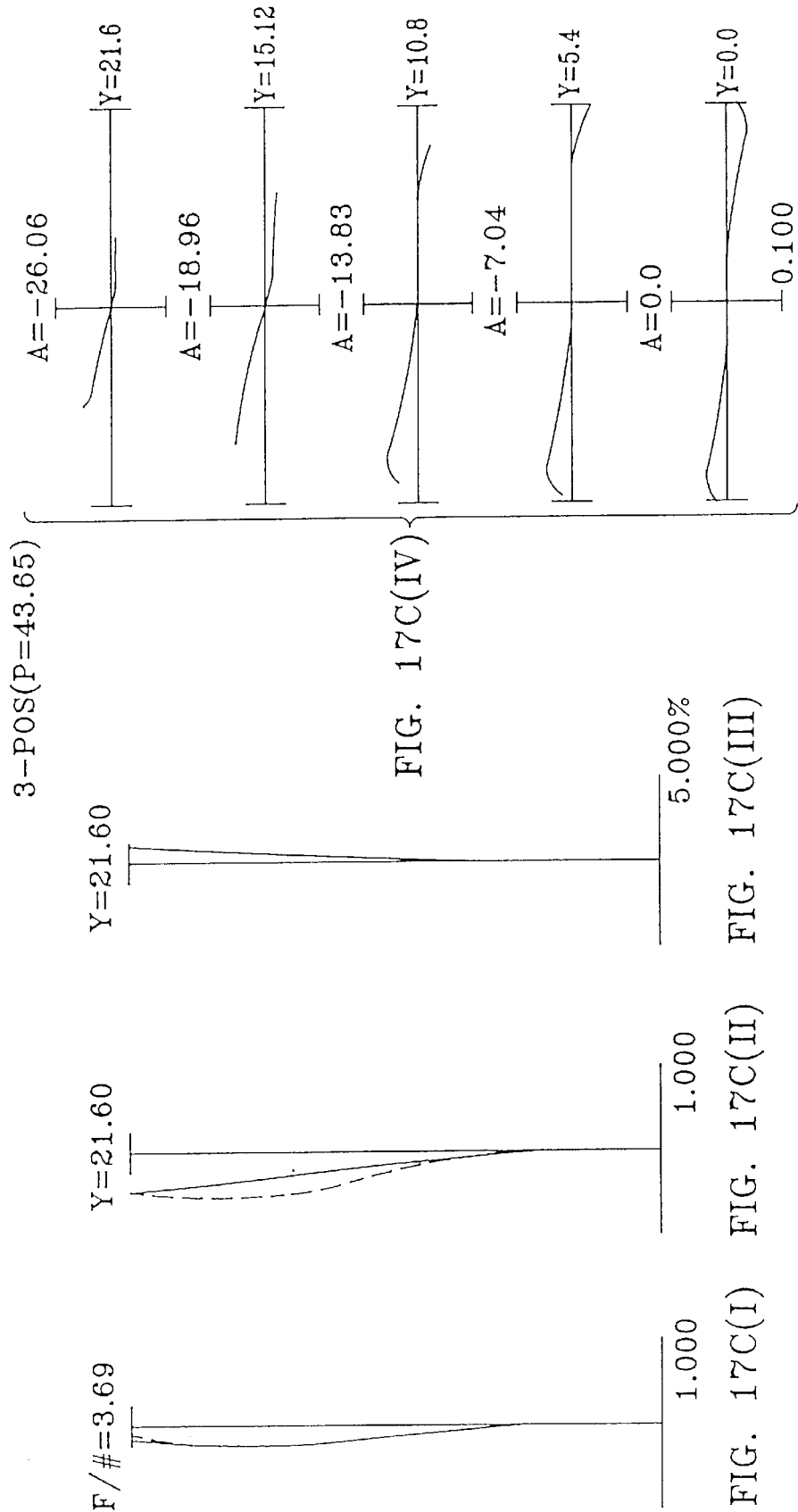

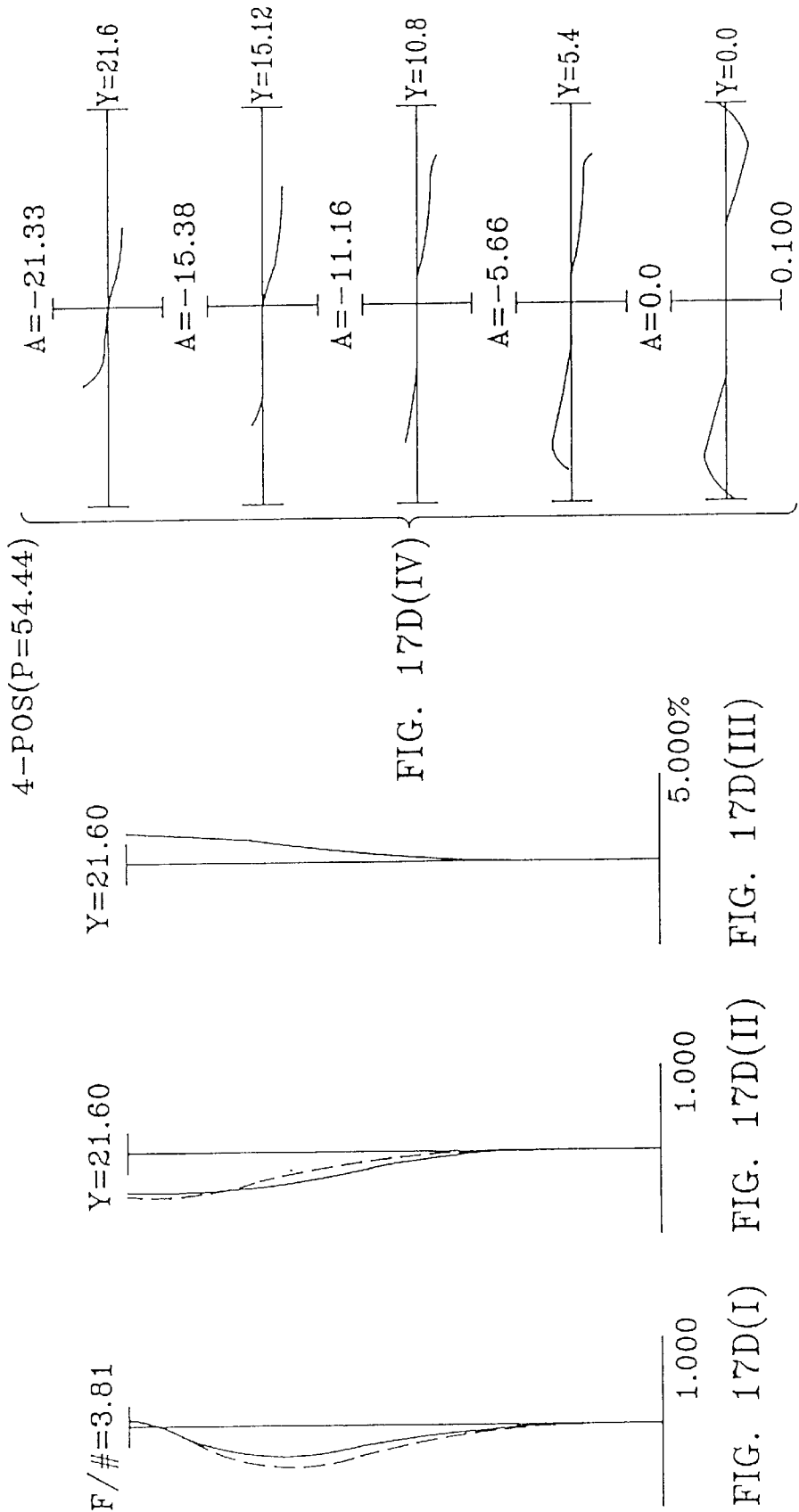

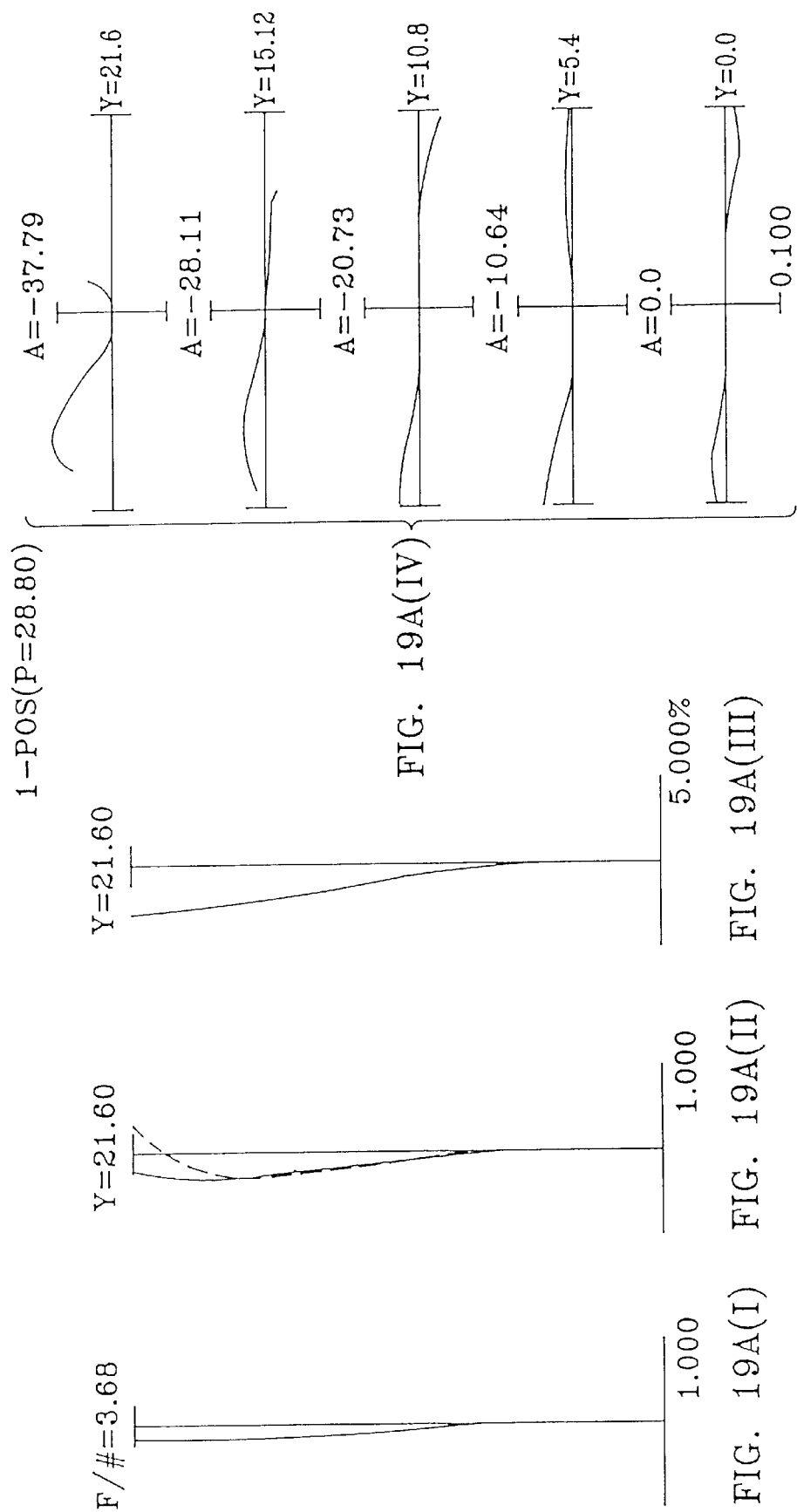

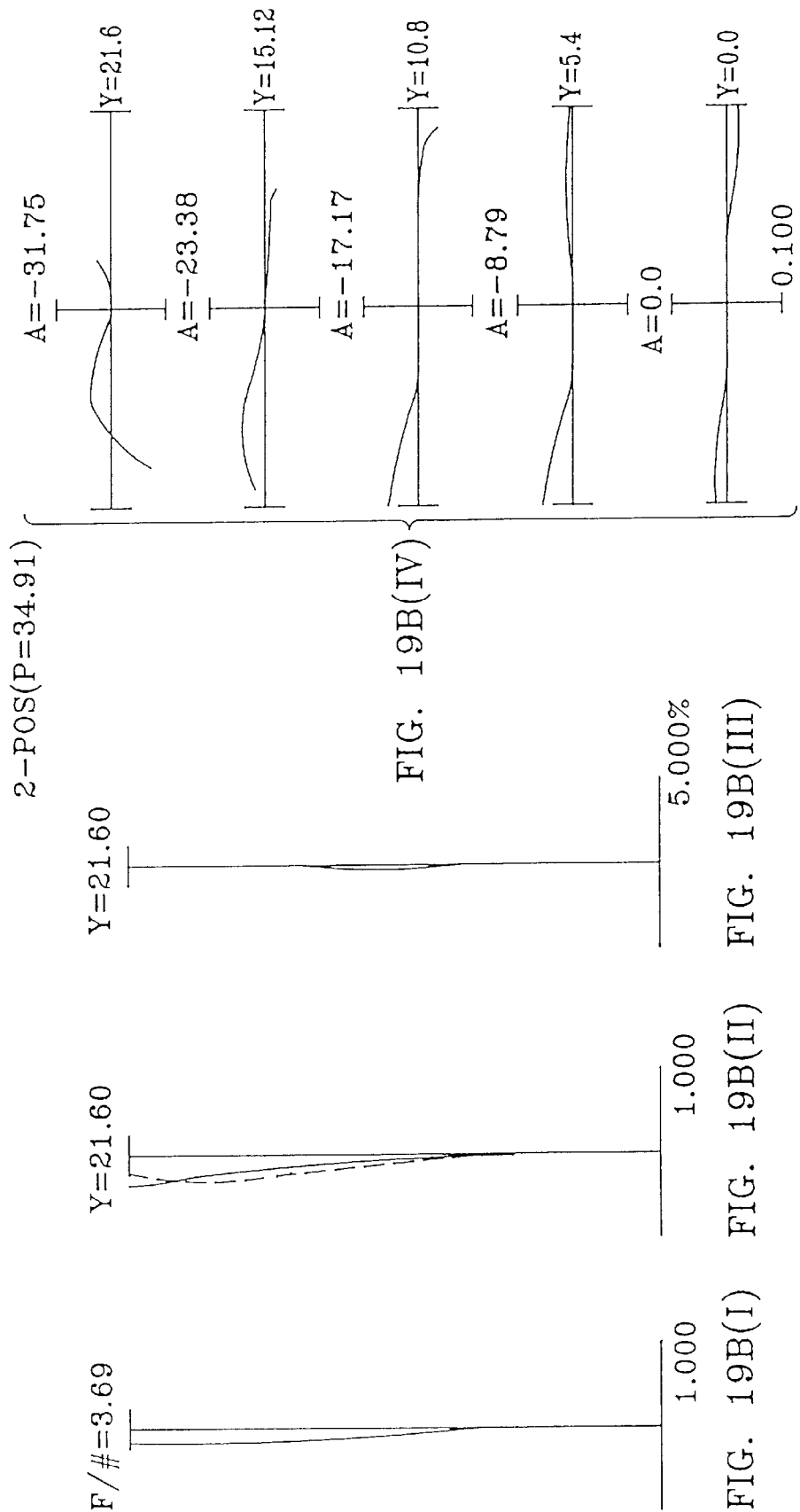

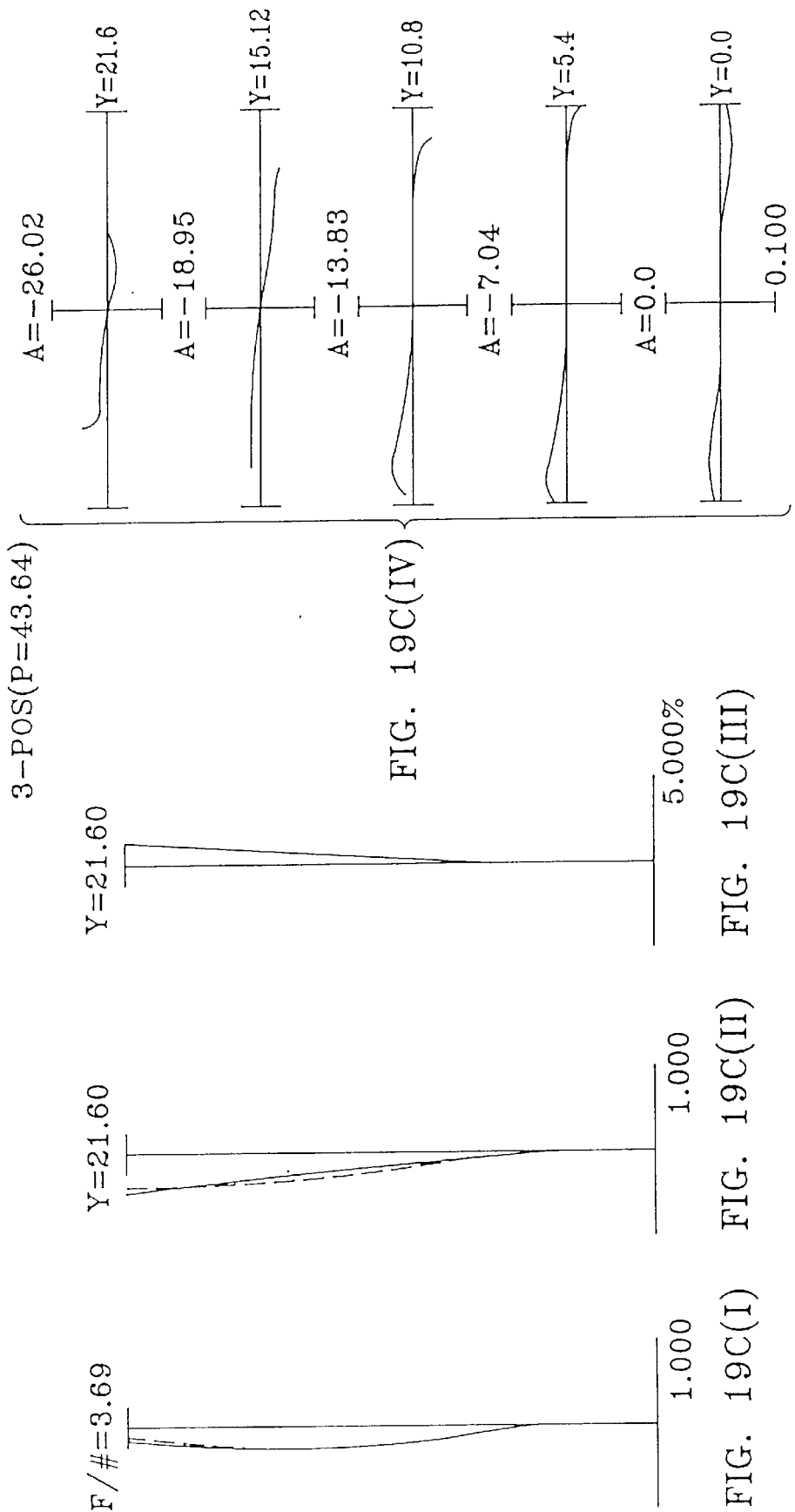

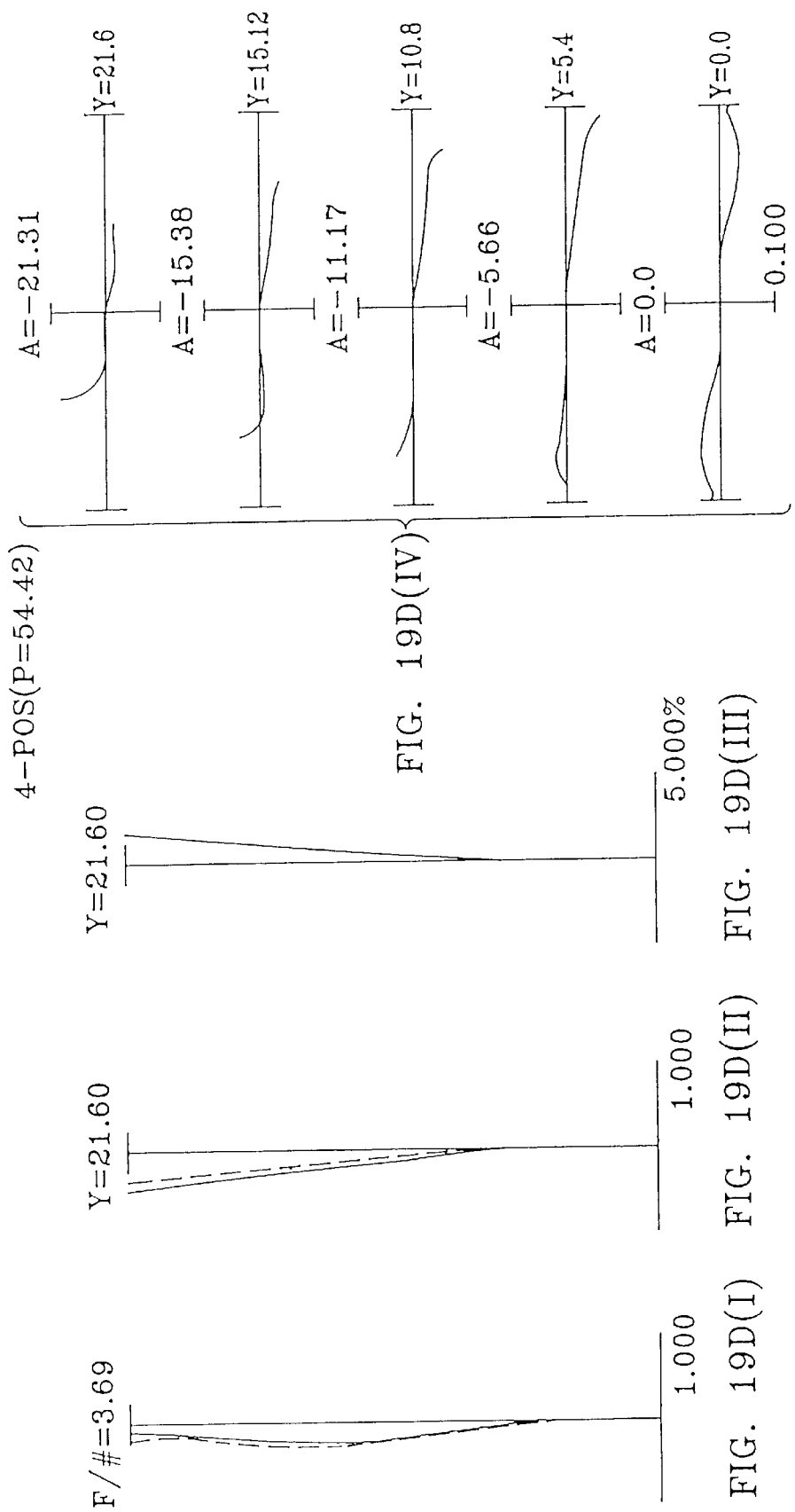
FIG. 19D(I)  FIG. 19D(II)  FIG. 19D(III)  FIG. 19D(IV)

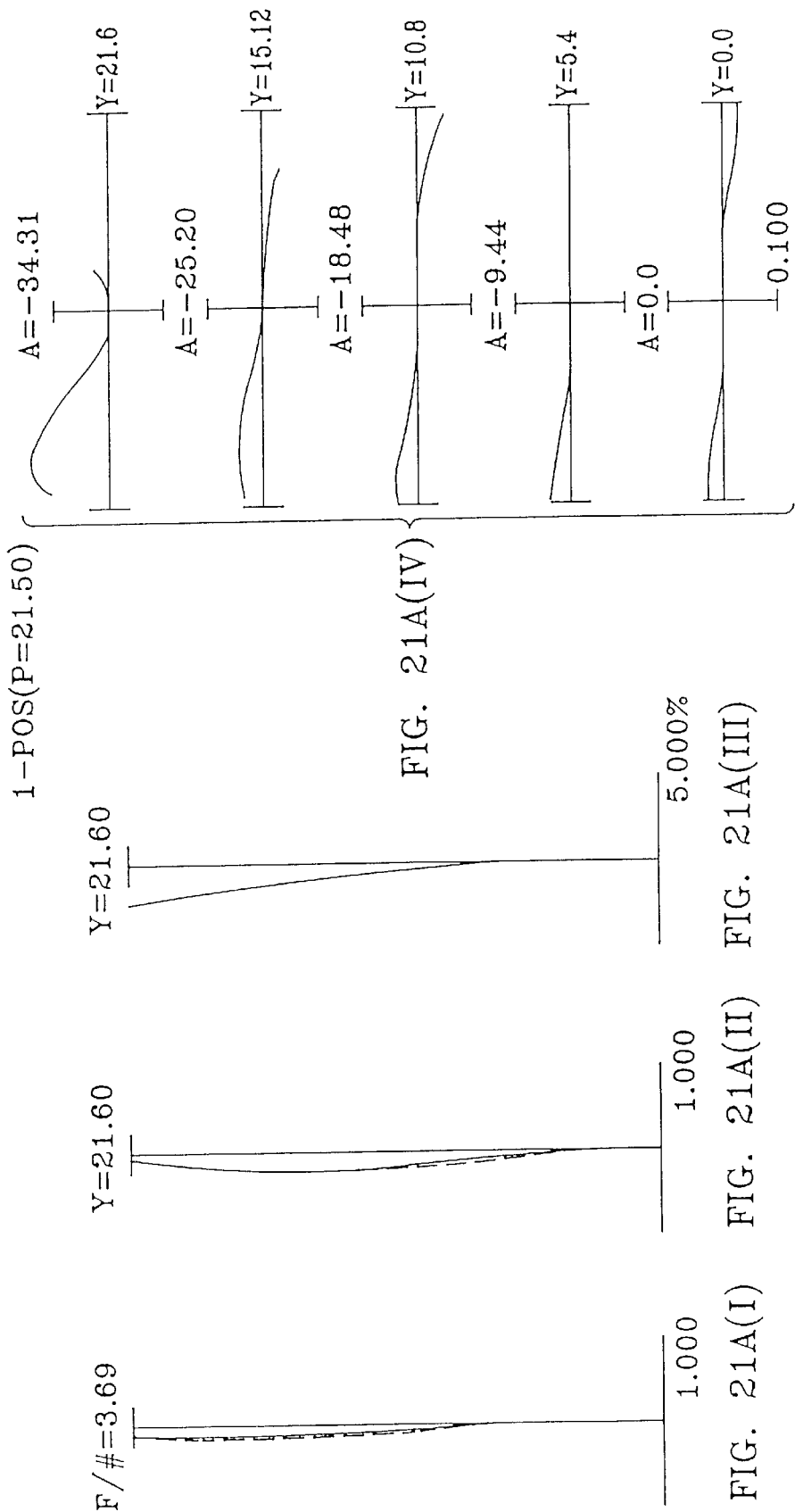

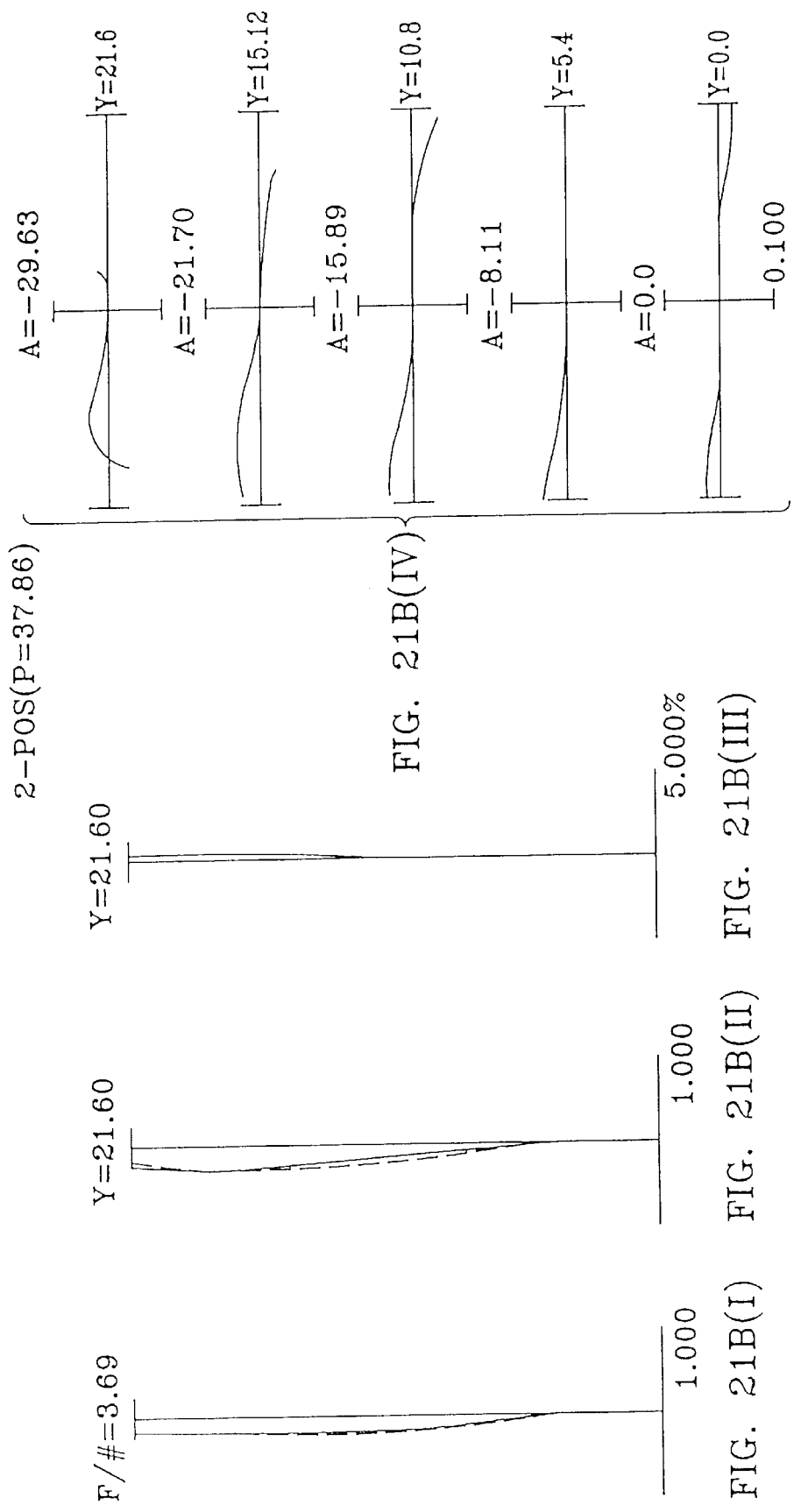

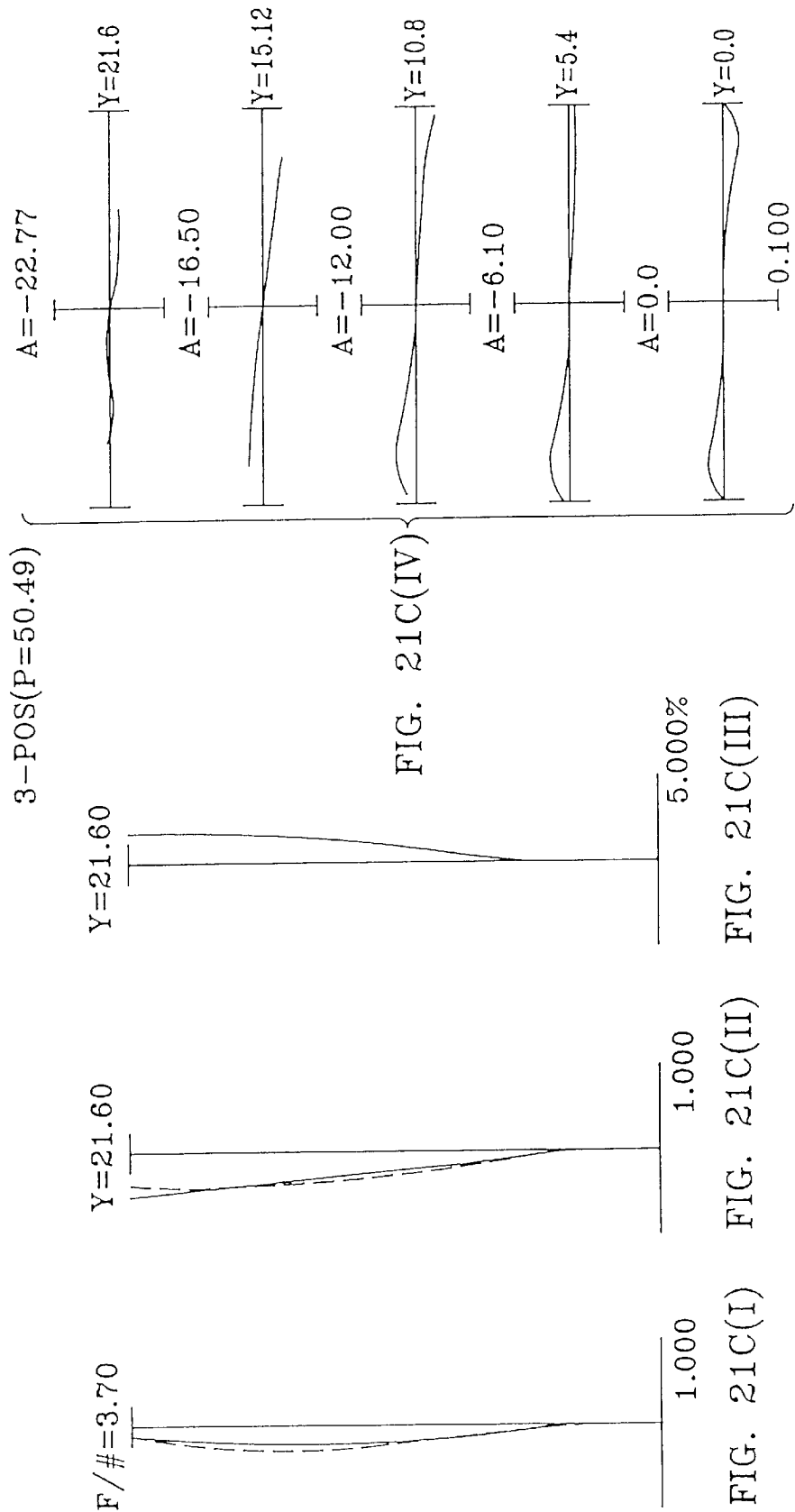

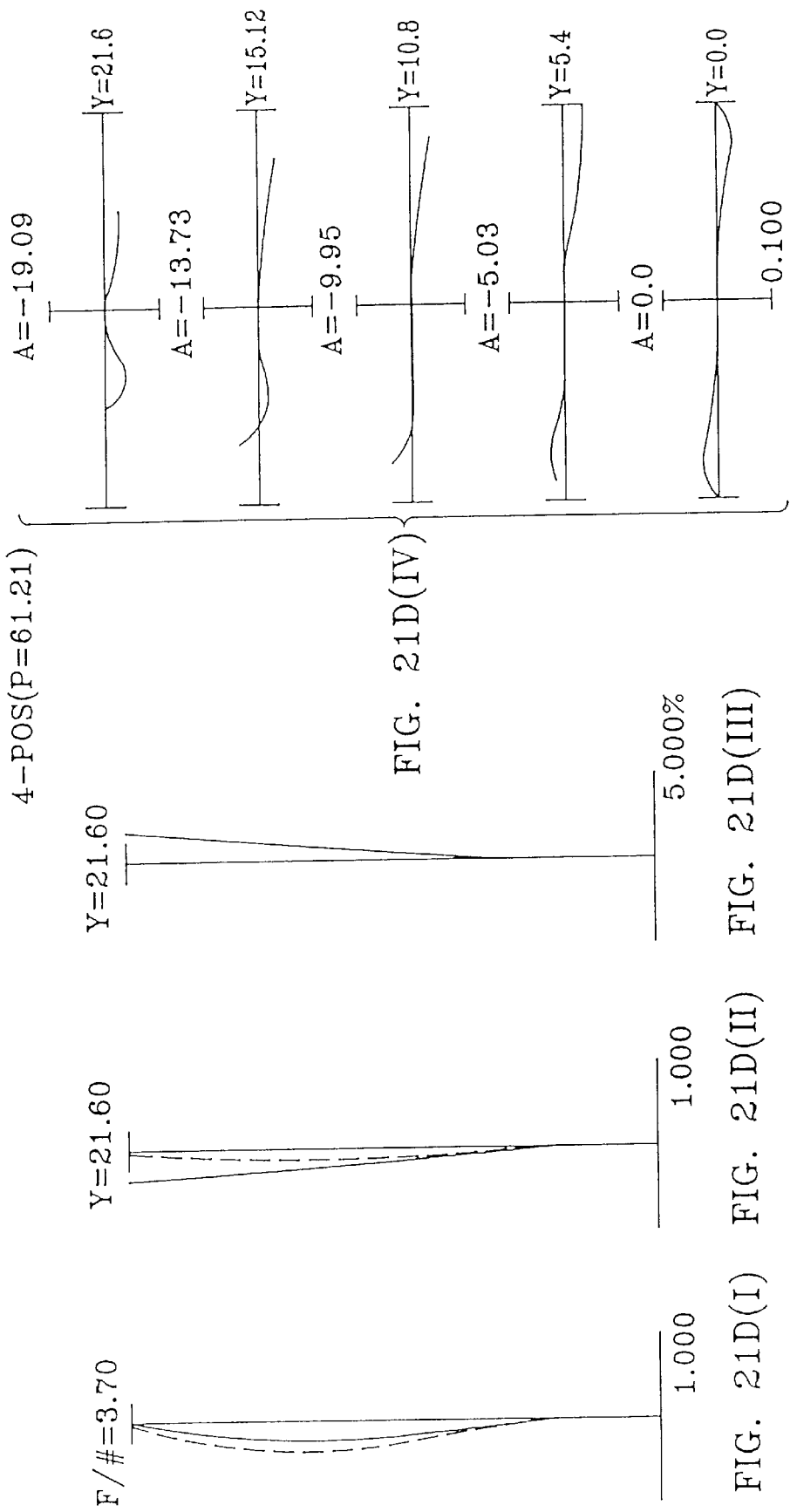
FIG. 21D(I)  FIG. 21D(II)  FIG. 21D(III)  FIG. 21D(IV)

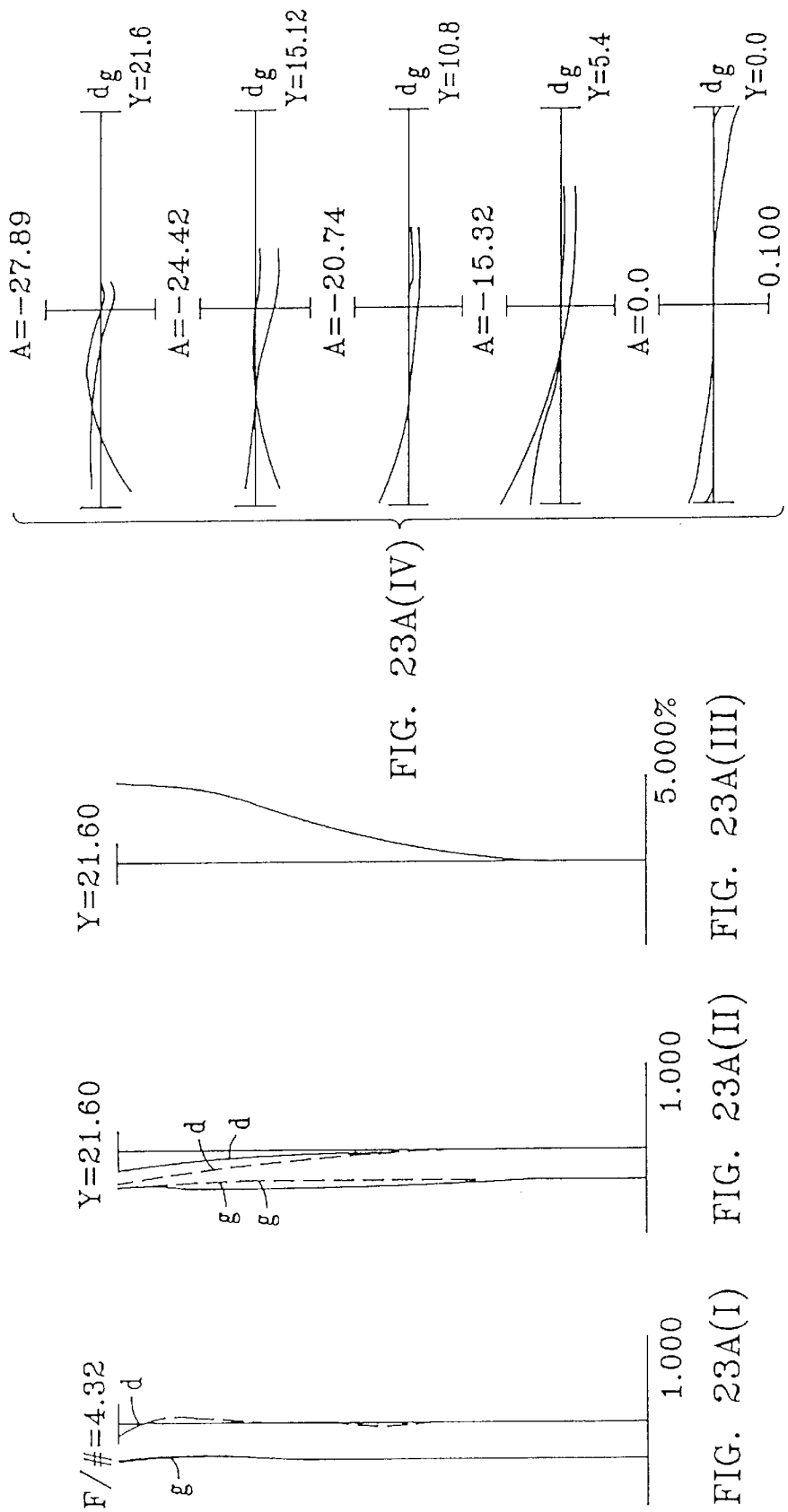

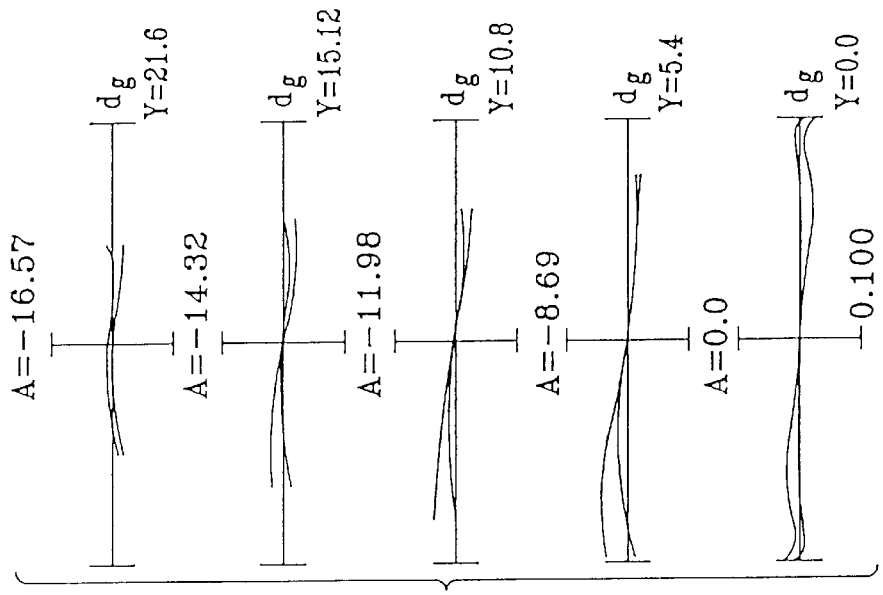
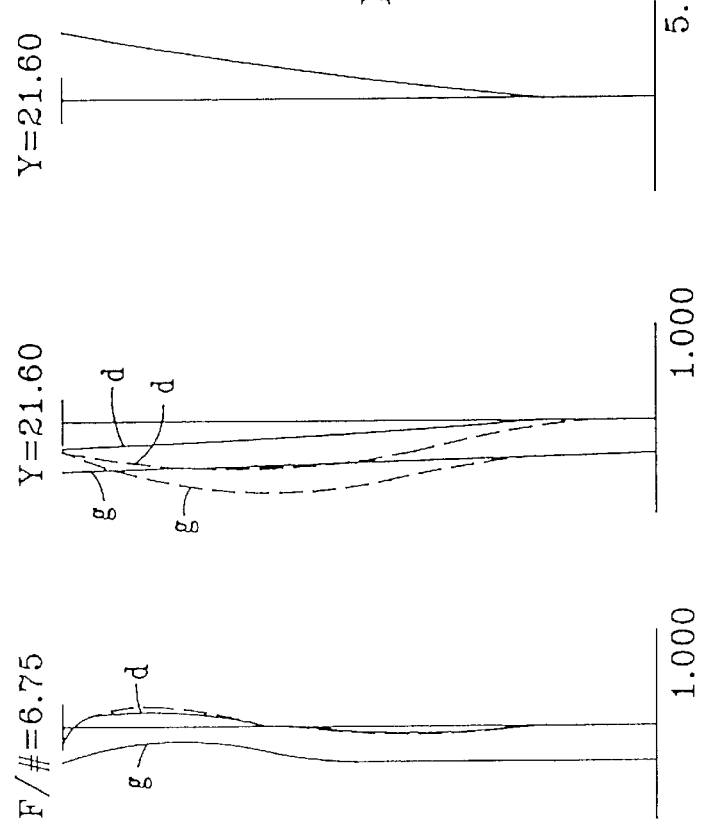
FIG. 23B(I)  FIG. 23B(II)  FIG. 23B(III)  FIG. 23B(IV)

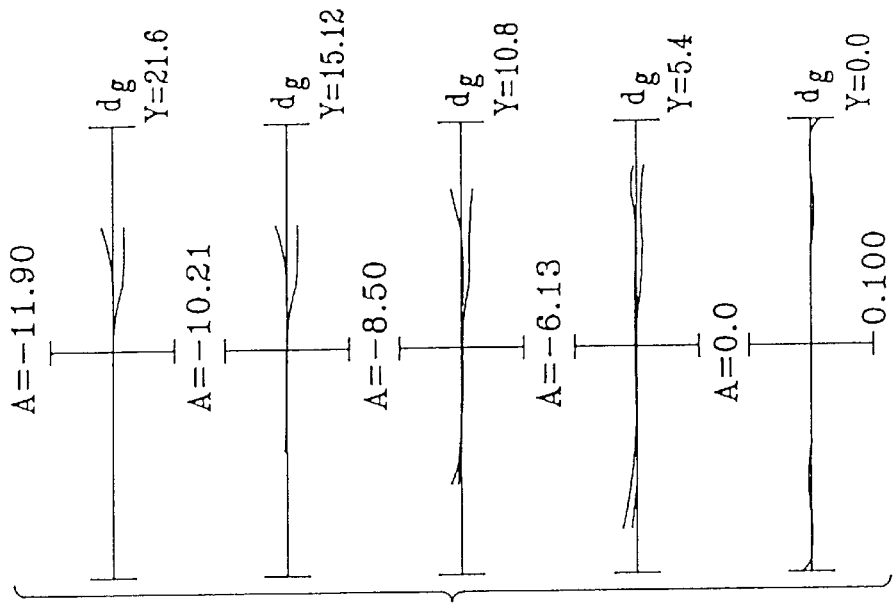
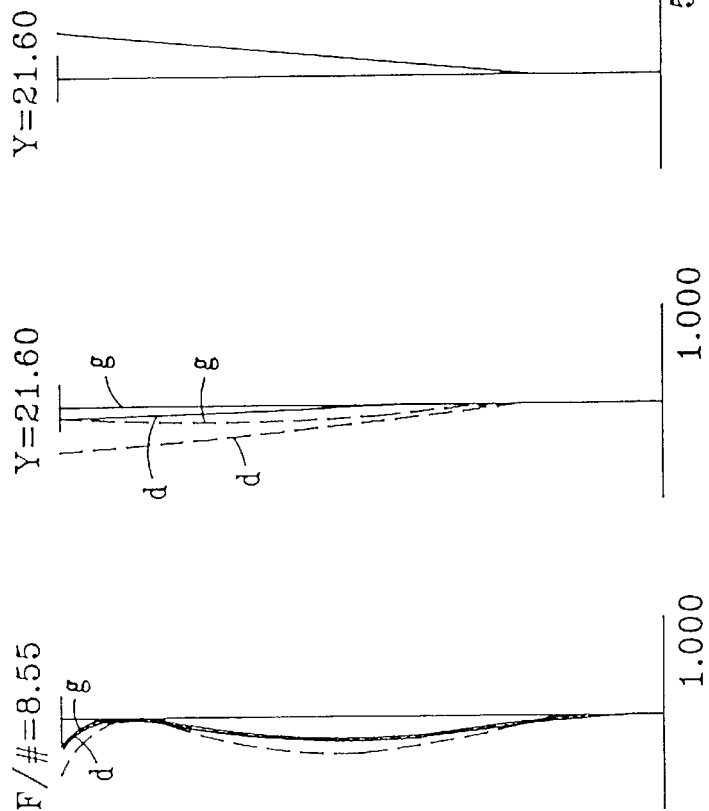
FIG. 23C(I)  FIG. 23C(II)  FIG. 23C(III)  FIG. 23C(IV)

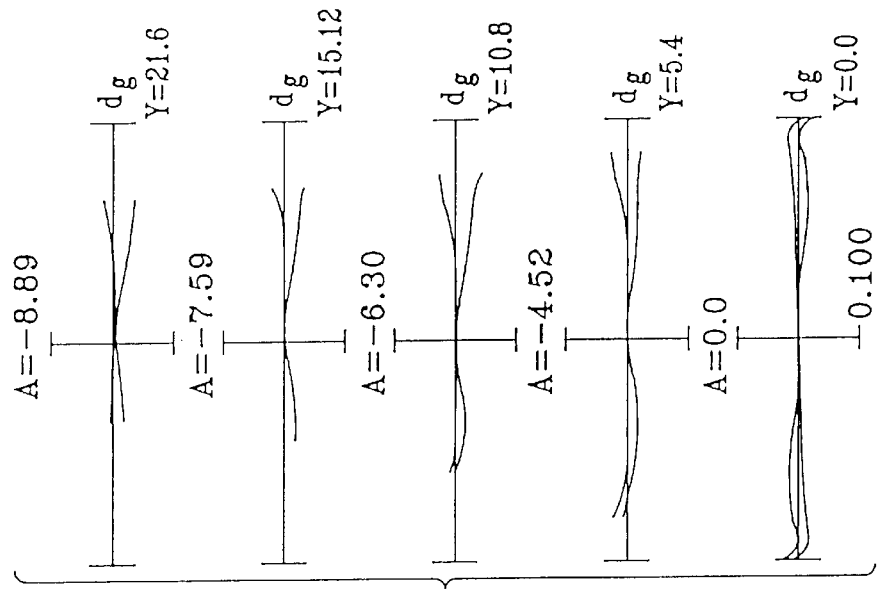
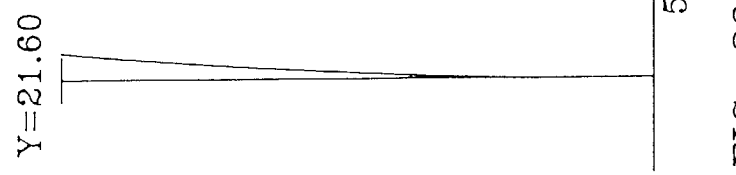
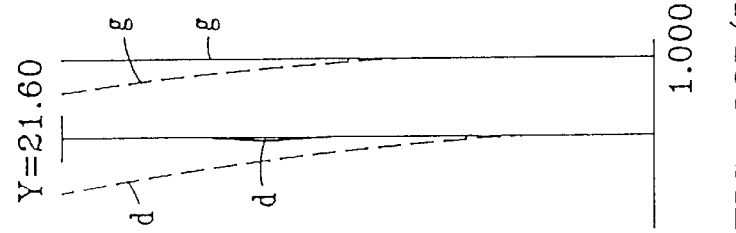
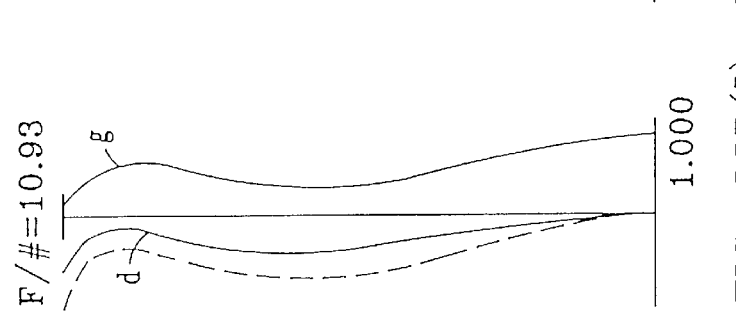
FIG. 23D(I)   FIG. 23D(II)   FIG. 23D(III)   FIG. 23D(IV)

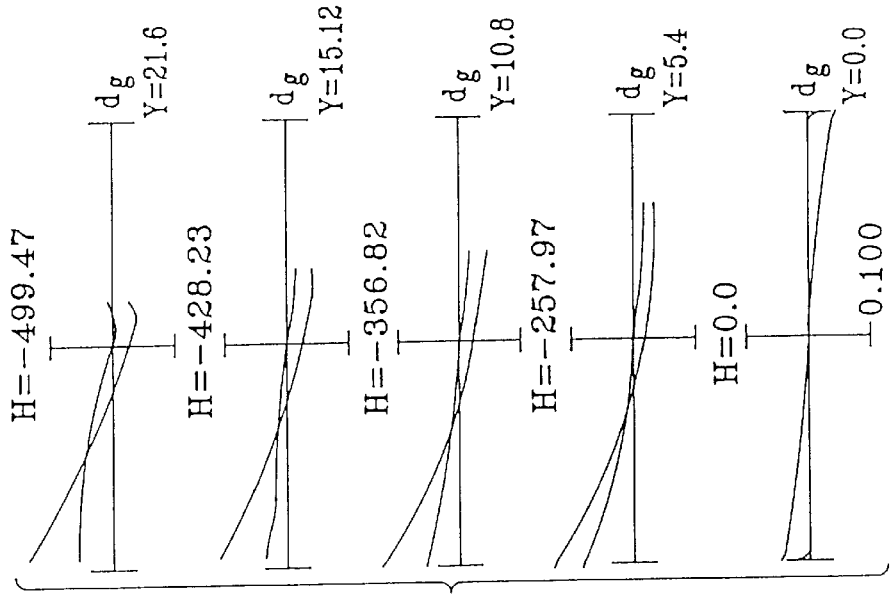
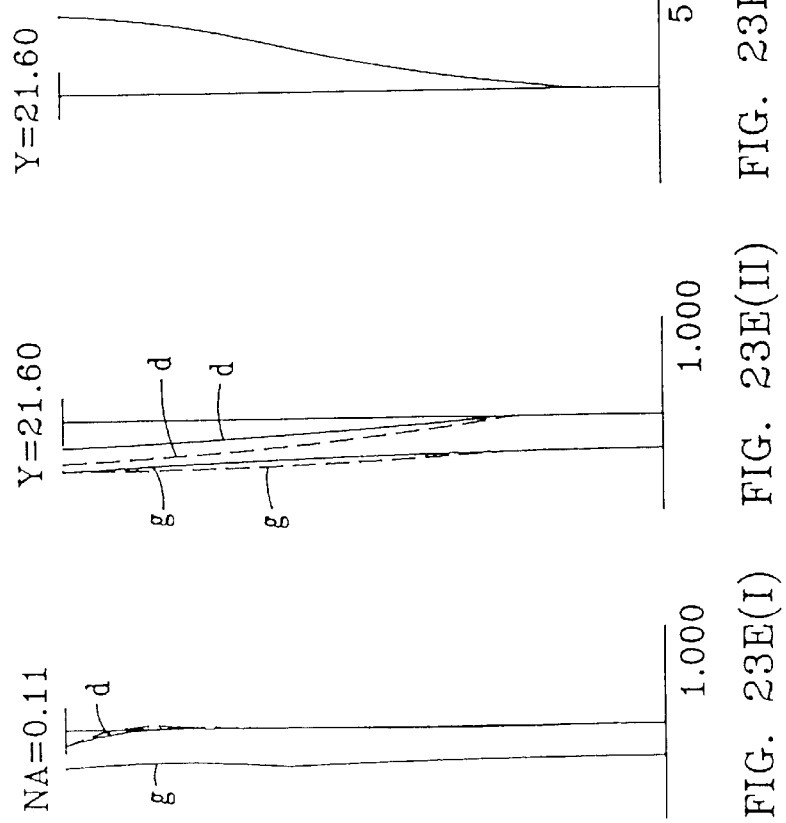
FIG. 23E(I)  FIG. 23E(II)  FIG. 23E(III)
FIG. 23E(IV)

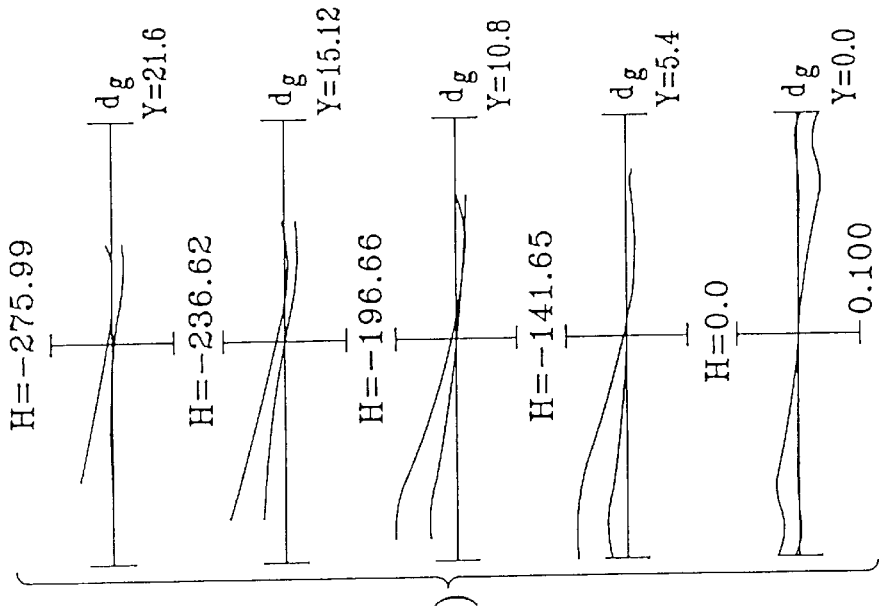
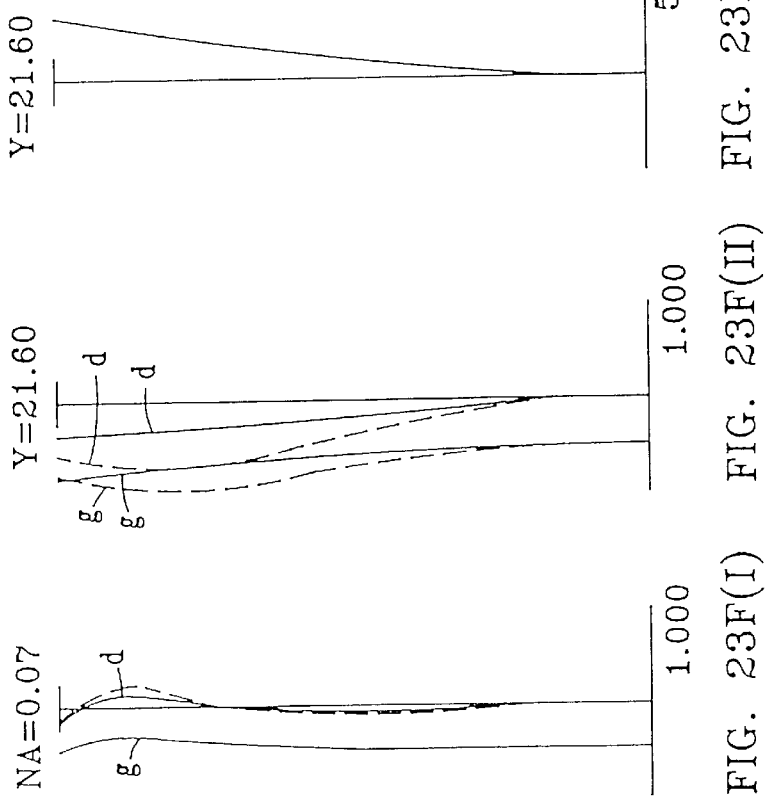
FIG. 23F(I)   FIG. 23F(II)   FIG. 23F(III)   FIG. 23F(IV)

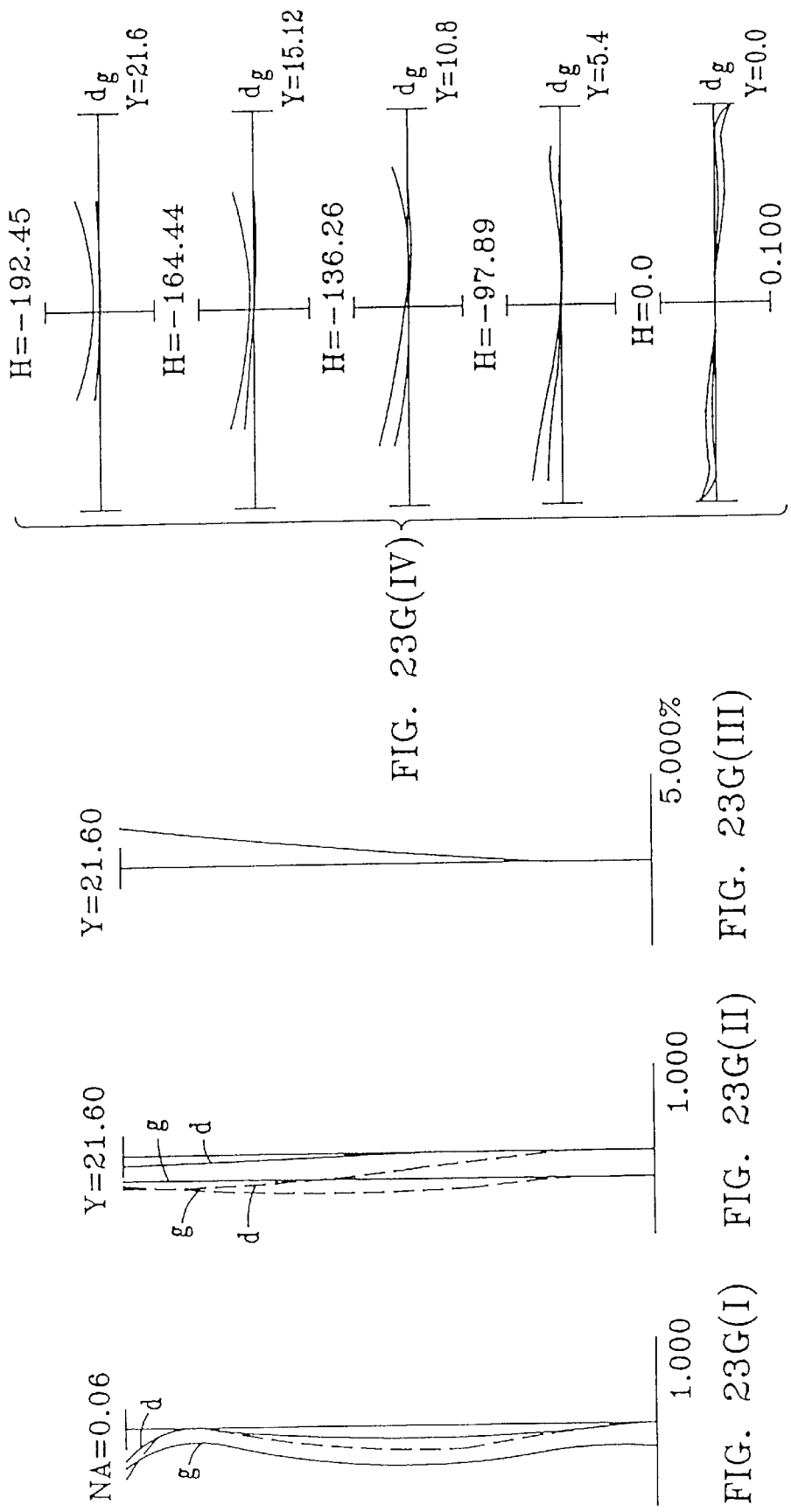

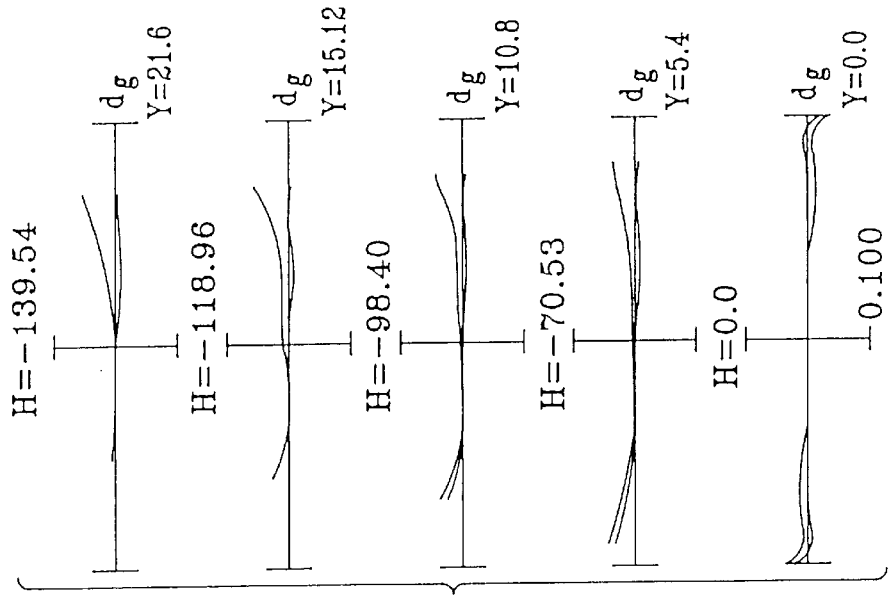
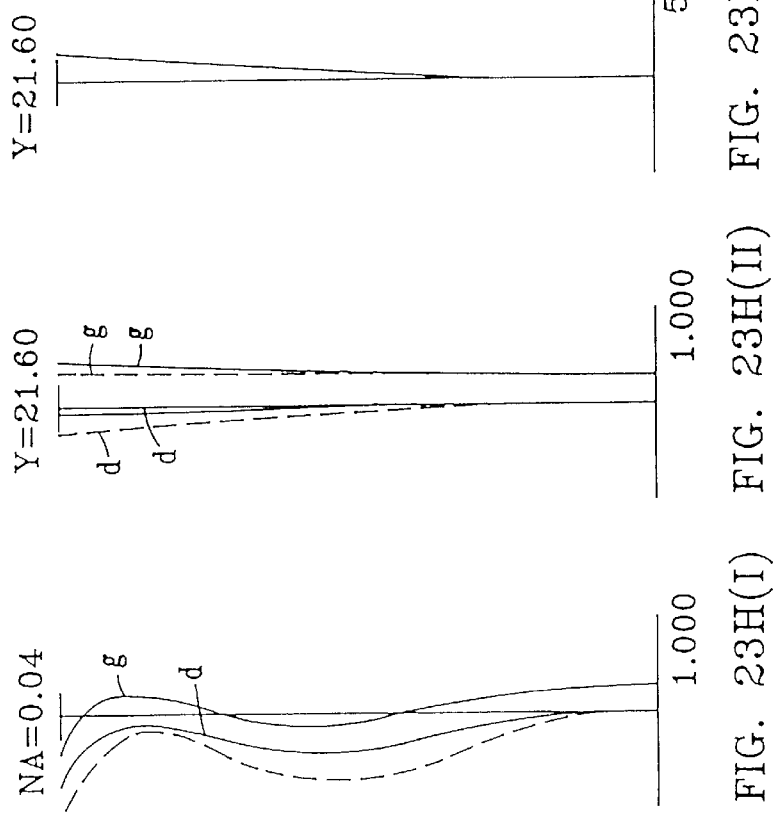
FIG. 23H(I)  FIG. 23H(II)  FIG. 23H(III)
FIG. 23H(IV)

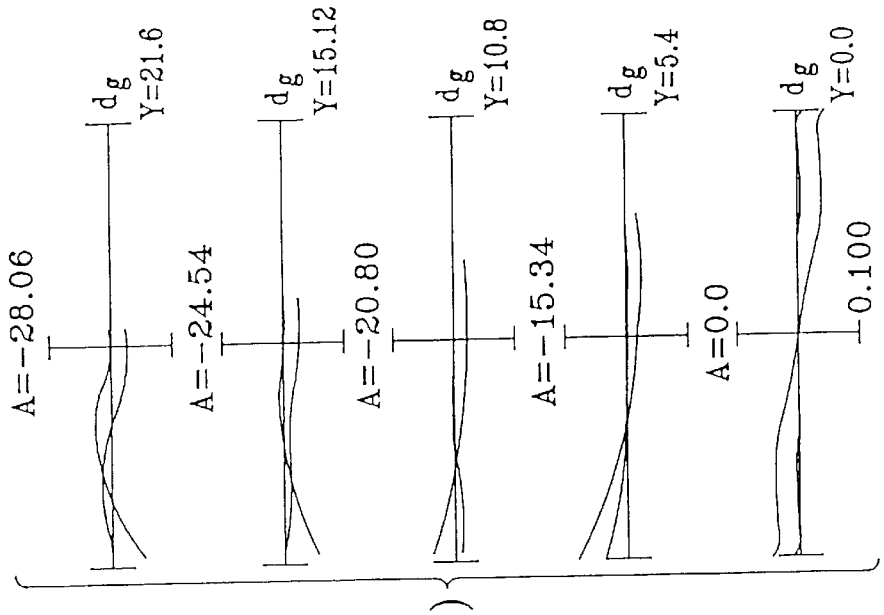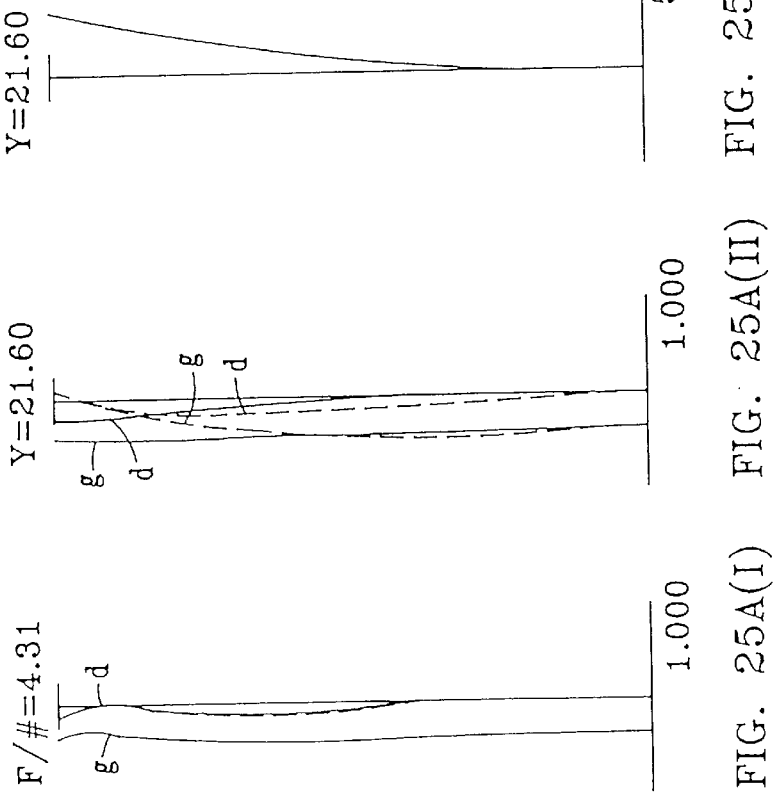

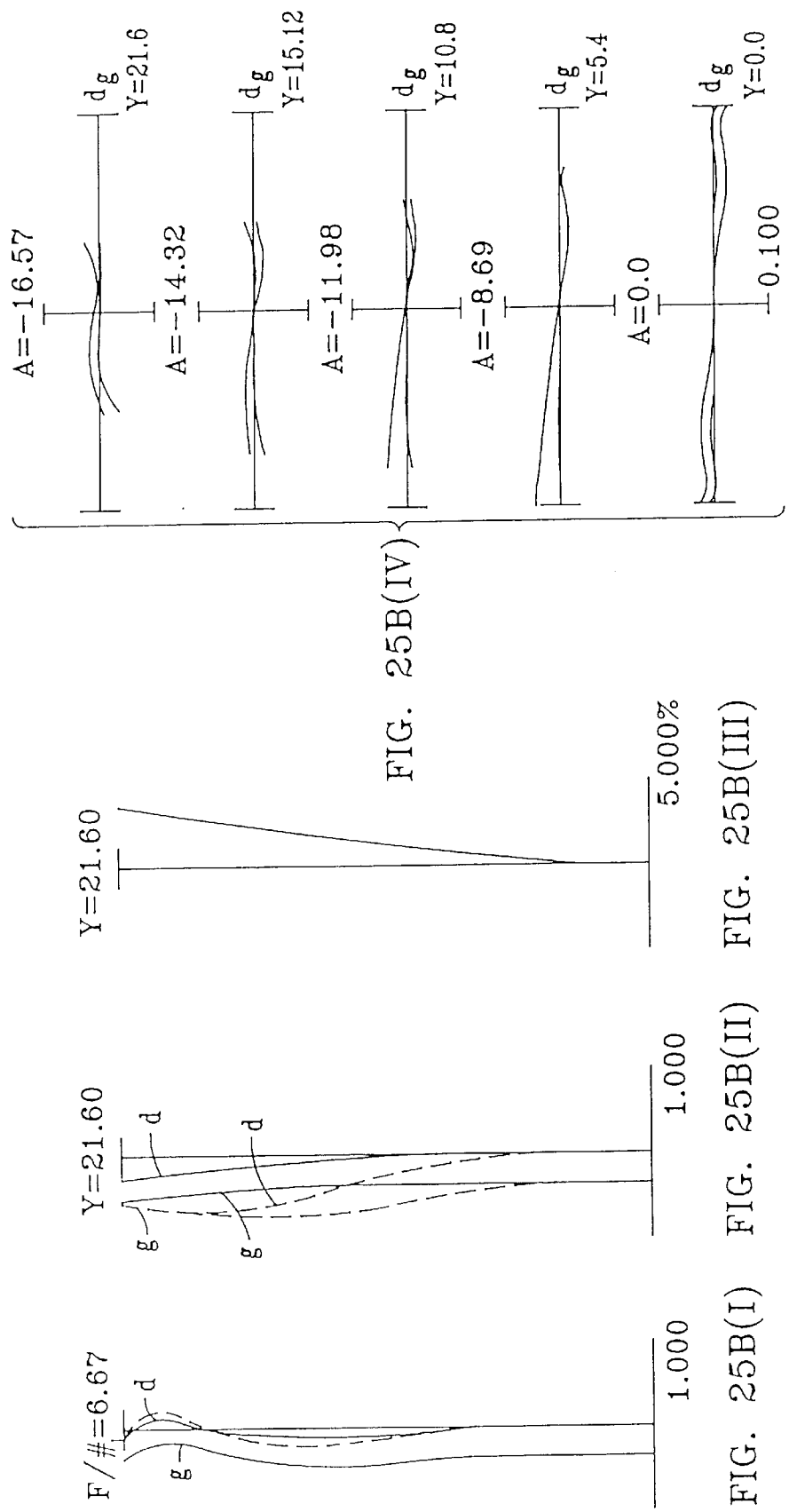

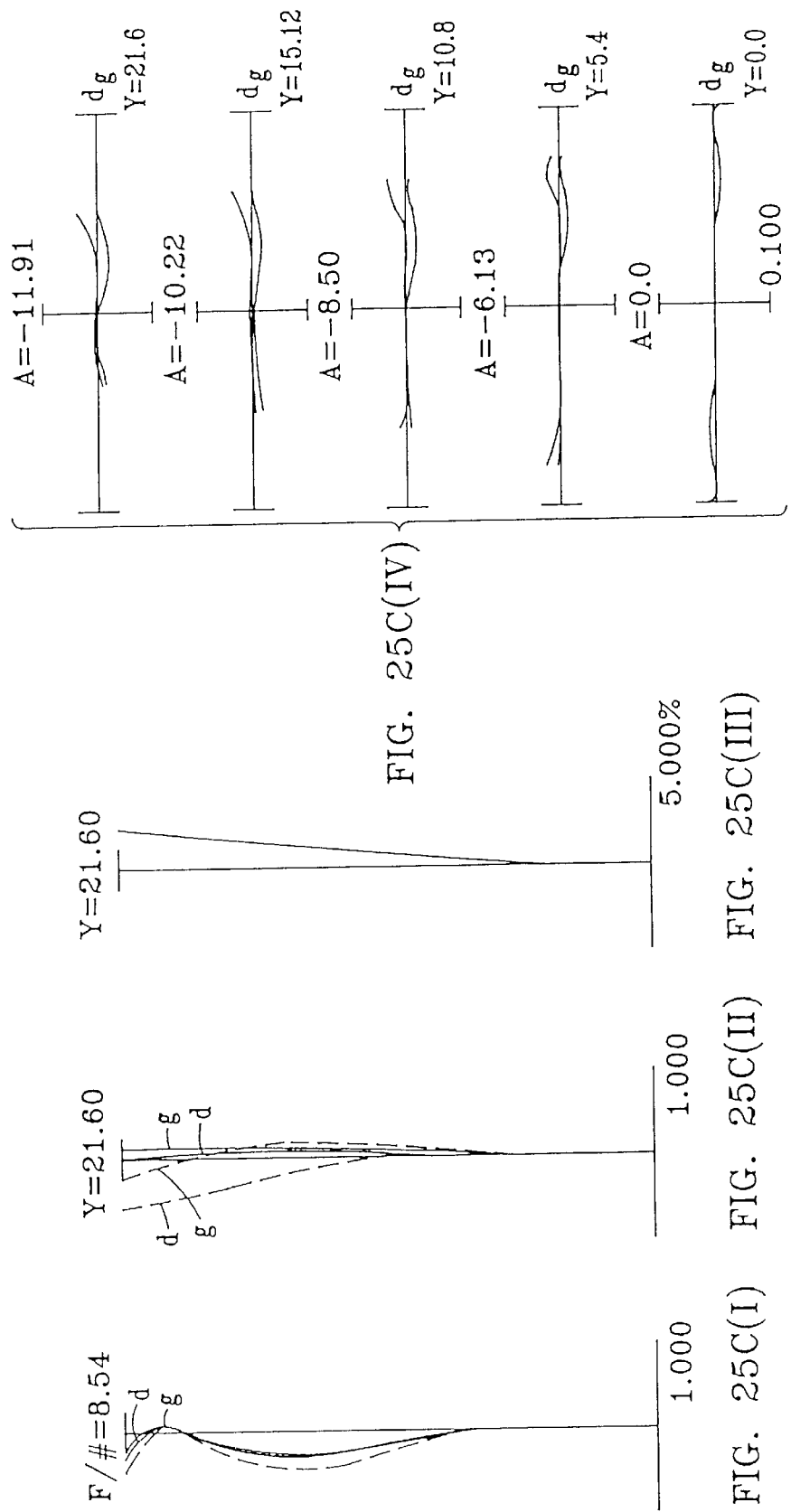

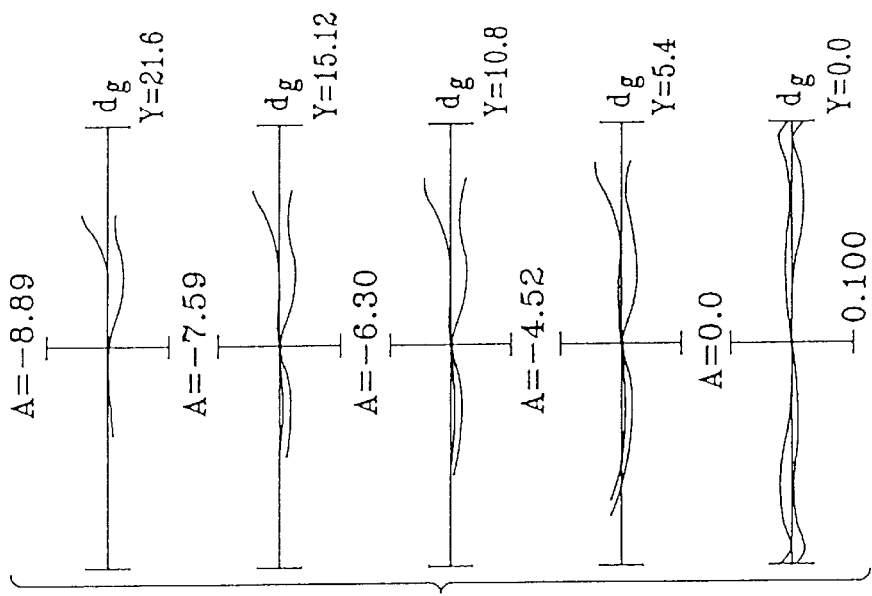
FIG. 25D(IV)
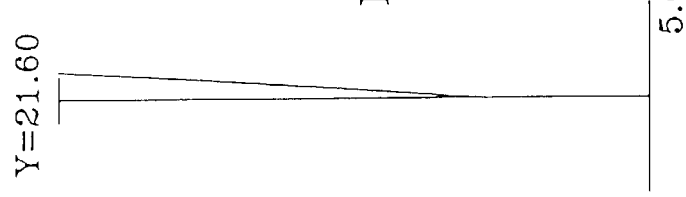
FIG. 25D(III)
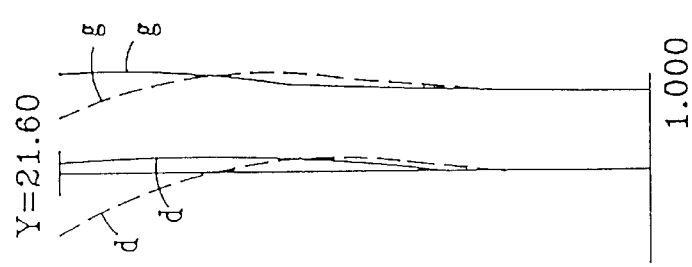
FIG. 25D(II)
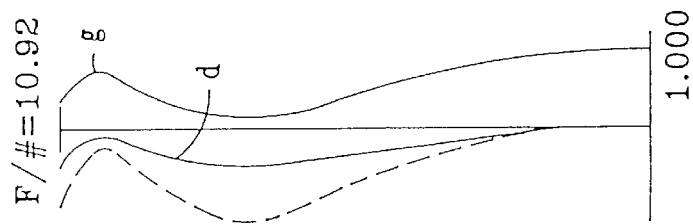
FIG. 25D(I)

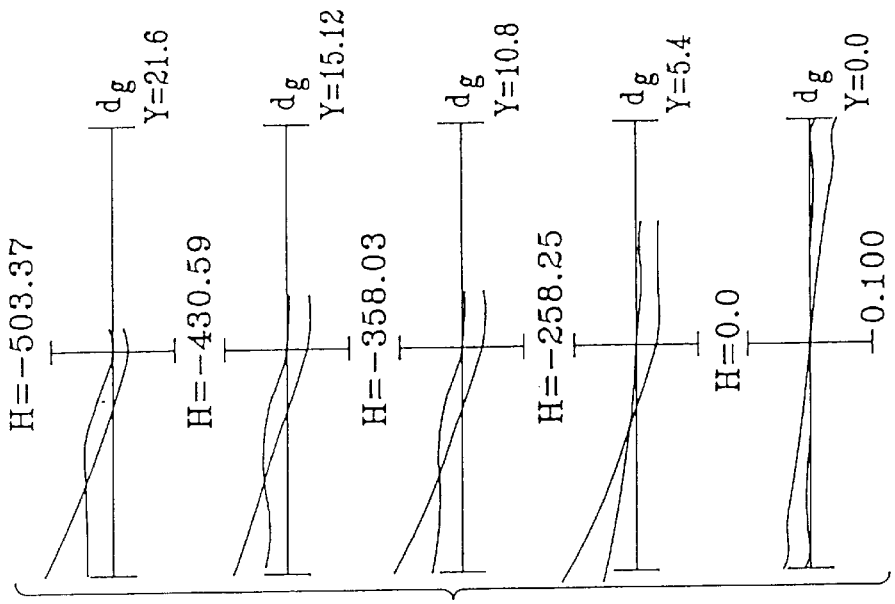
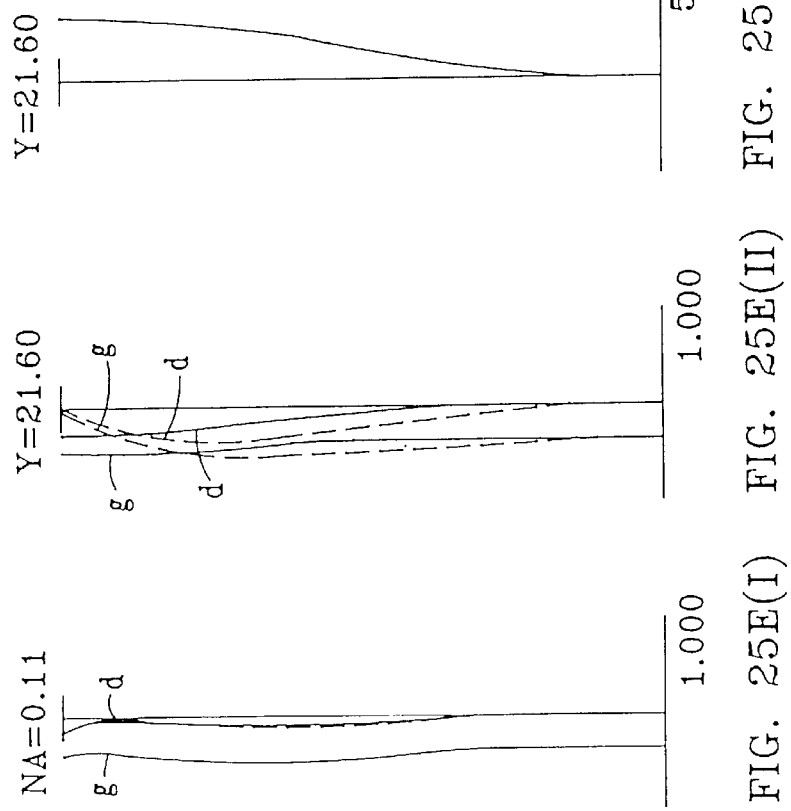
FIG. 25E(I)  FIG. 25E(II)  FIG. 25E(III)  FIG. 25E(IV)

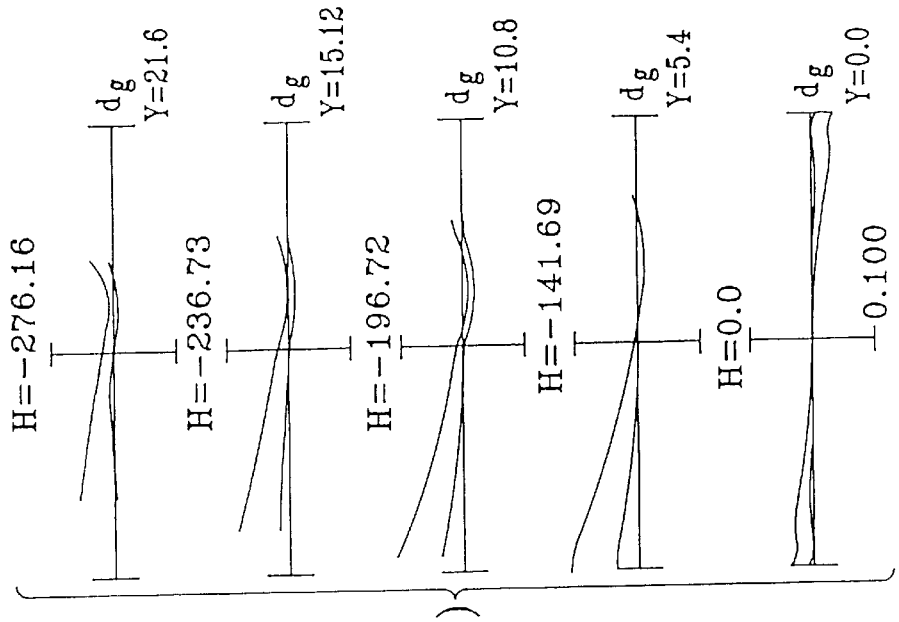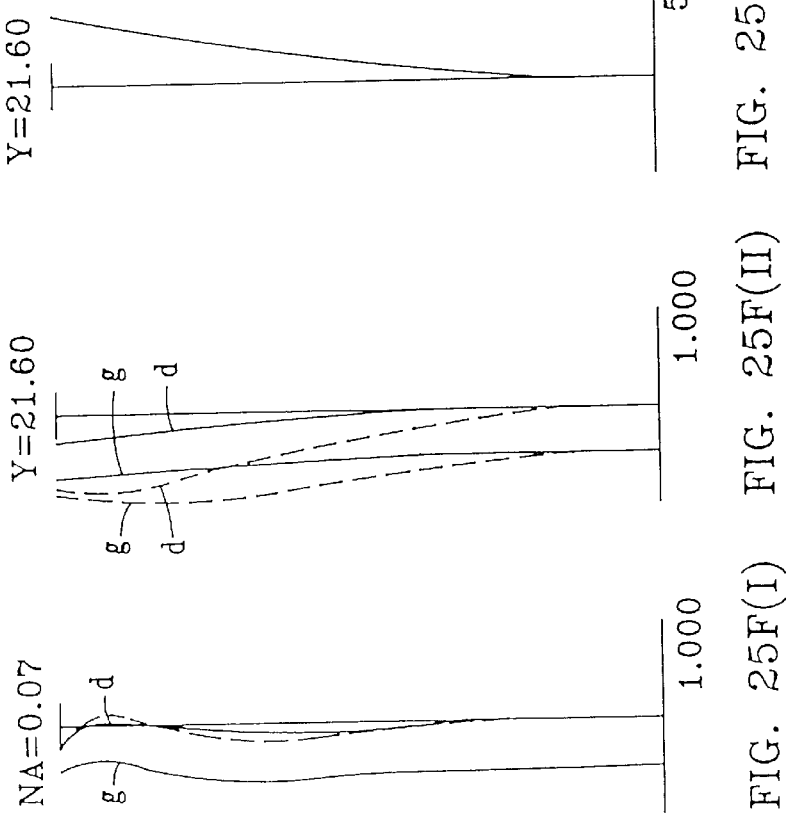
FIG. 25F(I)  FIG. 25F(II)  FIG. 25F(III)  FIG. 25F(IV)

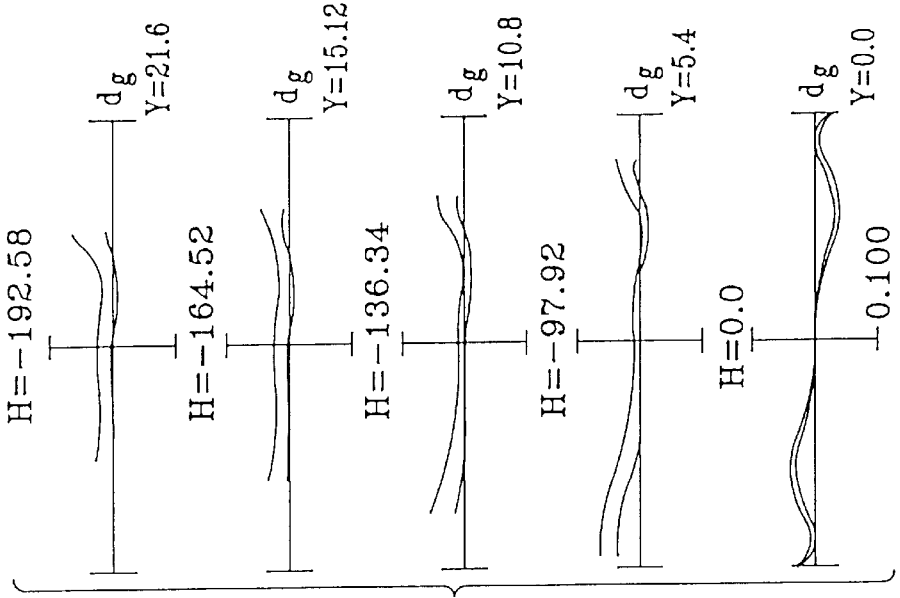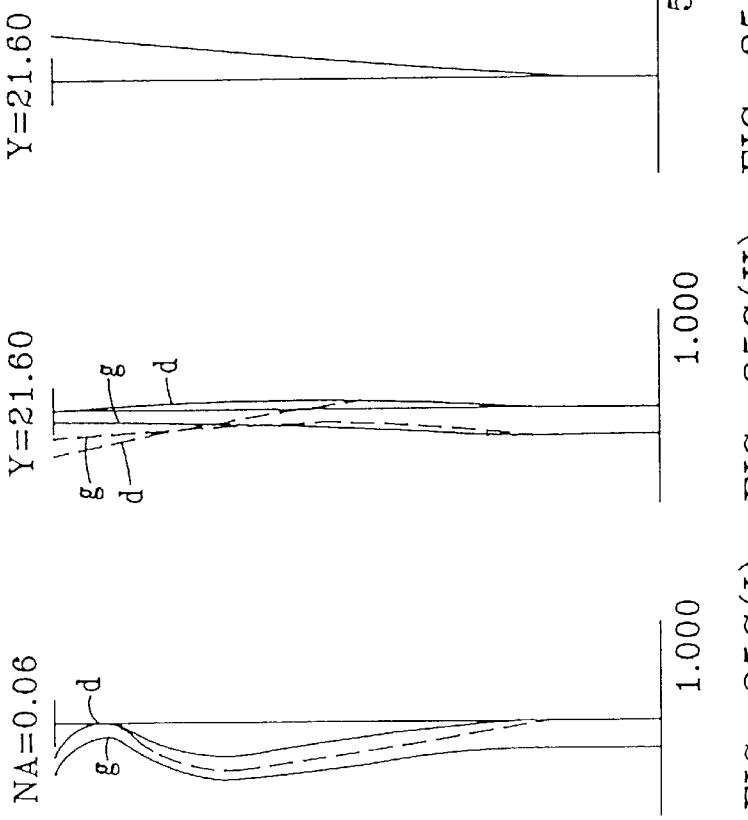

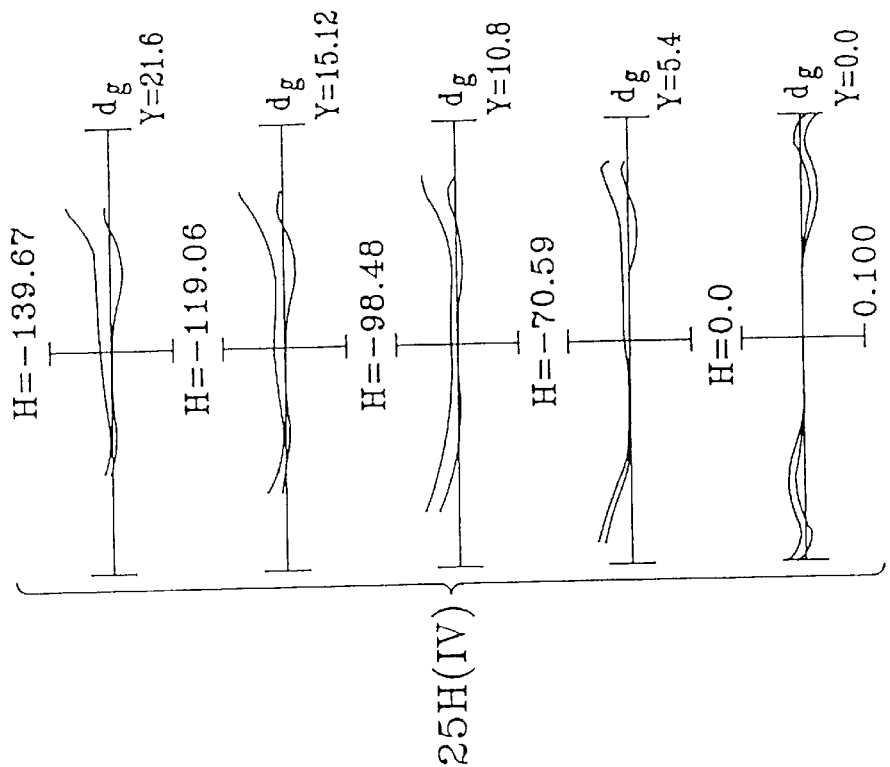
FIG. 25H(IV)
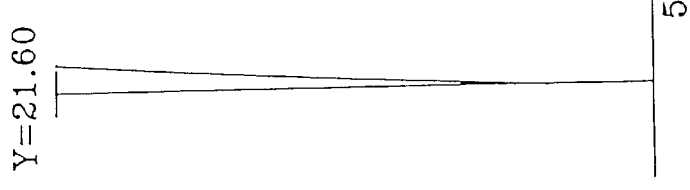
FIG. 25H(III)
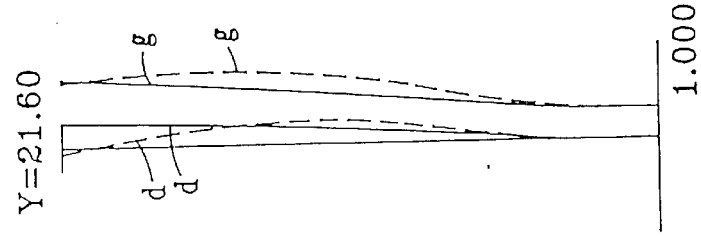
FIG. 25H(II)
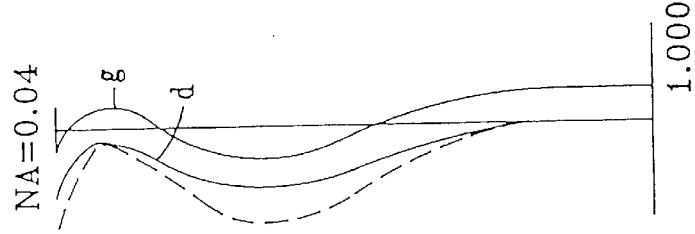
FIG. 25H(I)

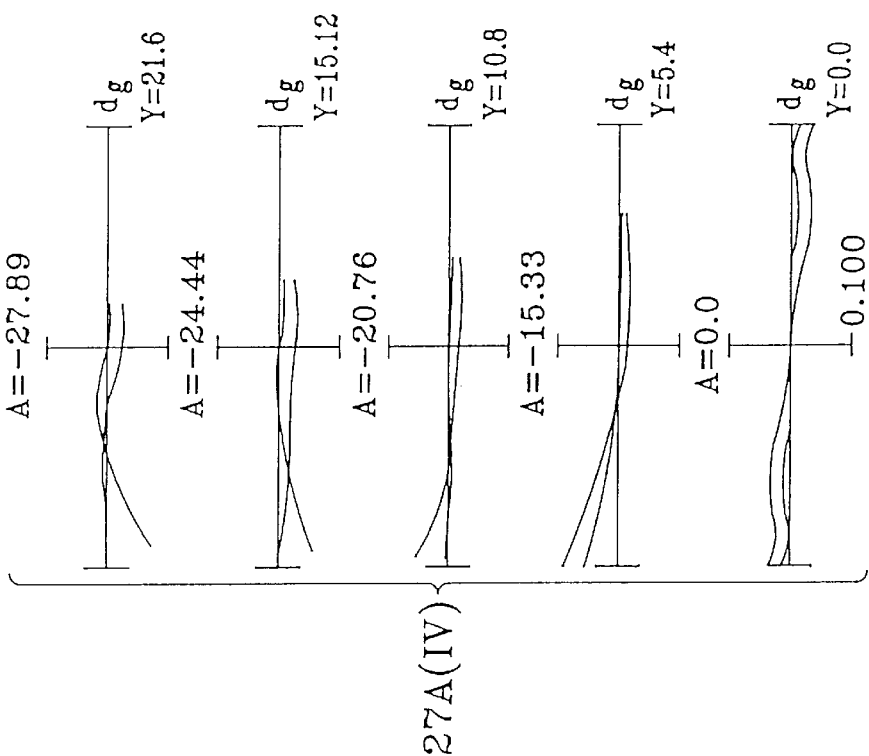
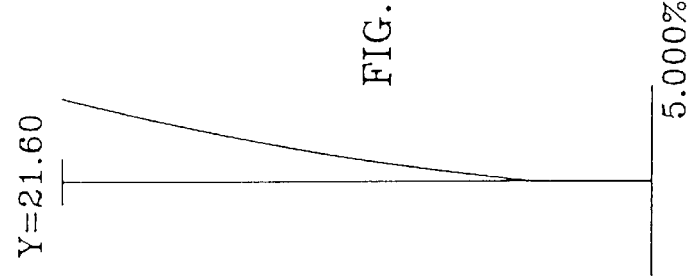
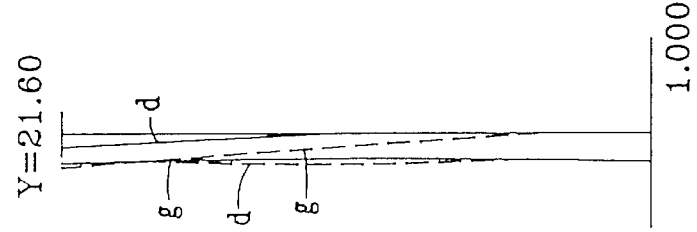
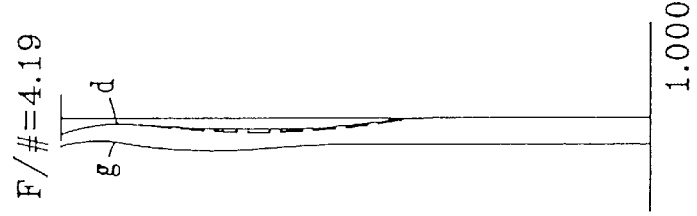

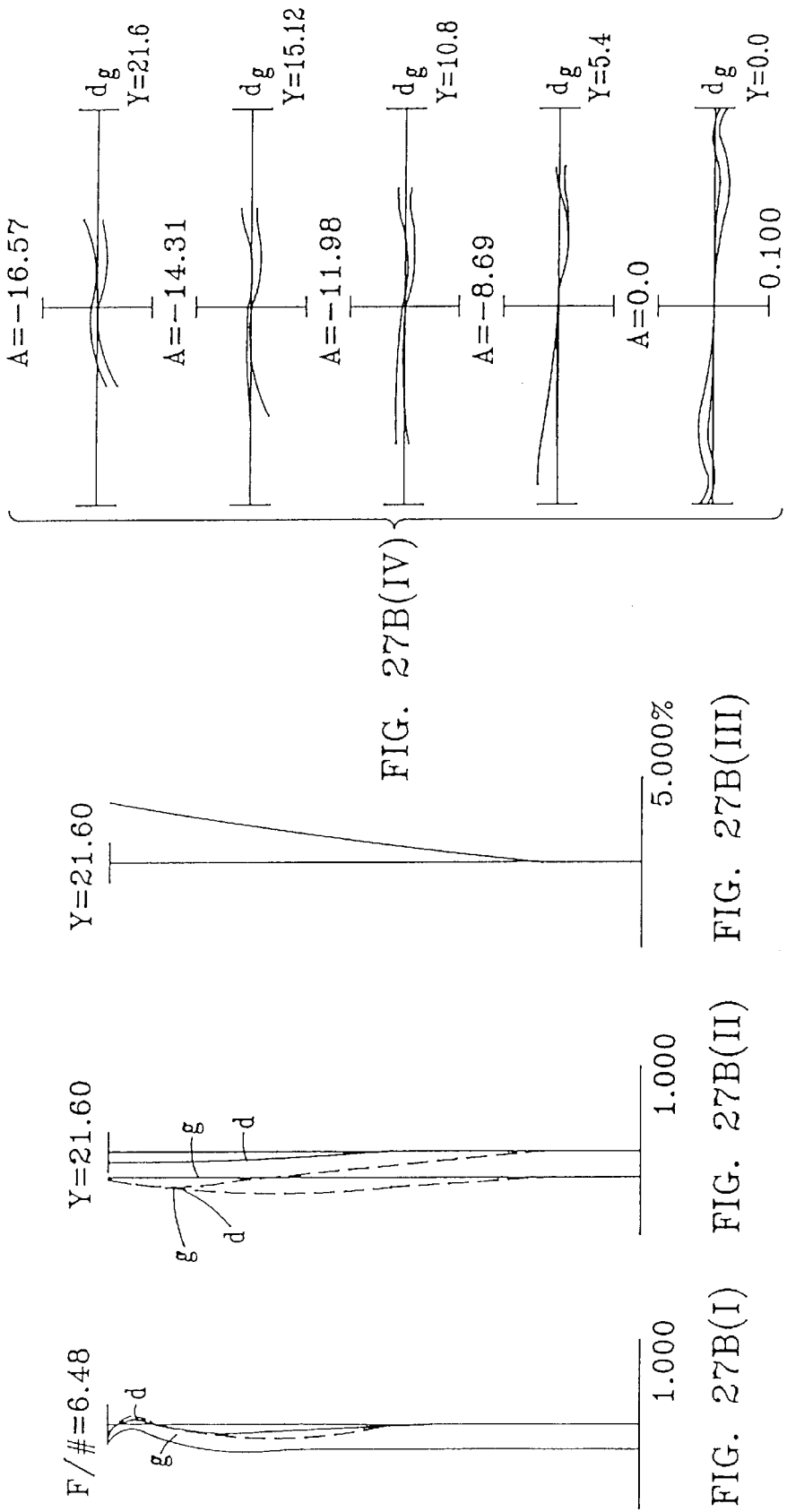

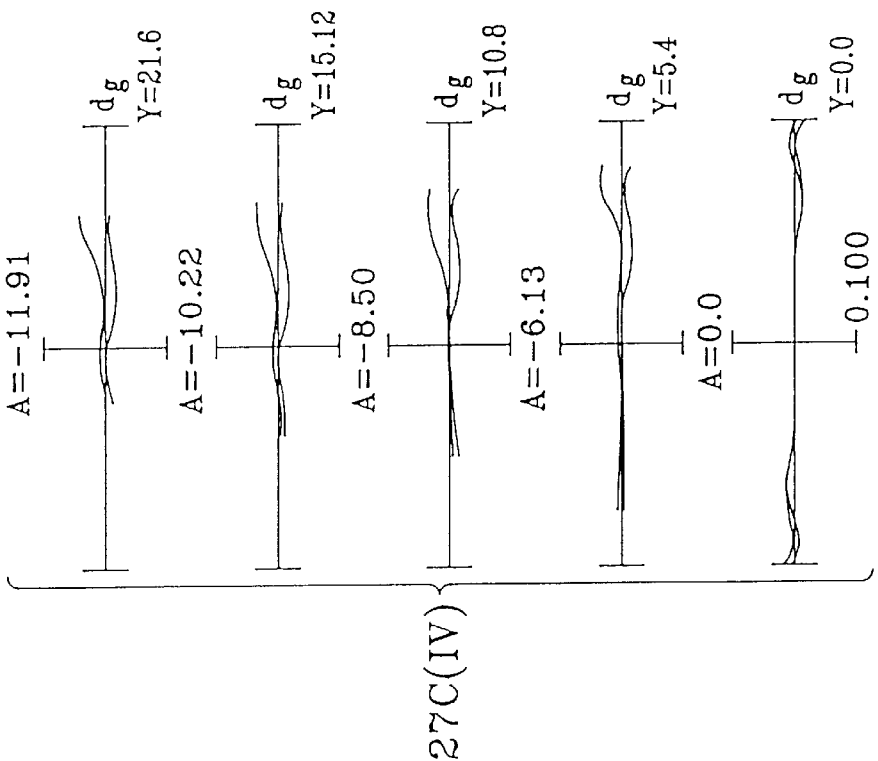
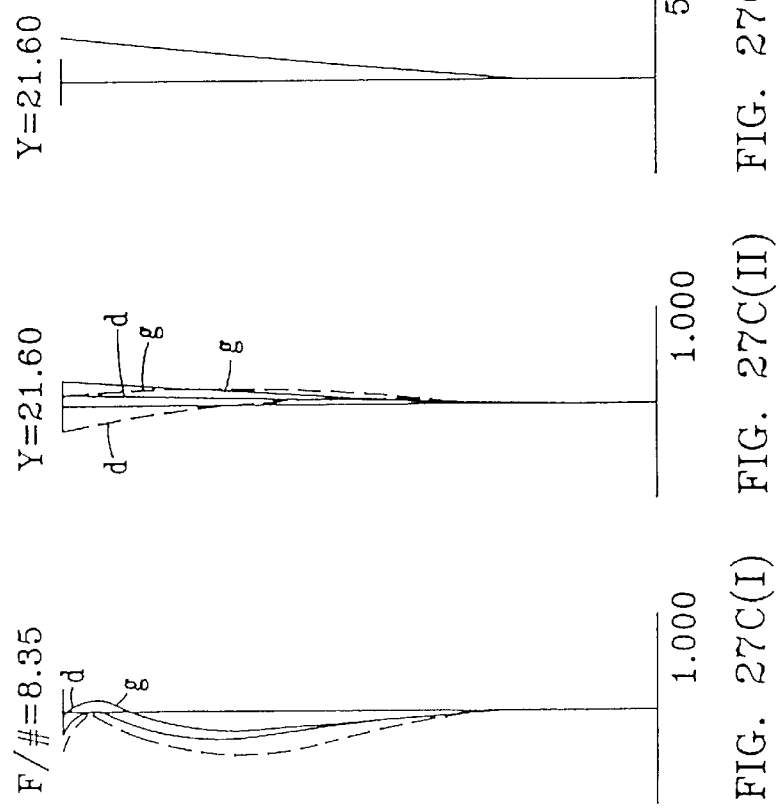
FIG. 27C(I)  FIG. 27C(II)  FIG. 27C(III)  FIG. 27C(IV)

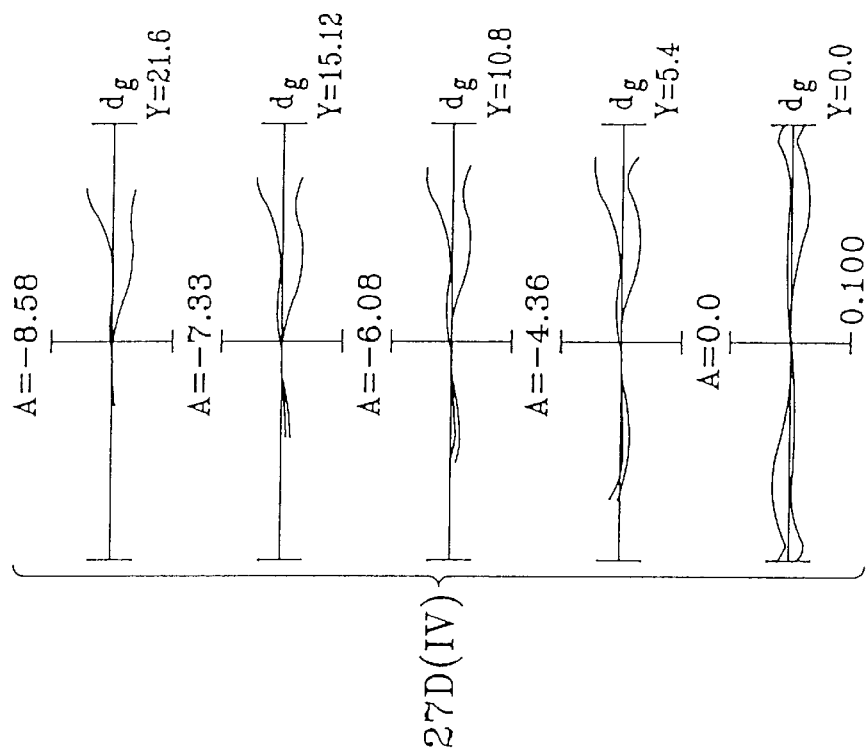
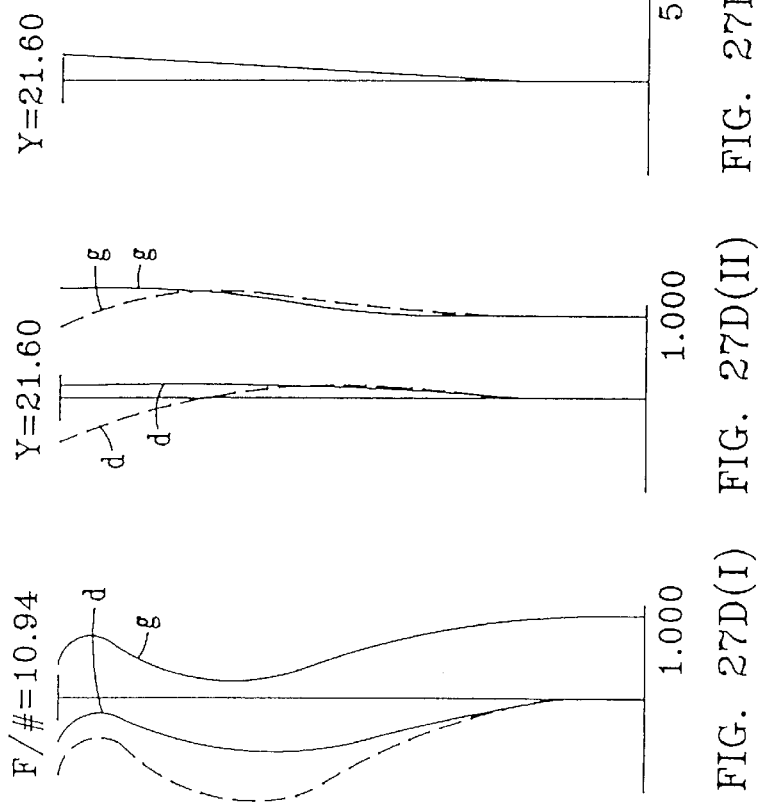
FIG. 27D(I)  FIG. 27D(II)  FIG. 27D(III)  FIG. 27D(IV)

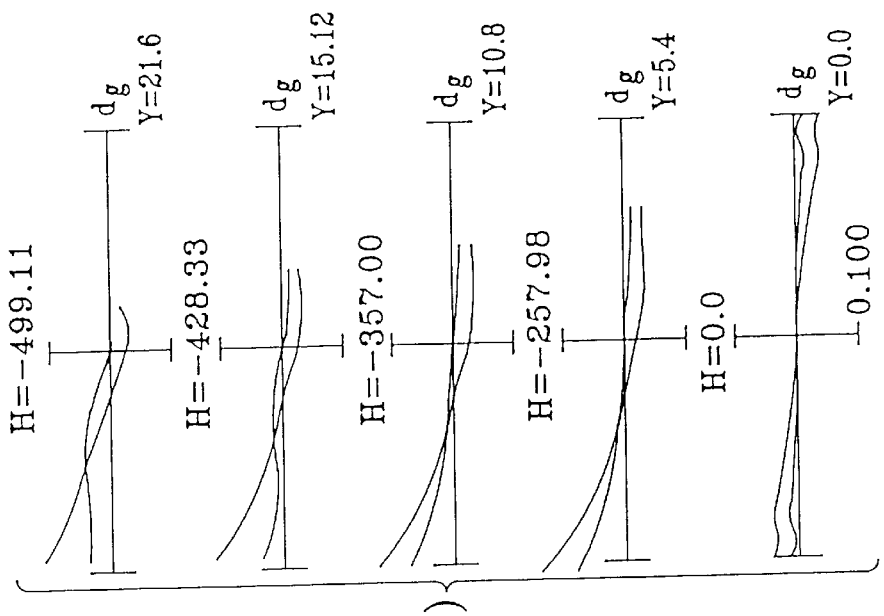
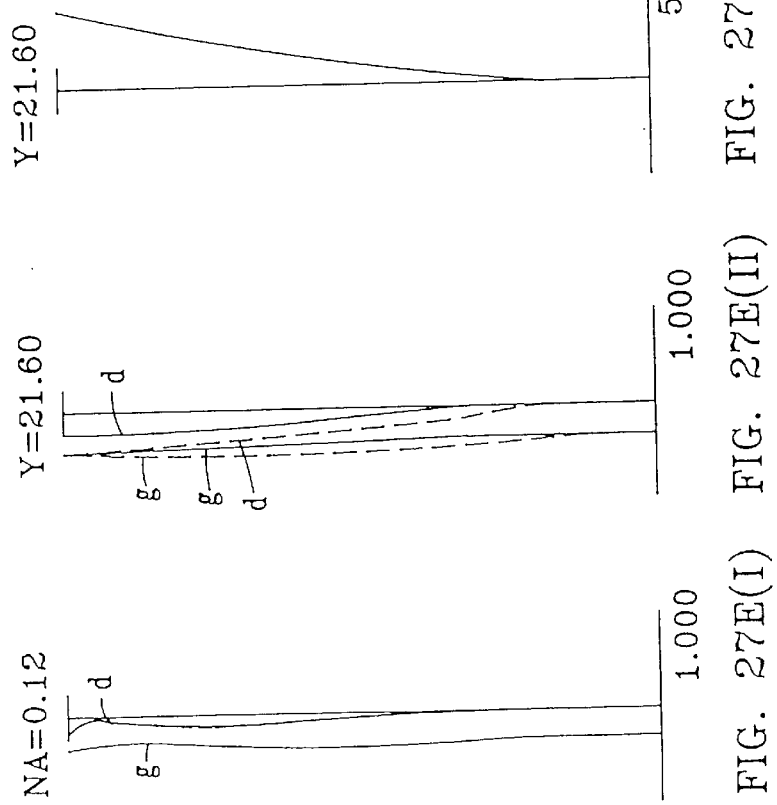
FIG. 27E(I)  FIG. 27E(II)  FIG. 27E(III)
FIG. 27E(IV)

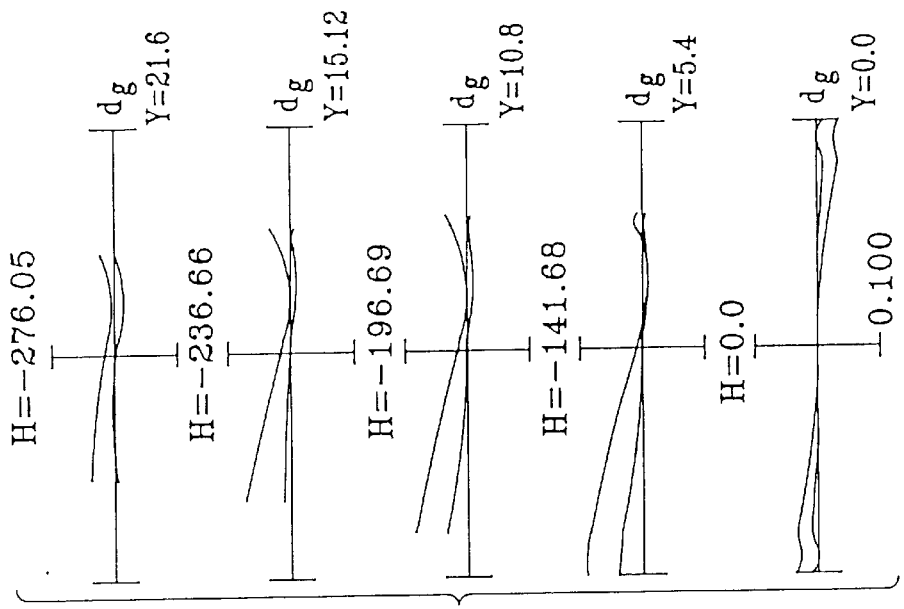
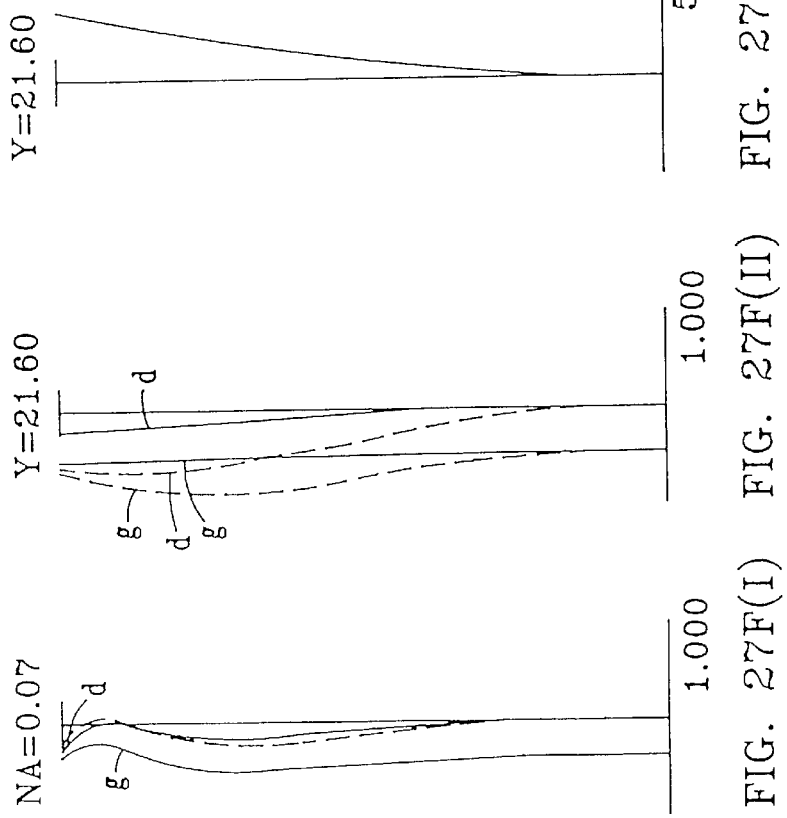
FIG. 27F(IV)
FIG. 27F(III)
FIG. 27F(II)
FIG. 27F(I)

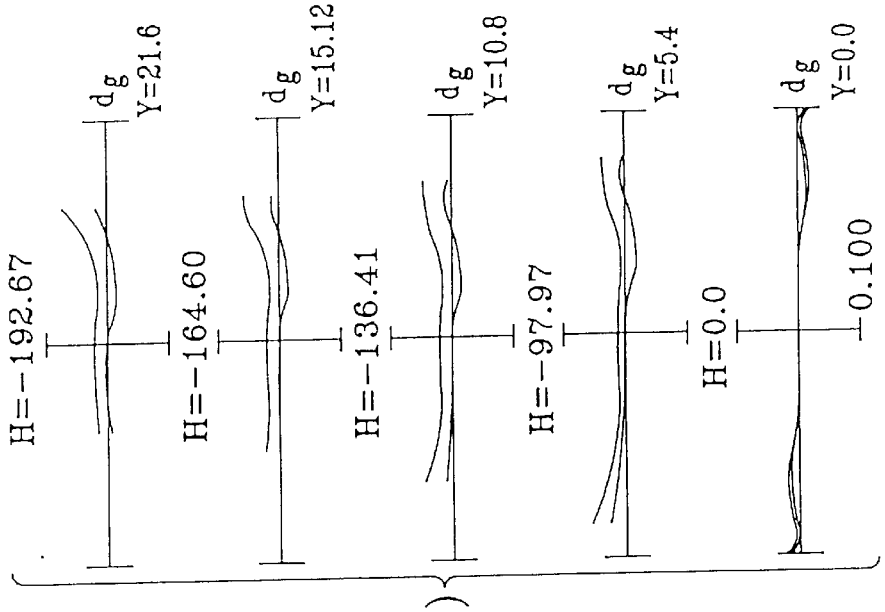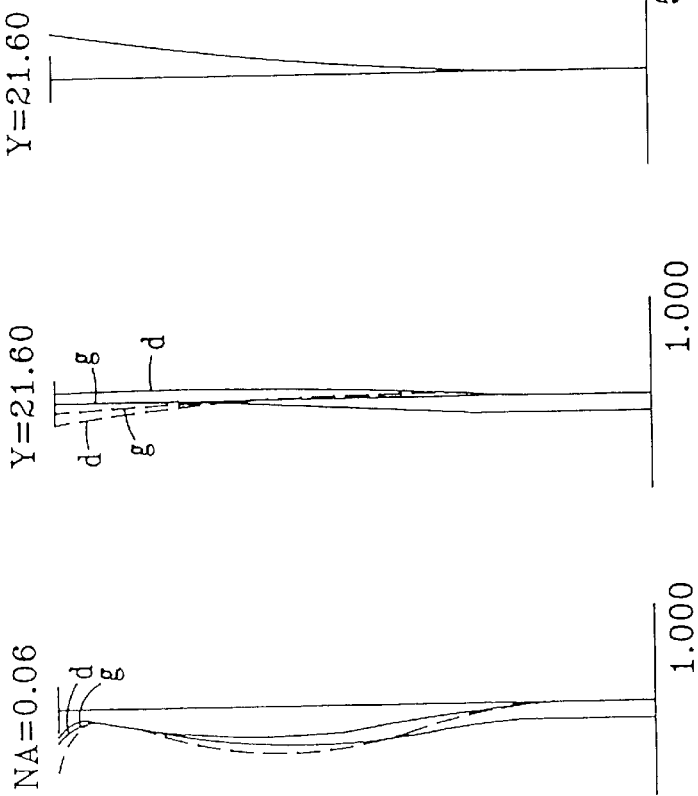
FIG. 27G(I)  FIG. 27G(II)  FIG. 27G(III)  FIG. 27G(IV)

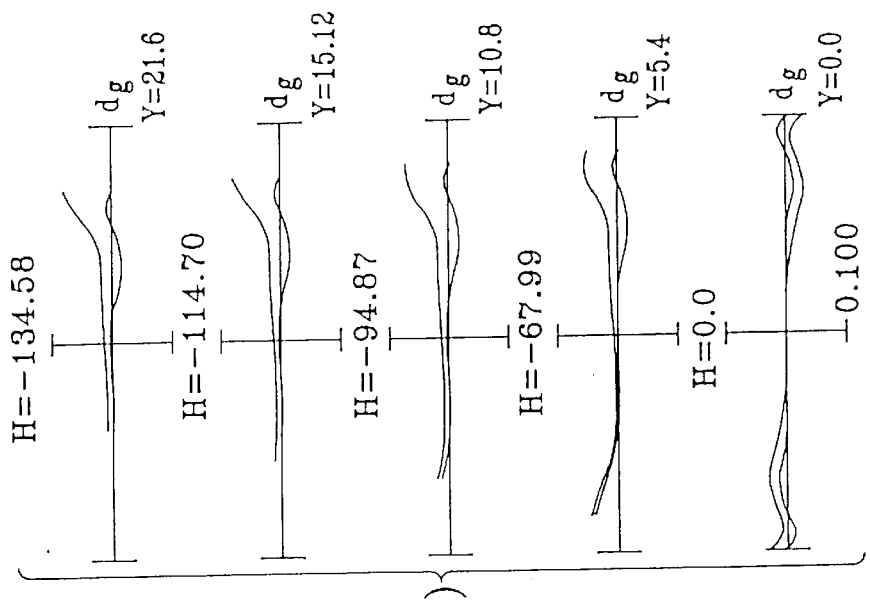
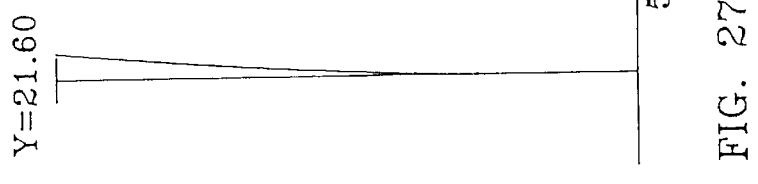
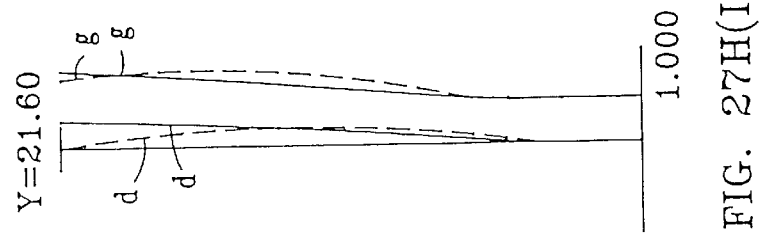
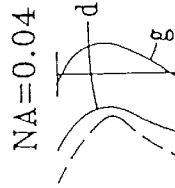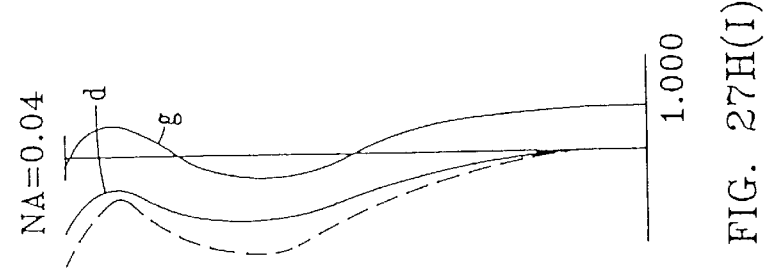
FIG. 27H(I)   FIG. 27H(II)   FIG. 27H(III)
FIG. 27H(IV)

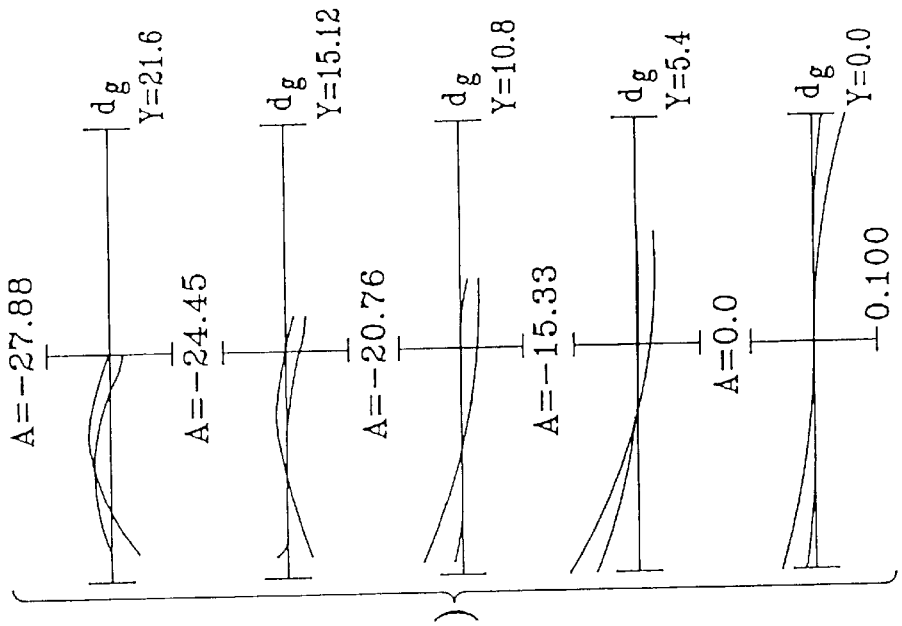
FIG. 29A(IV)
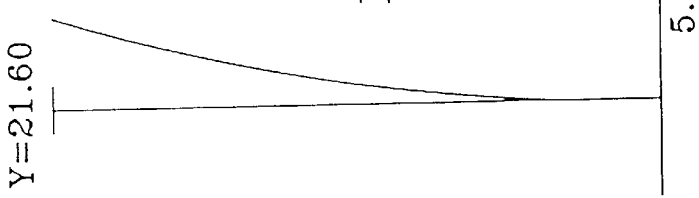
FIG. 29A(III)
FIG. 29A(II)
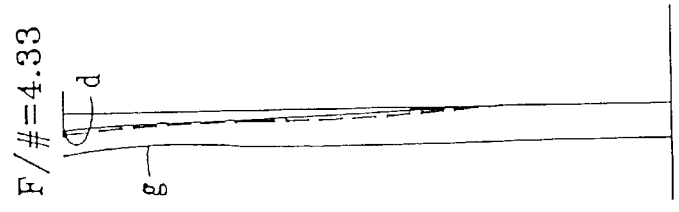
FIG. 29A(I)

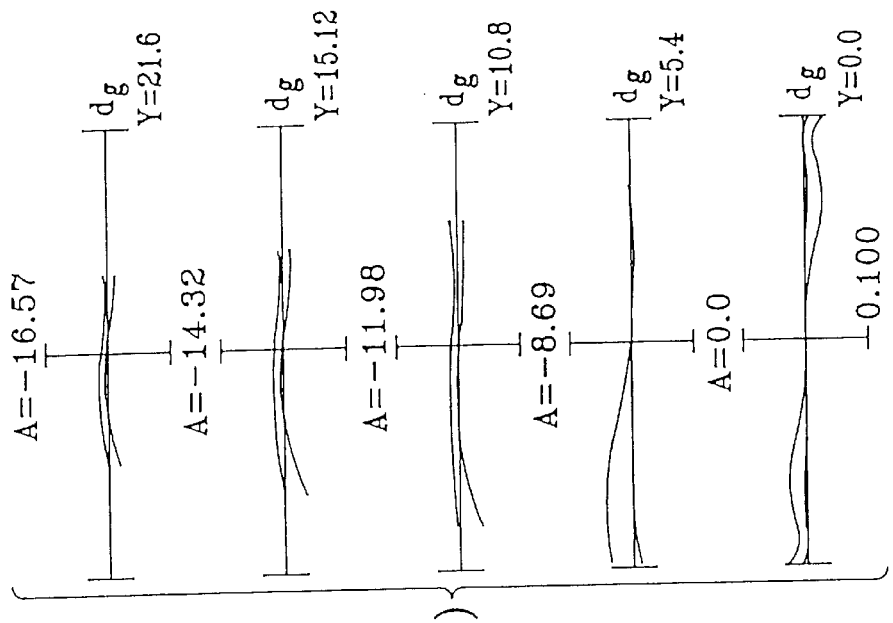
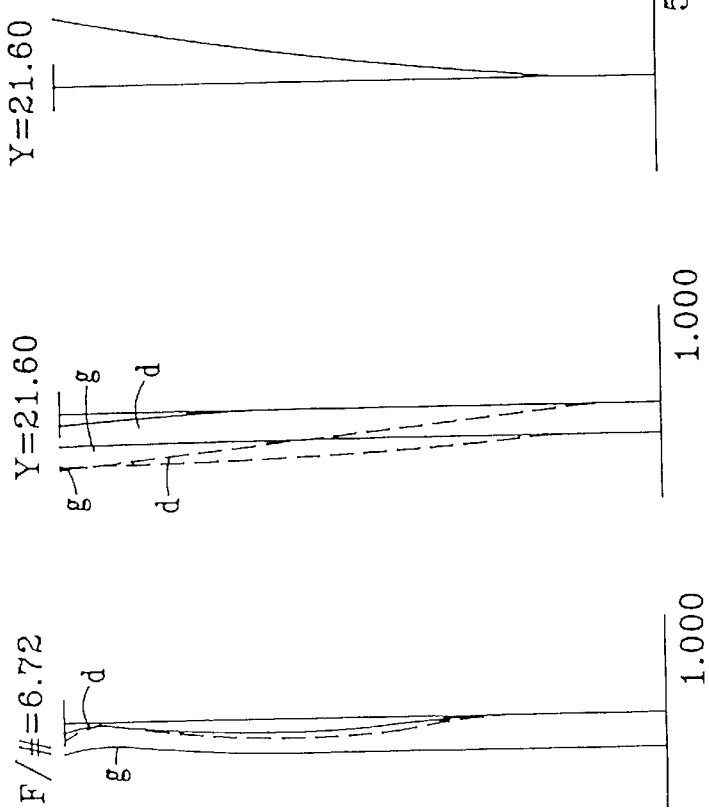
FIG. 29B(I)  FIG. 29B(II)  FIG. 29B(III)  FIG. 29B(IV)

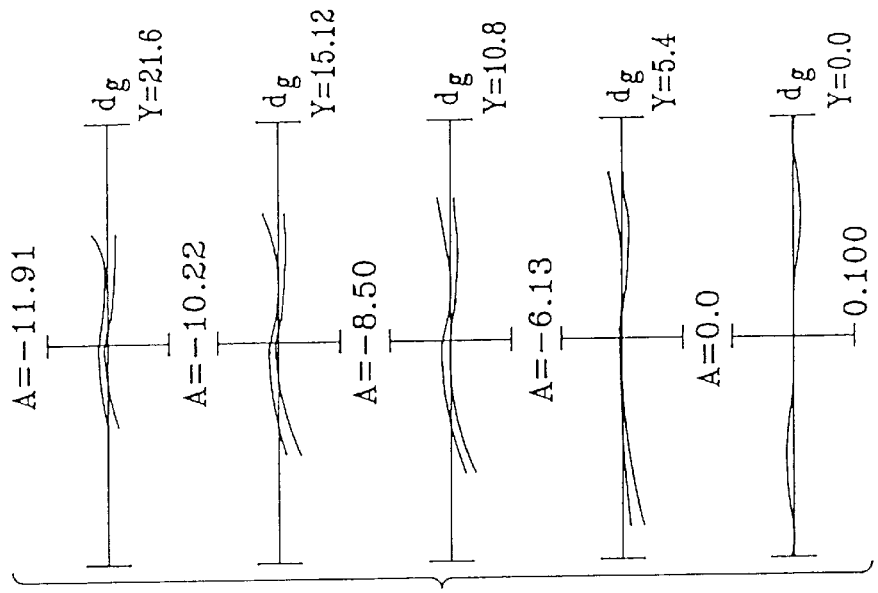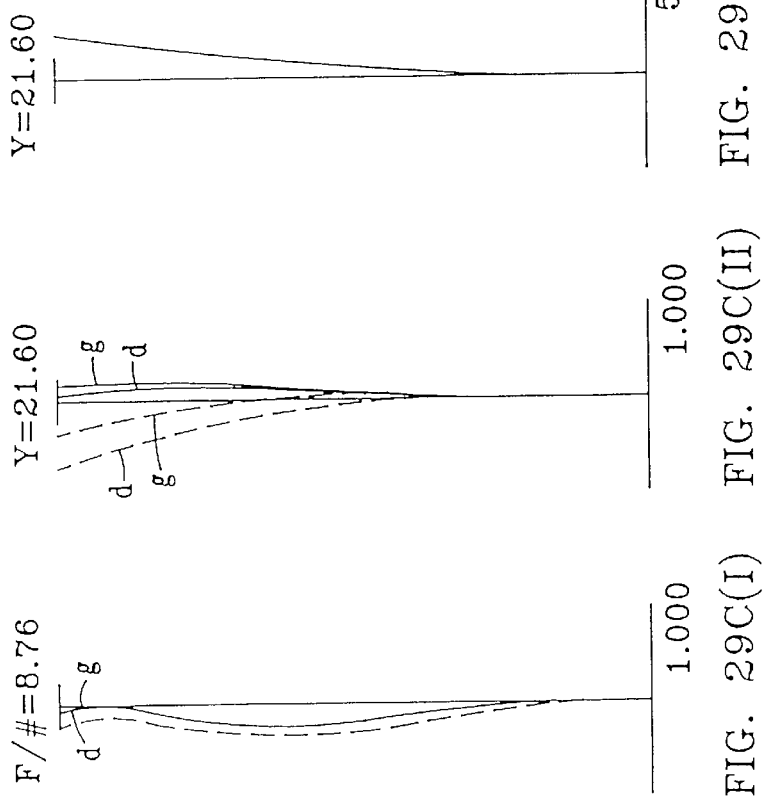

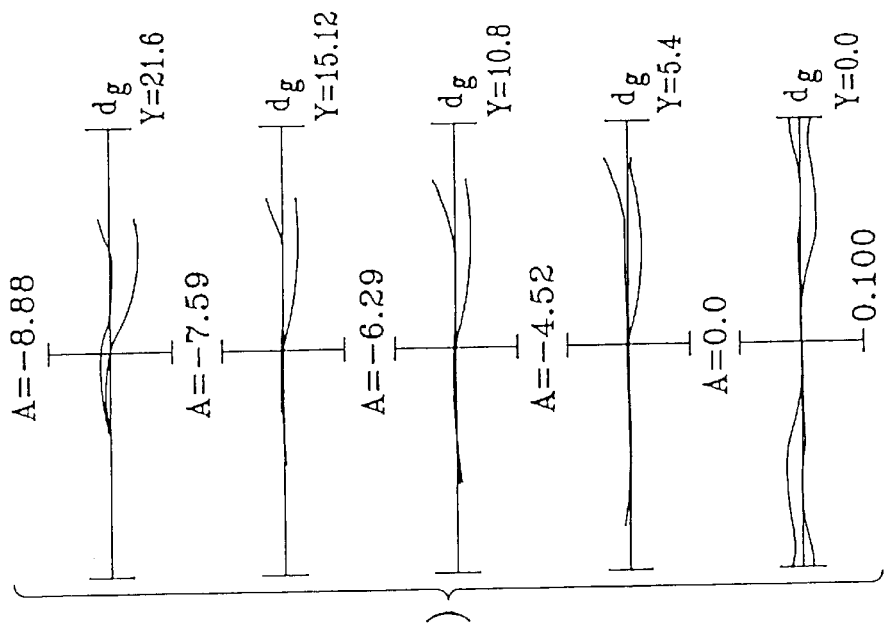
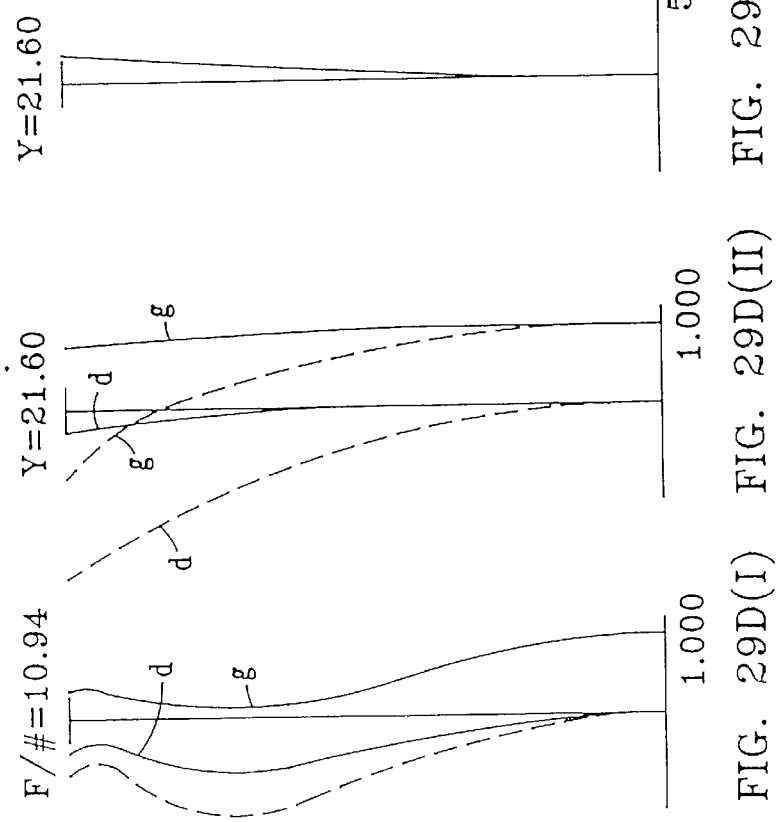
FIG. 29D(I)   FIG. 29D(II)   FIG. 29D(III)

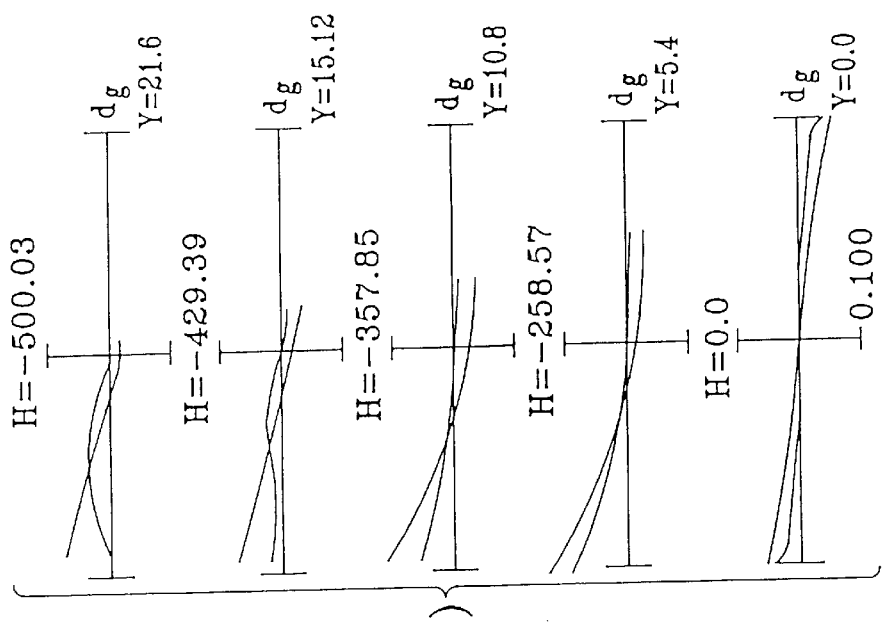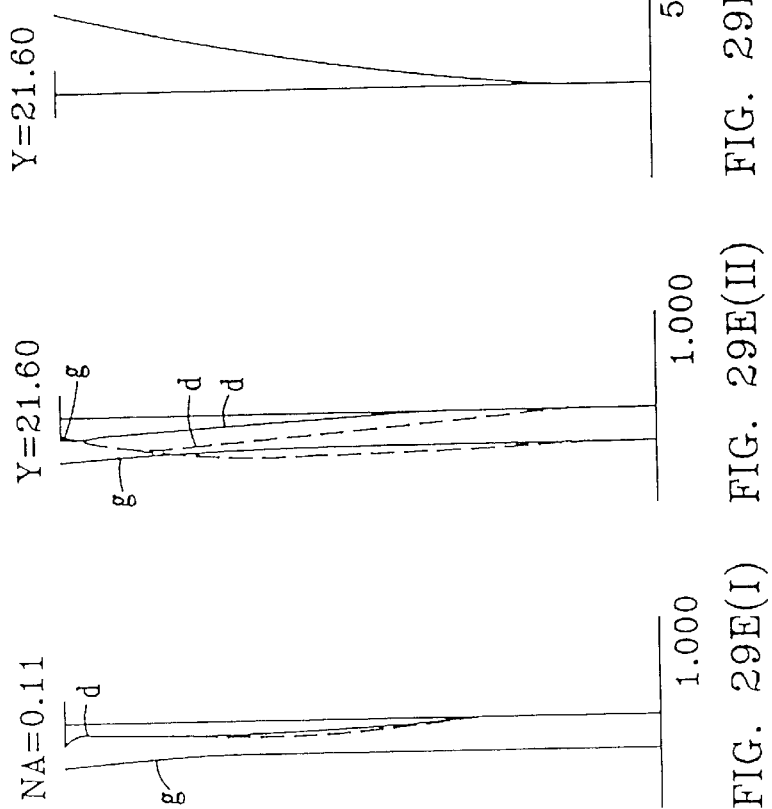

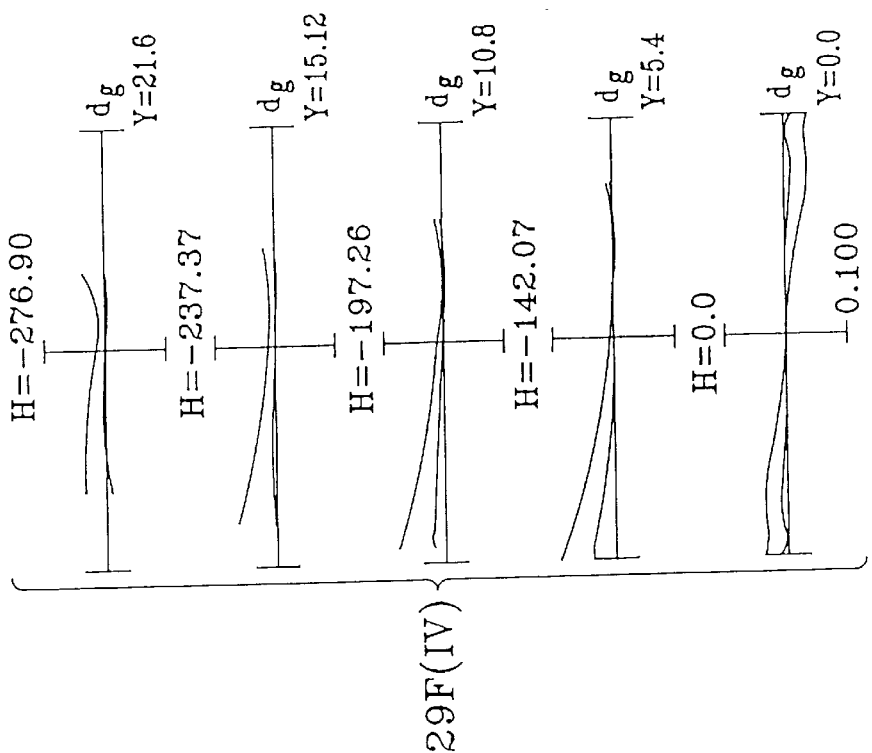
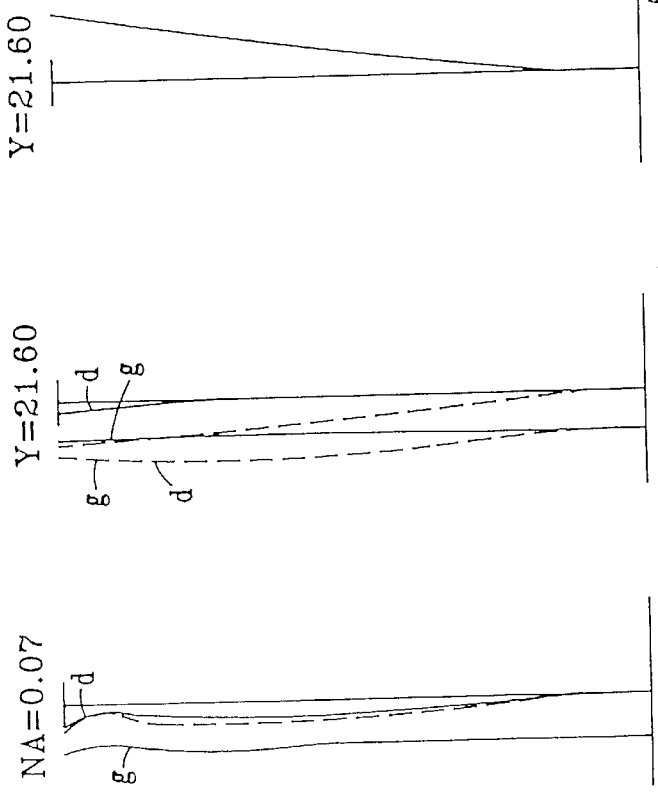
FIG. 29F(I)   FIG. 29F(II)   FIG. 29F(III)   FIG. 29F(IV)

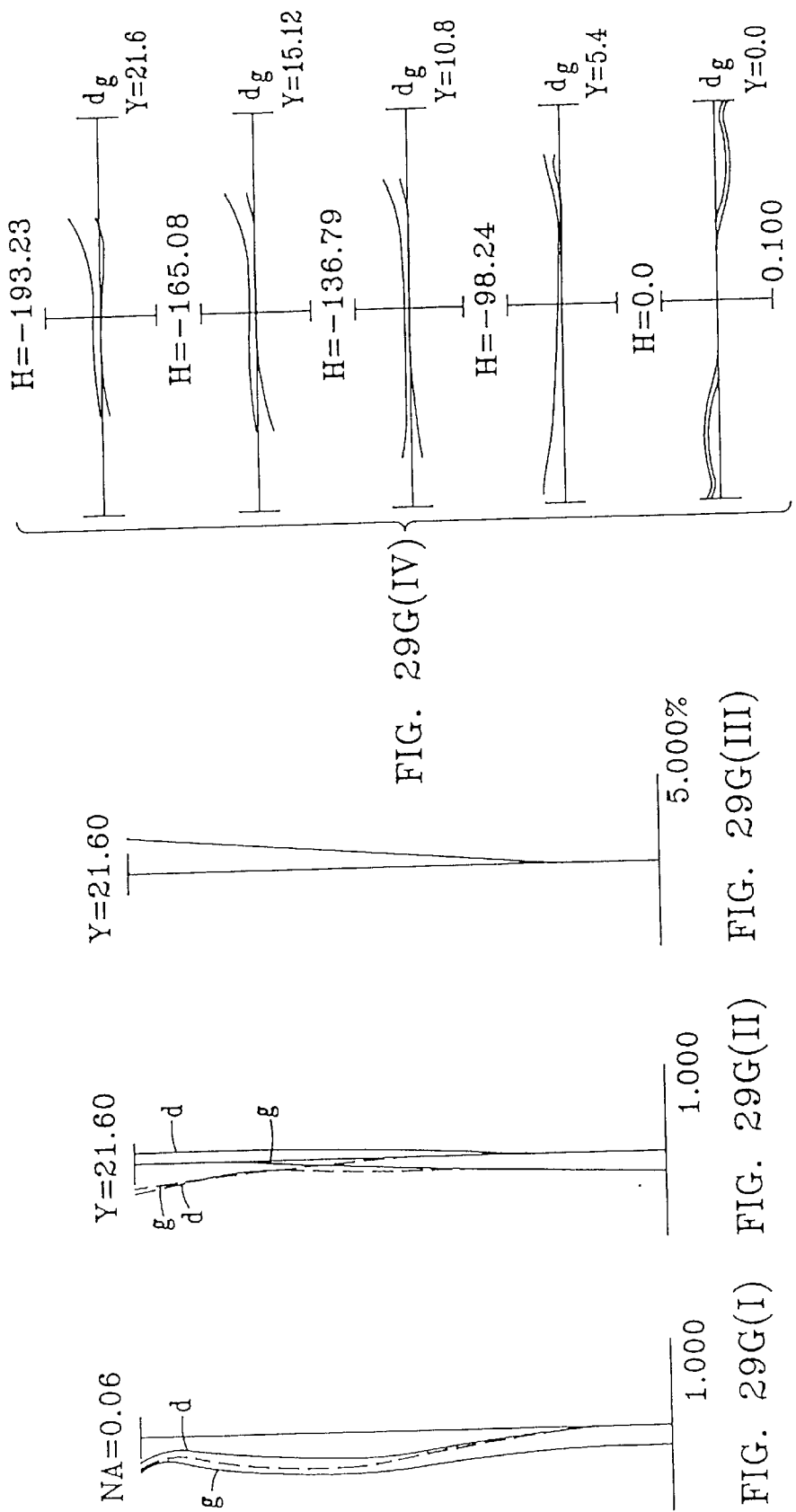

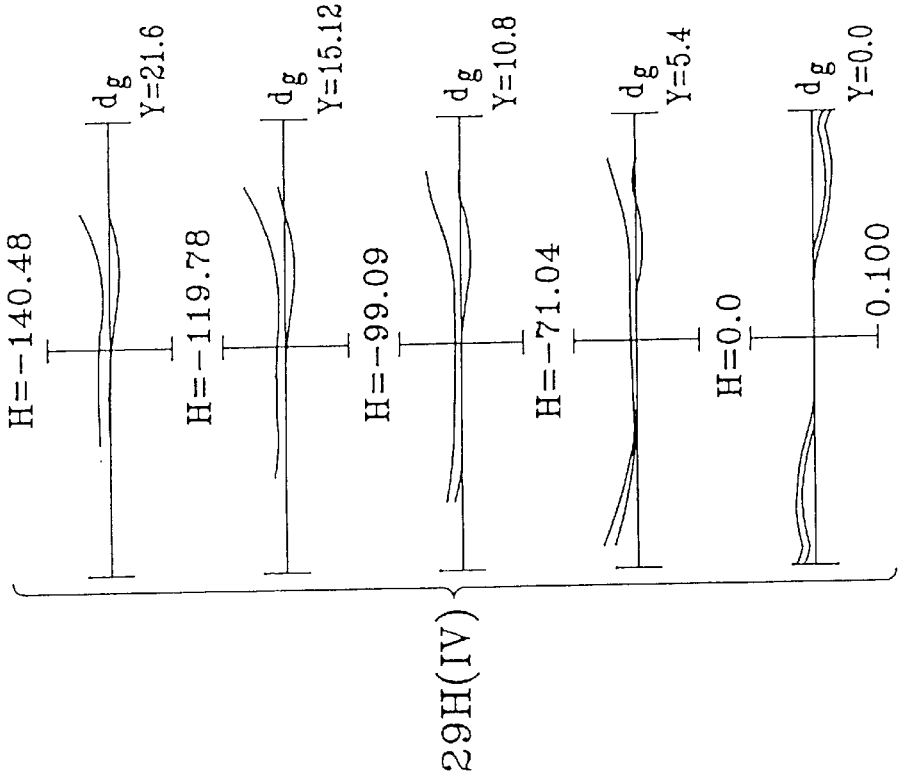
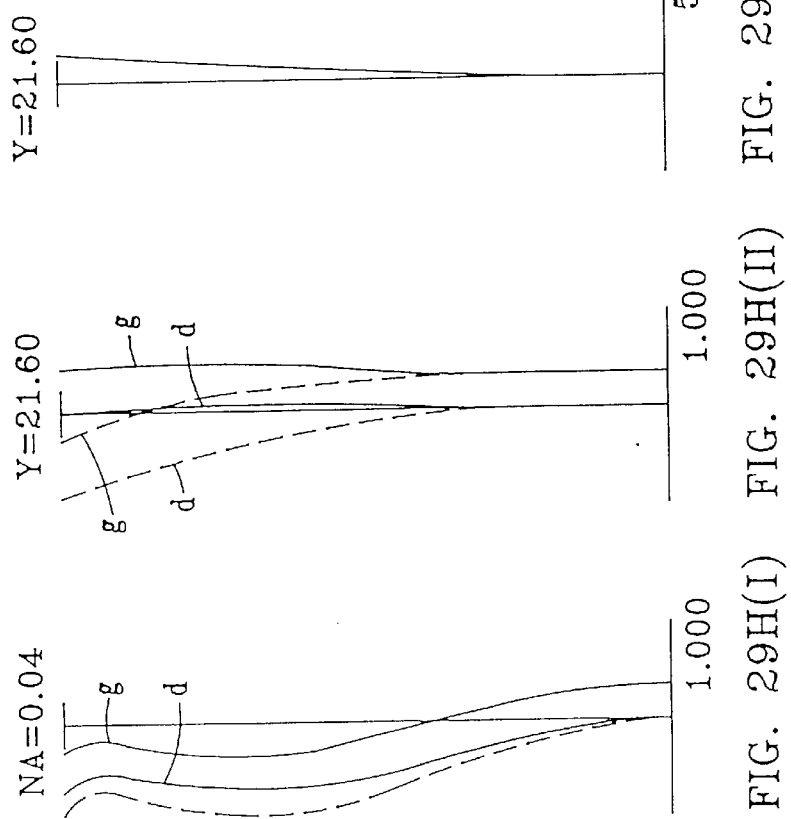
FIG. 29H(I)  FIG. 29H(II)  FIG. 29H(III)
FIG. 29H(IV)

ZOOM LENS SYSTEM

FIELD OF THE INVENTION

The present invention relates to a zoom lens and a lens barrel for the zoom lens.

BACKGROUND OF THE INVENTION

Zoom lens systems, which include a zoom lens and a zoom lens barrel, have recently come into common use in lens-shutter-type cameras. The zoom lens barrel, which controls the zoom lens, alters the focal length of the zoom lens by moving movable lens groups along the zoom lens optical axis with a guiding means, such as a cam, provided at the interior of the zoom lens barrel. In addition, short-distance focusing is achieved by moving a focusing lens group along the optical axis by a focusing drive system, based on an output from a range measurement unit, which detects the location of a photographic subject.

There are three conventional short-distance focusing methods, these being (1) the unison method, wherein the entire lens system moves together, (2) the single-floating-group method, wherein only one of the lens groups is made to move, and (3) the multiple-group method, wherein multiple lens groups move by different amounts. In general, it is common for the unison method and the multiple-group method to be used with unifocal lenses, and for the single-floating-group method to be used for zoom lenses.

A particular short-distance multiple-group focusing method is disclosed in U.S. Pat. No. 2,537,912, and in Japanese Examined Patent Application (Kokoku) No. S45-39875. The method disclosed therein corrects for aberrations produced during short-distance focusing as a result of causing multiple lens groups to move by different amounts.

Also, the zoom lens barrel disclosed at Japanese Unexamined Patent Application (Kokai) No. S60-102437 permits movable lens groups to stop only at prescribed focal length states between the extreme wide-angle positional state and the extreme telephoto positional state. Here, the cam trajectory is set to shorten the distance to the location at which the photographic subject is imaged onto the film surface when the movable lens groups are moved toward the extreme telephoto positional state. This simplifies the control mechanism through elimination of the focusing drive system. However, during short-distance focusing in the extreme telephoto positional state, the total lens length increases when focusing on a nearby object, making this lens barrel unsuitably large for compact cameras.

FIG. 12 shows a schematic representation of the prior art cam trajectory in a zoom lens barrel 320 for a two-group zoom lens (not shown) disclosed at Japanese Patent Application (Kokai) No. S60-102437. In FIG. 12, line A indicates the direction of the motion of the first lens group and line B indicates the direction of the motion of the second lens group. Parameters "a"–"g" indicate the extreme wide angle and extreme telephoto positional states, respectively, of the lens when focused on an object at an "infinite distance," as the term is understood in the art of optics. The parameter "a'"–"g'" indicate the positional states of the lens when carrying out short-distance focusing (SD) from the aforesaid states a through g. Note that in the extreme telephoto positional state (g) there is a tendency for the total lens length to increase quite markedly when changing focus from an infinitely distant object to a nearby object. Accordingly, the total lens length becomes very large when attempting to obtain a closeup shot of a nearby photographic subject (i.e., object).

There are numerous types of zoom lenses suitable for use in combination with zoom lens barrels that result in a low-cost, compact zoom system for lens-shutter type cameras. Lens-shutter-type cameras are superior to single-lens reflex cameras from the standpoint of portability. Also, because the photographic lens is housed within the camera body with lens-shutter-type cameras, reducing the size of the photographic lens will lead to reduction in the size and weight of the camera overall.

Suitable zoom lenses for compact zoom systems are, for example, positive-negative two-group zoom lenses, positive-positive-negative three-group zoom lenses, and so forth. With most zoom lenses, it is easy to achieve a high zoom ratio if the field angle in the extreme wide-angle positional state is narrow. However, this causes the total lens length in the extreme telephoto positional state to be large relative to the image field size (i.e., the length of a diagonal drawn across the image plane). To achieve a zoom lens that is both small in size and possesses a high zoom ratio, it is preferred that the wide-angle state have a wide angular field.

With conventional positive-negative two-group zoom lenses, the first lens group typically comprises a negative subgroup together with a positive subgroup arranged imagewise thereof. Also, the aperture stop is arranged at the image side of the first lens group, and a lens element with a highly concave objectwise surface is located within the negative subgroup. However, it is difficult to satisfactorily correct off-axis aberrations produced by this concave surface, thereby preventing the zoom lens from having a large aperture.

Japanese Unexamined Patent Application (Kokai) No. H5-150161 discloses a zoom lens wherein the aperture stop is located between a negative subgroup and a positive subgroup which make up the second lens group. Furthermore, to correct off-axis aberrations in the extreme wide-angle positional state, either a negative meniscus lens element having an objectwise convex surface or a biconcave lens having a mild objectwise concave surfaces is used as a negative lens element of the second lens group, located nearest the object. However, the refractive power of this lens element is too weak to achieve increased wide-angle performance, and the back-focus distance is inadequate.

Another example of two-group zoom lens for a lens-shutter-type camera is disclosed in Japanese Unexamined Patent Application (Kokai) No. S61-15115. The zoom lens disclosed therein comprises a lens group having positive refractive power, and a lens group having negative refractive power. The image of the photographic subject formed by the first lens group is enlarged by the second lens group. In going from the extreme wide-angle positional state to the extreme telephoto positional state, the lens groups move objectwise, with the distance between the two groups decreasing. An aperture stop is located between the lens groups, and moves together with the first lens group when the positional state of the lens changes.

Multiple-group zoom lenses having three or more movable lens groups (such as positive-positive-negative three-group zoom lenses), allow more freedom in selecting the zooming locus than positive-negative two-group zoom lenses. Thus, they are better suited for achieving a high zoom ratio. Japanese Unexamined Patent Application (Kokai) No. H6-265787 discloses an embodiment of a three-group zoom lens having a reduced number of lens constituents but which still has a high zoom ratio. However, in the zoom lens disclosed therein, the lens thickness of the second lens group is very large, and off-axis light rays passing through the first and third lens groups are far removed from the optical axis. Consequently, it is difficult to achieve the desired reduction in lens diameter.

In addition, zoom lenses such as the positive-positive-negative three-group zoom lens disclosed at Japanese Unexamined Patent Application (Kokai) No. H2-135312, and the positive-negative-positive-negative four-group zoom lens disclosed at Japanese Unexamined Patent Application (Kokai) No. H3-39920, for example, are also known. In these zoom lenses, the first lens group has negative refractive power and the aperture stop is located adjacent the first lens group on the object side. The aperture stop and the first lens group move objectwise such that the distance between the aperture stop and the first lens group decreases when going from the extreme wide- angle positional state to the extreme telephoto positional state. Also, shortening of the total lens length is achieved as a result of the distribution of positive and negative refractive power throughout the lens system. Furthermore, by shortening the back-focal distance in the extreme wide-angle positional state and causing off-axis light rays passing through the negative lens group(s) to recede from the optical axis, the exit pupil is brought closer to the image plane. This allows the lens diameter of the negative lens group(s) to be enlarged. Also, there is independent correction of on-axis and off-axis aberrations. Thus, increasing the size of the change in back focal distance causes a large change in the height at which off-axis light rays pass through the negative lens group(s) when zooming. This permits correction of off-axis aberrations produced when zooming.

SUMMARY OF THE INVENTION

The present invention relates to lens systems, in particular to stepped-zoom (i.e., varifocal zoom) zoom lenses and lens barrels for same. The zoom lens barrel of the present invention houses a zoom lens possessing a plurality of movable lens groups, and guide means to guide the movable lens groups along the optical axis to prescribed positional states corresponding to certain focal lengths exist from an extreme wide-angle positional state to the extreme telephoto positional state. The zoom lens system of the present invention is such that total zoom lens length is not excessively long even when focusing on an object a short distance away. Also, the zoom lens system has good lens-positioning precision, and lends itself to small size and low cost.

A guide means, such as a cam, permits the movable lens groups comprising the zoom lens retained within the lens barrel to stop at at least three positions each defining a "state" of the zoom lens (hereinafter "positional states"). These states are preferably an extreme wide-angle positional state, an intermediate focal length positional state, and an extreme telephoto positional state. The intermediate focal length positional state is located between the extreme wide-angle positional state and the extreme telephoto positional state. An image of a photographic subject (i.e., object) located at an infinite distance is maintained substantially at a prescribed location (e.g., at the film plane) for each the positional state of the zoom lens. When in the extreme telephoto positional state, the movable lens groups move imagewise when focus is adjusted from infinite distance to short distance. In this case, the total lens length does not become large and it is pqssible to maintain a small size for the system overall.

A first aspect of the invention is a zoom lens system which comprises a zoom lens barrel and a zoom lens. The zoom lens is capable of imaging an object and has one or more lens groups each of which is movable along an optical axis. The zoom lens barrel that houses the zoom lens is capable of moving one or more of the movable lens groups into three or more positional states. The positional states include an extreme wide-angle positional state, an extreme telephoto positional state and an intermediate positional state located there between.

A guiding means, such as a cam, is provided for guiding one or more of the movable lens groups along the optical axis such that the one or more movable lens groups may stop at any one of the three or more positional states. The movement of the movable lens groups is such that in any of the three or more positional states, the image of an object located at infinity is maintained at a substantially fixed position. To achieve a focused image, at least one of the movable lens groups is moved along the optical axis. Moreover, in at least the extreme telephoto positional state, short-distance focus is achieved by moving at least one of the movable lens groups towards the image.

In another aspect of the invention, the zoom lens of the zoom lens system includes a negative lens group located closest to the image and which moves towards the object when one or more of the lens groups moves from the extreme wide-angle positional state to the extreme telephoto positional state.

In a further aspect of the invention, in the zoom lens described above, all of the lens groups located objectwise of the negative lens group have a combined refractive power that is overall positive and have a combined focal length $f_a$. Further, the negative lens group itself has a focal length $f_b$ and the overall focal length of the zoom lens in the extreme telephoto positional state is $f_t$. Further, the design condition $$0.1 < (f_a \cdot |f_b|)^{1/2}/f_t < 1.0$$

is satisfied.

In another aspect of the present invention, the zoom lens system includes a zoom lens capable of forming an image of an object over a range of positional states. The zoom lens comprises, objectwise to imagewise, along an optical axis a first lens group having positive refractive power and being movable along the optical axis. Next is a second lens group having positive refractive power and including a most imagewise lens element having a most imagewise surface that is aspheric. The second lens group is movable along the optical axis and is separated from the first lens group by a first axial distance. Next is a third lens group having a negative refractive power and being movable along the optical axis. The third lens group is separated from the second lens group by a second axial distance. The zoom lens system is configured such that when the positional state of the lens changes from an extreme wide-angle positional state to an extreme telephoto positional state, the three lens groups move objectwise such that the first axial distance increases and the second axial distance decreases. Moreover, an aperture stop is located between the first and second lens groups. In addition, the lens preferably satisfies the design condition $$0.35 < D2A/f_w < 0.55$$

wherein D2A is the distance along the optical axis from the aperture stop to the most imagewise lens surface of the second lens group and $f_w$ is the focal length of the zoom lens in the extreme wide-angle positional state.

In another preferred embodiment of the present invention, the above-described zoom lens includes a negative lens element having an objectwise surface with a radius of curvature RN1 and an imagewise surface with a radius of curvature RN2, which is located immediately adjacent to the aperture stop on the image side. The second lens group also includes a positive lens element having an objectwise surface with a radius of curvature RP1 and an imagewise surface with a radius of curvature RP2. This positive lens element is the most imagewise lens element of the second lens group. In addition, the zoom lens preferably satisfies at least one of the following design conditions $$-0.60 < (RN1-RN2)/(RN1+RN2) < -0.05$$

$$0.2 < (RP1+RP2)/(RP1-RP2) < 0.7.$$

In another aspect of the present invention, the zoom lens system of the present invention includes a zoom lens capable of forming an image of an object over a range of positional states. The zoom lens comprises objectwise to imagewise along an optical axis a first lens group having positive refractive power and being movable along the optical axis. Next is a second lens group having positive refractive power and being movable along the optical axis wherein the second lens group includes, objectwise to imagewise a biconcave lens element and a cemented positive lens. The second lens group is separated from the first lens group by a first axial distance. Next is a third lens group having negative refractive power and being movable along the optical axis. The third lens group is separated from the second lens group by a second axial distance. When the positional state of the lens changes from an extreme wide-angle positional state to an extreme telephoto positional state, the lens groups move objectwise such that the first axial distance increases and the second axial distance decreases. This zoom lens also preferably satisfies at least one of design conditions (6)–(11), set forth below.

BRIEF DESCRIPTION OF THE DRAWINGS

FIGS. 15A(I)–15A(IV) are plots of spherical aberration, astigmatism, distortion, and coma, respectively, for Working Example 4, at the extreme wide-angle positional state, focused at infinite distance;

FIGS. 15B(I)–15B(IV) are plots of spherical aberration, astigmatism, distortion, and coma, respectively, for Working Example 4, at a first intermediate positional state, focused at infinite distance;

FIGS. 15C(I)–15C(IV) are plots of spherical aberration, astigmatism, distortion, and coma, respectively, for Working Example 4, at a second intermnediate positional state, focused at infinite distance;

FIGS. 15D(I)–15D(IV) are plots of spherical aberration, astigmatism, distortion, and coma, respectively, for Working Example 4, at the extreme telephoto positional state, focused at infinite distance;

FIGS. 17A(I)–17A(IV) are plots of spherical aberration, astigmatism, distortion, and coma, respectively, for Working Example 5, at the extreme wide-angle positional state, focused at infinite distance;

FIGS. 17B(I)–17B(IV) are plots of spherical aberration, astigmatism, distortion, and coma, respectively, for Working Example 5 at a first intermediate positional state, focused at infinite distance;

FIGS. 17C(I)–17C(IV) are plots of spherical aberration, astigmatism, distortion, and coma, respectively, for Working Example 5, at a second intermediate positional state, focused at infinite distance;

FIGS. 17D(I)–17D(IV) are plots of spherical aberration, astigmatism, distortion, and coma, respectively, for Working Example 5, at the extreme telephoto positional state, focused at infinite distance;

FIGS. 19A(I)–19A(IV) are plots of spherical aberration, astigmatism, distortion, and coma, respectively, for Working Example 6, at the extreme wide-angle positional state, focused at infinite distance;

FIGS. 19B(I)–19B(IV) are plots of spherical aberration, astigmatism, distortion, and coma, respectively, for Working Example 6 at a first intermediate positional state, focused at infinite distance;

FIGS. 19C(I)–19C(IV) are plots of spherical aberration, astigmatism, distortion, and coma, respectively, for Working Example 6, at a second intermediate positional state, focused at infinite distance;

FIGS. 19D(I)–19D(IV) are plots of spherical aberration, astigmatism, distortion, and coma, respectively, for Working Example 6, at the extreme telephoto positional state, focused at infinite distance;

FIGS. 21A(I)–21A(IV) are plots of spherical aberration, astigmatism, distortion, and coma, respectively, for Working Example 7, at the extreme wide-angle positional state, focused at infinite distance;

FIGS. 21B(I)–21B(IV) are plots of spherical aberration, astigmatism, distortion, and coma, respectively, for Working Example 7 at a first intermediate positional state, focused at infinite distance;

FIGS. 21C(I)–21C(IV) are plots of spherical aberration, astigmatism, distortion, and coma, respectively, for Working Example 7, at a second intermediate positional state, focused at infinite distance;

FIGS. 21D(I)–21D(IV) are plots of spherical aberration, astigmatism, distortion, and coma, respectively, for Working Example 7, at the extreme telephoto positional state, focused at infinite distance;

FIGS. 23A(I)–23A(IV) are plots of spherical aberration, astigmatism, distortion, and coma, respectively, for Working Example 8, at the extreme wide-angle positional state, focused at infinite distance;

FIGS. 23B(I)–23B(IV) are plots of spherical aberration, astigmatism, distortion, and coma, respectively, for Working Example 8, at a first intermediate positional state, focused at infinite distance;

FIGS. 23C(I)–23C(IV) are plots of spherical aberration, astigmatism, distortion, and coma, respectively, for Working Example 8, at a second intermediate positional state, focused at infinite distance;

FIGS. 23D(I)–23D(IV) are plots of spherical aberration, astigmatism, distortion, and coma, respectively, for Working Example 8, at the extreme telephoto positional state, focused at infinite distance;

FIGS. 23E(I)–23E(IV) are plots of spherical aberration, astigmatism, distortion, and coma, respectively, for Working Example 8, at the extreme wide-angle positional state, focused at short distance;

FIGS. 23F(I)–23F(IV) are plots of spherical aberration, astigmatism, distortion, and coma, respectively, for Working Example 8, at a first intermediate positional state, focused at short distance;

FIGS. 23G(I)–23G(IV) are plots of spherical aberration, astigmatism, distortion, and coma, respectively, for Working Example 8, at a second intermediate positional state, focused at infinite distance;

FIGS. 23H(I)–23H(IV) are plots of spherical aberration, astigmatism, distortion, and coma, respectively, for Working Example 8, at the extreme telephoto positional state, focused at a short distance;

FIGS. 25A(I)–25A(IV) are plots of spherical aberration, astigmatism, distortion, and coma, respectively, for Working Example 9, at the extreme wide-angle positional state, focused at infinite distance;

FIGS. 25B(I)–25B(IV) are plots of spherical aberration, astigmatism, distortion, and coma, respectively, for Working Example 9, at a first intermediate positional state, focused at infinite distance;

FIGS. 25(I)–25C(IV) are plots of spherical aberration, astigmatism, distortion, and coma, respectively, for Working Example 9, at a second intermediate positional state, focused at infinite distance;

FIGS. 25D(I)–25D(IV) are plots of spherical aberration, astigmatism, distortion, and coma, respectively, for Working Example 9, at the extreme telephoto positional state, focused at infinite distance;

FIGS. 25E(I)–25E(IV) are plots of spherical aberration, astigmatism, distortion, and coma, respectively, for Working Example 9, at the extreme wide-angle positional state, focused at short distance;

FIGS. 25F(I)–25F(IV) are plots of spherical aberration, astigmatism, distortion, and coma, respectively, for Working Example 9, at a first intermediate positional state, focused at short distance;

FIGS. 25G(I)–25G(IV) are plots of spherical aberration, astigmatism, distortion, and coma, respectively, for Working Example 9, at a second intermediate positional state, focused at infinite distance;

FIGS. 25H(I)–25H(IV) are plots of spherical aberration, astigmatism, distortion, and coma, respectively, for Working Example 9, at the extreme telephoto positional state, focused at short distance;

FIGS. 27A(I)–27A(IV) are plots of spherical aberration, astigmatism, distortion, and coma, respectively, for Working Example 10, at the extreme wide-angle positional state, focused at infinite distance;

FIGS. 27B(I)–27B(IV) are plots of spherical aberration, astigmatism, distortion, and coma, respectively, for Working Example 10, at a first intermediate positional state, focused at infinite distance;

FIGS. 27C(I)–27C(IV) are plots of spherical aberration, astigmatism, distortion, and coma, respectively, for Working Example 10, at a second intermediate positional state, focused at infinite distance;

FIGS. 27D(I)–27D(IV) are plots of spherical aberration, astigmatism, distortion, and coma, respectively, for Working Example 10, at the extreme telephoto positional state, focused at infinite distance;

FIGS. 27E(I)–27E(IV) are plots of spherical aberration, astigmatism, distortion, and coma, respectively, for Working Example 10, at the extreme wide-angle positional state, focused at short distance;

FIGS. 27F(I)–27F(IV) are plots of spherical aberration, astigmatism, distortion, and coma, respectively, for Working Example 10, at a first intermediate positional state, focused at short distance;

FIGS. 27G(I)–27G(IV) are plots of spherical aberration, astigmatism, distortion, and coma, respectively, for Working Example 10, at a second intermediate positional state, focused at infinite distance;

FIGS. 27H(I)–27H(IV) are plots of spherical aberration, astigmatism, distortion, and coma, respectively, for Working Example 10, at the extreme telephoto positional state, focused at infinite distance;

FIGS. 29A(I)–29A(IV) are plots of spherical aberration, astigmatism, distortion, and coma, respectively, for Working Example 11, at the extreme wide-angle positional state, focused at infinite distance;

FIGS. 29B(I)–29B(IV) are plots of spherical aberration, astigmatism, distortion, and coma, respectively, for Working Example 11, at a first intermediate positional state, focused at infinite distance;

FIGS. 29C(I)–29C(IV) are plots of spherical aberration, astigmatism, distortion, and coma, respectively, for Working Example 11, at a second intermediate positional state, focused at infinite distance;

FIGS. 29D(I)–29D(IV) are plots of spherical aberration, astigmatism, distortion, and coma, respectively, for Working Example 11, at the extreme telephoto positional state, focused at infinite distance;

FIGS. 29E(I)–29E(IV) are plots of spherical aberration, astigmatism, distortion, and coma, respectively, for Working Example 11, at the extreme wide angle positional state, focused at short distance;

FIGS. 29F(I)–29F(IV) are plots of spherical aberration, astigmatism, distortion, and coma, respectively, for Working Example 11, at a first intermediate positional state, focused at short distance;

FIGS. 29G(I)–29G(IV) are plots of spherical aberration, astigmatism, distortion, and coma, respectively, for Working Example 11, at a second intermediate positional state, focused at infinite distance; and FIGS. 29H(I)–29H(IV) are plots of spherical aberration, astigmatism, distortion, and coma, respectively, for Working Example 11, at the extreme telephoto positional state, focused at infinite distance.

DETAILED DESCRIPTION OF THE INVENTION

Figure 1:
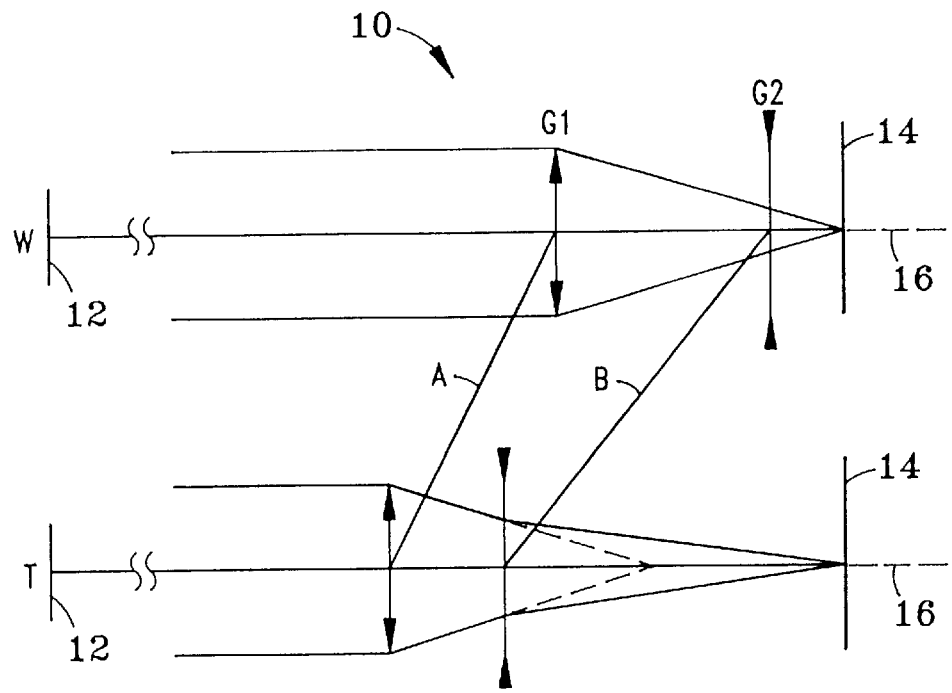
FIG. 1 is a schematic optical diagram of the lens groups comprising a two-group zoom lens of the present invention, wherein lines A and B indicated motion of the lens groups from the extreme wide-angle positional state (W) to the extreme telephoto positional state (T)

The present invention relates to lens systems, in particular to zoom lenses and lens barrels for same. The zoom lens barrel of the present invention houses a zoom lens possessing a plurality of movable lens groups, and guide means to guide the movable lens groups along the optical axis to prescribed positional states corresponding to certain focal lengths exist from an extreme wide-angle positional state to the extreme telephoto positional state. The zoom lens system of the present invention is such that total zoom lens length is not excessively long even when focusing on an object a short distance away. Also, the zoom lens system has good lens-positioning precision, and lends itself to small size and low cost.

A guide means, such as a cam, permits the movable lens groups comprising the zoom lens retained within the lens barrel to stop at at least three positions each defining a "state" of the zoom lens (hereinafter "positional states"). These states are preferably an extreme wide positional angle state, an intermediate focal length positional state, and an extreme telephoto positional state. The intermediate focal length positional state is located between the extreme wide-angle positional state and the extreme telephoto positional state. An image of a photographic subject (i.e., object) located at an infinite distance is maintained substantially at a prescribed location (e.g., at the film plane) for each the positional state of the zoom lens. When in the extreme telephoto positional state, the movable lens groups move imagewise when focus is adjusted from infinite distance to short distance. In this case, the total lens length does not become large and it is possible to maintain a small size for the system overall.

Typically, the lens barrel of a zoom lens system has a cylindrical in shape, and a portion of the lens barrel is made to rotate over a certain angular displacement, thereby causing one or more lens groups to move along the optical axis. In the present invention, to facilitate control of the several lens groups, it is preferred that a prescribed lens group always move by a more or less constant amount (i.e., linearly) along the optical axis in response to a prescribed amount of rotation of the lens barrel. However, in the zoom lens barrel of the present invention, the size of the change in focal length between adjacent positional states of the lens (when focused on an object at an infinite distance) grows larger as the positional state of the lens is changed from the extreme wide-angle positional state to the extreme telephoto positional state. The result is that the amount of driving motion delivered from a drive motor to the lens barrel will also increase.

In most conventional optical systems (including cameras), the focal length f, the image height y, and the angular field of view θ are related by the equation:

$$y = f \cdot \tan \theta \qquad [\text{Eq. 1}]$$

Equation 1 indicates that there will be a larger change in angular field of view θ as a result of change in focal length f when focal length f is short than when focal length f is long. As hotographic range is determined by the angular field of view, the lens barrel of the present invention is such that the change in field angle θ is more or less constant as the positional state of the lens changes. Also, the change in focal length between adjacent positional states of the lens will grow progressively larger from the extreme wide-angle (i.e., shortest focal length) positional state to the extreme telephoto (i.e., longest focal length) positional state.

Next, the properties and characteristics of preferred zoom lenses for use in the zoom lens system of the present invention are described. (Specific embodiments and Working Examples are discussed in detail, below). Because portability is considered important for lens-shutter-type cameras, it is important that the size of the camera body be small. Accordingly, the lens diameter must be small and total lens length must be short. To this end, the zoom lenses of the present invention include a most imagewise negative lens element, and all of the lens groups move when going from the extreme wide-angle positional state to the extreme telephoto positional state. This allows for a small total lens size and makes it possible to correct aberrations.

One preferred type of zoom lens suitable for the zoom lens system of the present invention is a positive-negative two-group zoom lens. An aperture stop is located adjacent the first lens group on the image side, and moves together with the first lens group when zooming. In this type of zoom lens, if the maximum diameter of the aperture stop stays the same, then the depth of focus will be more or less constant regardless of the positional state of the lens. However, with multiple-group zoom lenses possessing three or more movable lens groups, there is a tendency for the change in F-number to be less than what would normally be expected from the change in focal length, and for depth of focus in the extreme telephoto positional state to be smaller relative to that in the extreme wide-angle positional state. Thus, the amount of lens movement necessary to obtain a given level of imaging performance is a function of the depth of focus. Accordingly, it is desirable with multiple-group stepped-zoom zoom lenses that the amount by which a drive motor is driven to obtain a given amount of lens travel (via rotation of the lens barrel) during short-distance focusing be increased in correspondence to the increase in the number of steps in the extreme telephoto positional state. A key aspect of the present invention is that, when the zoom lens system is in the extreme telephoto positional state, short-distance focusing is accomplished by causing multiple lens groups of the zoom lens to move imagewise.

FIG. 1 shows a zoom lens 10 which is retained by the zoom lens barrel (not shown) of the present invention. Zoom lens 10 includes, from object plane 12 to image plane 14 along optical axis 16, a lens group G1 having positive refractive power and a lens group G2 having negative refractive power. The focal length of zoom lens 10 increases in going from the extreme wide-angle positional state W to the extreme telephoto positional state T by moving the lens groups objectwise side along the paths indicated by A and B. Note that the distance between lens group G1 and lens group G2 decreases in going from W to T.

The refractive power $\phi$ of zoom lens 10 is given by:

$$\phi = \phi_1 + \phi_2 - d \cdot \phi_1 \cdot \phi_2 \qquad [\text{Eq. 2}]$$

where $\phi_1$ is the refractive power of lens group G1, $\phi_2$ is the refractive power of lens group G2, and d is the distance between the principal points (not shown) of lens groups G1 and G2. Accordingly, the infinitesimal change $\Delta\phi/\Delta d$ in refractive power resulting from an infinitesimal change in the distance between lens groups will be:

$$\Delta\phi/\Delta d = -\phi_1 \cdot \phi_2 \qquad [\text{Eq. 3}]$$

For comparatively small changes in distance d, the change in focal length is roughly the same as the change in the location of the image plane. Thus, there will be a large change in the location of the image plane when the refractive powers of lens group G1 and lens group G2 are large.

In the present invention, $\phi_1 > \phi$ and $|\phi_2| > \phi$. Thus, there is a large change in the location of the image plane, so that it is possible to move lens group G2 to change the distance d to cancel out the change in location of the image plane produced when lens group G1 moves imagewise. The same is true for objectwise movement.

In contrast to this, in the zoom lens disclosed at Japanese Examined Patent Application (Kokoku) No. S45-39875, the distance between lens groups is such that light rays between the lens groups are nearly parallel with the optical axis. This distance is varied with object distance to cancel out aberrations produced during short-distance focusing. Accordingly, the refractive power of the objectwise subgroup is nearly zero, and the variation in the location of the image plane occurring as a result of the change in distance d is extremely small. Thus, this zoom lens permits short-distance focusing to be carried out only when the lens groups are moved objectwise.

From the foregoing, to allow short-distance focusing by moving the lens groups imagewise, it is desirable to split the zoom lens into two subgroups having refractive powers of differing sign, and to cause these subgroups to move by different amounts during short-distance focusing.

Figure 2:
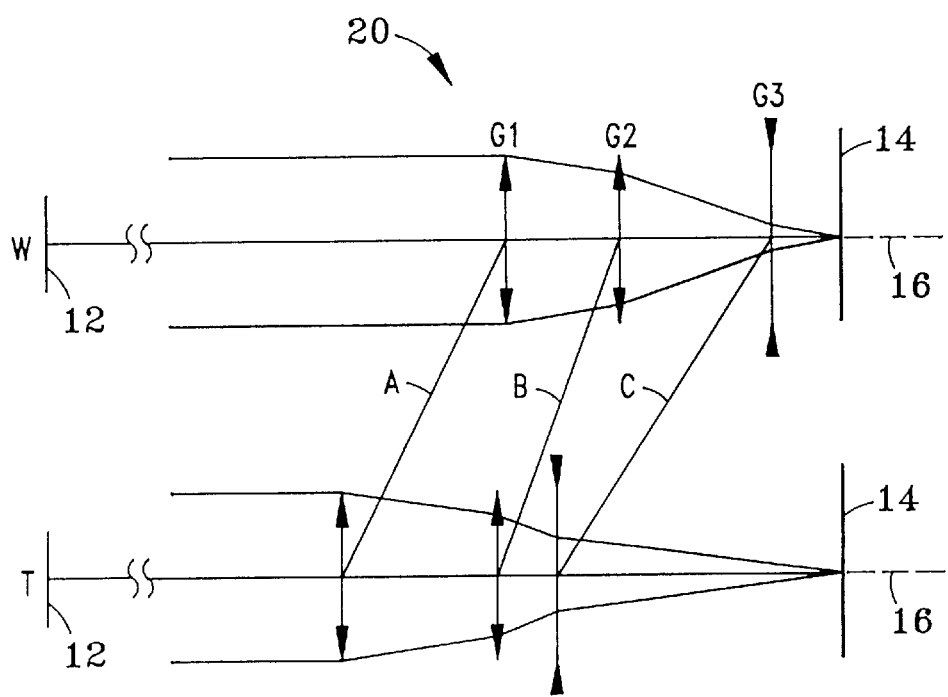
FIG. 2 is a schematic optical diagram of the lens groups comprising a three-group zoom lens of the present invention, wherein lines A, B and C indicated motion of the lens groups from the extreme wide-angle positional state (W) to the extreme telephoto positional state (T)

Referring now to FIG. 2, a zoom lens 20, retained by the zoom lens barrel (not shown) of the present invention, is described. Zoom lens 20 comprises, from object plane 12 to image plane 14 along optical axis 16, a lens group G1 having positive refractive power, lens group G2 having positive refractive power, and lens group G3 having negative refractive power. In addition, in going from the extreme wide-angle positional state W to the extreme telephoto positional state T, lens groups G1–G3 move toward object plane 12 along the paths A, B and C, respectively, such that the distance between lens group G1 and lens group G2 to increases, and the distance between lens group G2 and lens group G3 to decreases. In zoom lens 20, the combined refractive power of the lens group G1 and lens group G2 is strongly positive, and the refractive power of the lens group G3 is strongly negative. Also, short-distance (i.e., approximately 1 m) focusing is performed by changing the distance between the lens group G2 and the lens group G3. Off-axis aberration correction produced during short-distance focusing is achieved by changing the distance between lens group G1 and lens group G2.

As described above, it is possible, with certain positive-negative two-group zoom lenses and certain positive-positive-negative three-group zoom lenses, to carry out short-distance focusing by moving the several lens groups imagewise. Furthermore, application of the present invention is not limited to positive-negative two-group zoom lenses and positive-positive-negative three-group zoom lenses, but it can also be applied to positive-negative-positive-negative four-group zoom lenses or negative-positive-negative three-group zoom lenses, or positive-negative-positive-positive-negative five-group zoom lenses or any other zoom lens configuration wherein the imagewise negative lens group moves objectwise when the zoom lens goes from the extreme wide-angle positional state to the extreme telephoto positional state.

In the present invention, the zoom lens barrel incorporating a zoom lens of the type described above, is such that during short-distance focusing the lens barrel is driven to cause the most imagewise negative lens group to move objectwise in the extreme wide-angle positional state, and imagewise in the extreme telephoto positional state. As a result, the amount by which the most imagewise negative lens group moves when the lens barrel is driven by a prescribed amount will be reduced, increasing the positioning precision of the lens, and permitting a reduction in total lens length during short-distance focusing in the extreme telephoto positional state.

Figure 3:
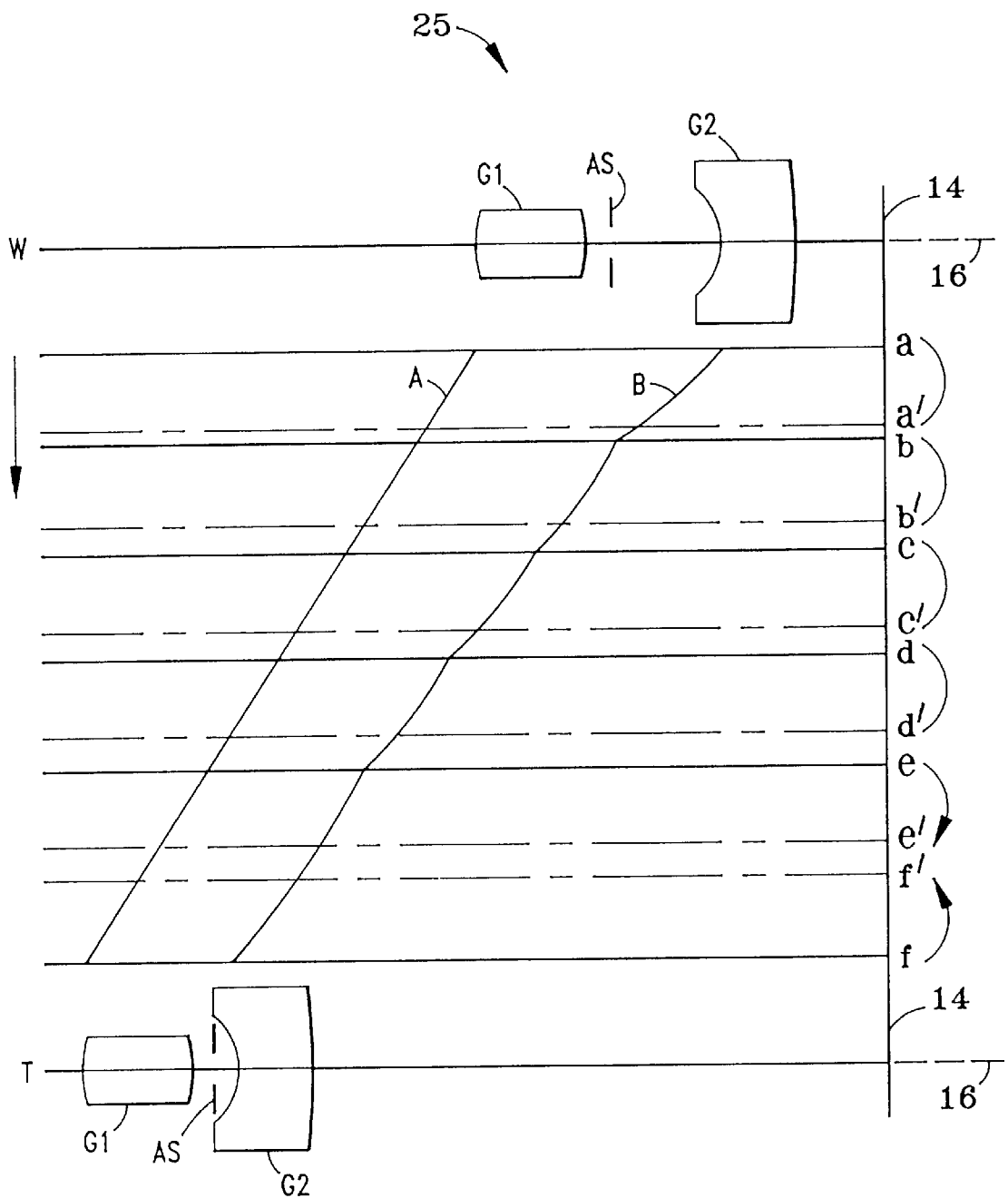
FIG. 3 is a schematic optical diagram of the lens groups comprising a two-group zoom lens of the present invention, wherein lines A and B indicated motion of the lens groups from the extreme wide-angle positional state (W) to the extreme telephoto positional state (T), and the parameters a–f and a'–f' represent the positional states for focus at an infinite distance and short distance, respectively.

Now described below are several preferred embodiments of the zoom lens system of the present invention. With reference to FIG. 3, the direction of motion for a two-group zoom lens 25 when retained by a zoom lens barrel (not shown) in a first preferred embodiment of the present invention is shown. Zoom lens 25 has the same essential elements as zoom lens 10 in FIG. 1, and further includes an aperture stop AS between lens groups G1 and G2. Aperture stop AS serves the twin functions of diaphragm and shutter element. The positional relationship of lens group G1 and lens group G2 when in the extreme wide-angle positional state is W and in the extreme telephoto positional state is, with T intermediate focal states in between. The motion of lens group G1 is indicated by A and the motion of lens group G2 is indicated by B.

With continuing reference to FIG. 3, the parameters "a" through "f" indicate the positional states of the lens when focused on an object at an infinite distance, at which zoom lens 10 can stop in going from the extreme wide-angle positional state to the extreme telephoto positional state. The parameters "a'" through "f'" indicate the positional states of zoom lens 10, at which zoom lens 10 can stop in going from the extreme wide-angle positional state to the extreme telephoto positional state when focused on a short-distance object.

Figure 4A:
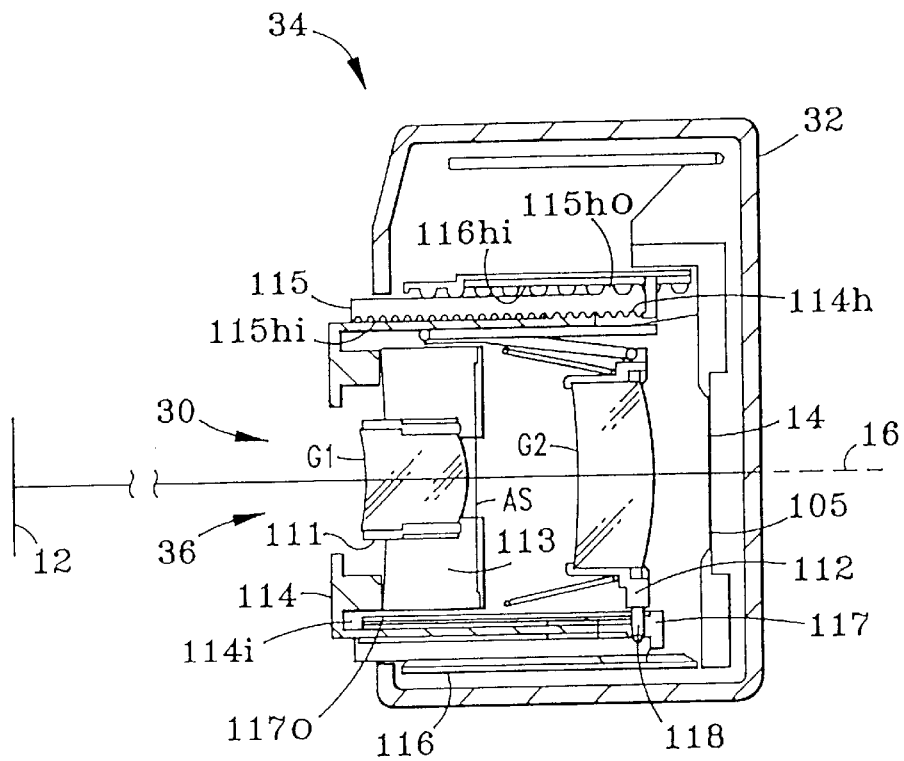
FIGS. 4a–4b is a cross-sectional view of a camera incorporating the zoom lens system of the present invention, which includes a zoom lens similar to that shown in FIG. 3.
Figure 4B:
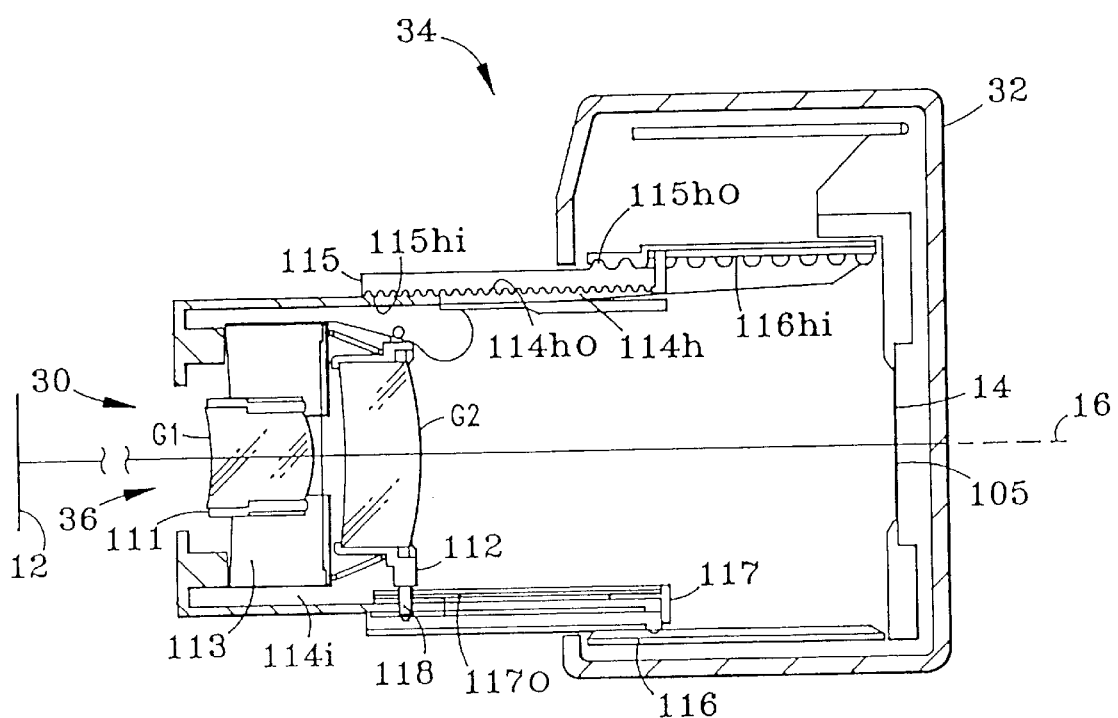

FIGS. 4(a) and 4(b) are sectional view showing a zoom lens system 30 incorporated in a camera body 32 of a camera 34. Zoom lens system 30 includes a zoom lens 36 similar to zoom lens 25 of FIG. 3. FIG. 4(a) shows zoom lens system 30 in the extreme wide-angle positional state, and FIG. 4(b) shows zoom lens system 30 in the extreme telephoto positional state. Zoom lens 36 comprises, from object plane 12 to image plane 14 along optical axis 16, a lens group G1 having positive refractive power, and a lens group G2 having negative refractive power. An aperture stop AS serves the twin functions of diaphragm and shutter element. In addition, a photographic film plane 105 is shown to be co-planar with image plane 14. A first lens holder 111 retains lens group G1, and a second lens holder 112 retains lens group G2. A shutter unit 113 drives aperture stop AS, which is attached to first lens holder 111. Further, a first lens barrel 114 with a helicoid track 114ho on its outer surface, is attached to shutter unit 113. A second lens barrel 115 surrounds lens barrel 114, and includes on its inner surface an inner helicoid track 115hi and on its outer surface a helicoid track 115ho. Track 115hi mates with a helicoid track 114ho. Holder 116 surrounds holder 115 and includes a helicoid track 116h on its inner surface which mates with helicoid track 115ho. A straight cylinder 117, and three follower pins 118 (only one is shown) are included at the outside diameter of lens holder 112.

A toothed wheel (not shown), through which the driving force of a driving motor (not shown) is delivered, meshes with a gear (not shown) provided at the outside of lens barrel 115. Lens barrel 115 moves along optical axis 16 as it rotates along helicoid track 116hi via the rotation of the toothed wheel. Straight cylinder 117 is restrained from rotating by a detent (not shown) provided at the interior of holder 116. Straight cylinder 117 moves in the direction of the optical axis 16, without rotating, together with lens group G2. Follower pins 118 mate with cam grooves (not shown) at the interior of second lens barrel 115 by way of straight grooves (not shown) provided in straight cylinder 117. Second lens holder 112 moves along the cam grooves, without rotating, in the direction of optical axis 16. First lens barrel 114, wherein a linear female region 114i provided on the interior wall thereof mates with a linear male 117o region provided on the outside diameter of straight cylinder 117, moves in the direction of optical axis 16, without rotating, with the rotation of lens barrel 115.

Figure 5:
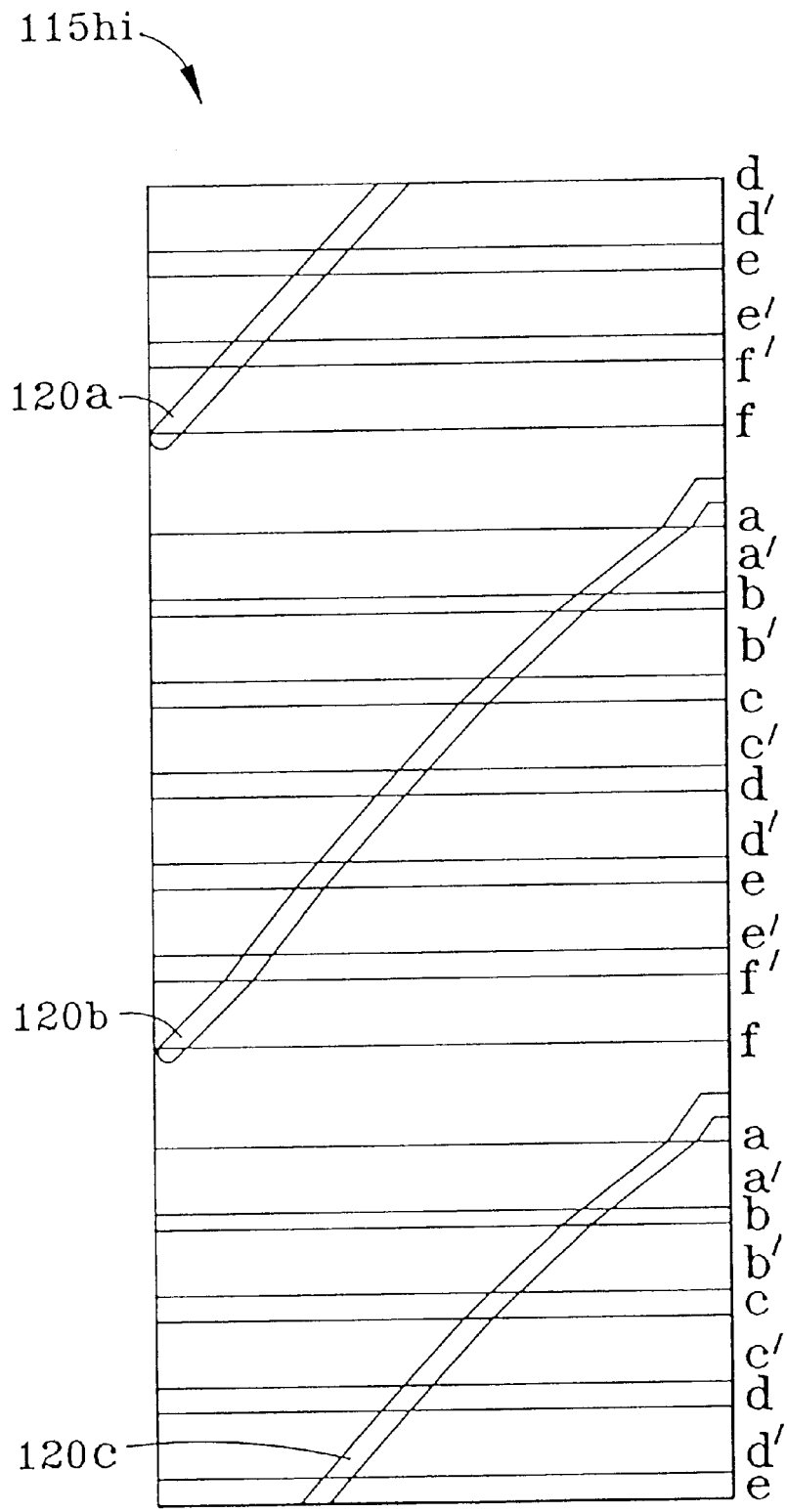
FIG. 5 is a simplified diagram of a portion of the interior wall of the second lens barrel shown in FIG. 4.

With continuing reference to FIGS. 4(a) and 4(b) and FIG. 5, the angular displacement of lens barrel 115 increases in accordance with the change in the positional state of the lens from the extreme wide-angle positional state to the extreme telephoto positional state. FIG. 5 is a simplified diagram of a portion of interior wall 115hi of lens barrel 115. Interior wall 115hi includes cam grooves 120a–120c which guide second lens holder 12 along optical axis 16. Follower pins 118 (see FIG. 4(a)) ride in cam grooves 120a–120c. The parameters a–f and a'–f' correspond to the respective lens positional states, as described above. That is, the positional states of the lens corresponding to a–a', b–b', . . . , f–f' (not shown in FIGS. 4(a) and 4(b)) are the ranges utilized in effecting short-distance focusing at respective lens positional states a–f. Also, as described above, states a' through f' are the states providing the shortest focusing distances. When changing focal length, the lens barrel is made to stop at locations corresponding to positional states a–f (see, e.g., FIG. 3). Moreover, when carrying out short-distance focusing, the lens barrel is made to rotate in the direction of positional states a'–f' from positional states a–f.

Figure 6:
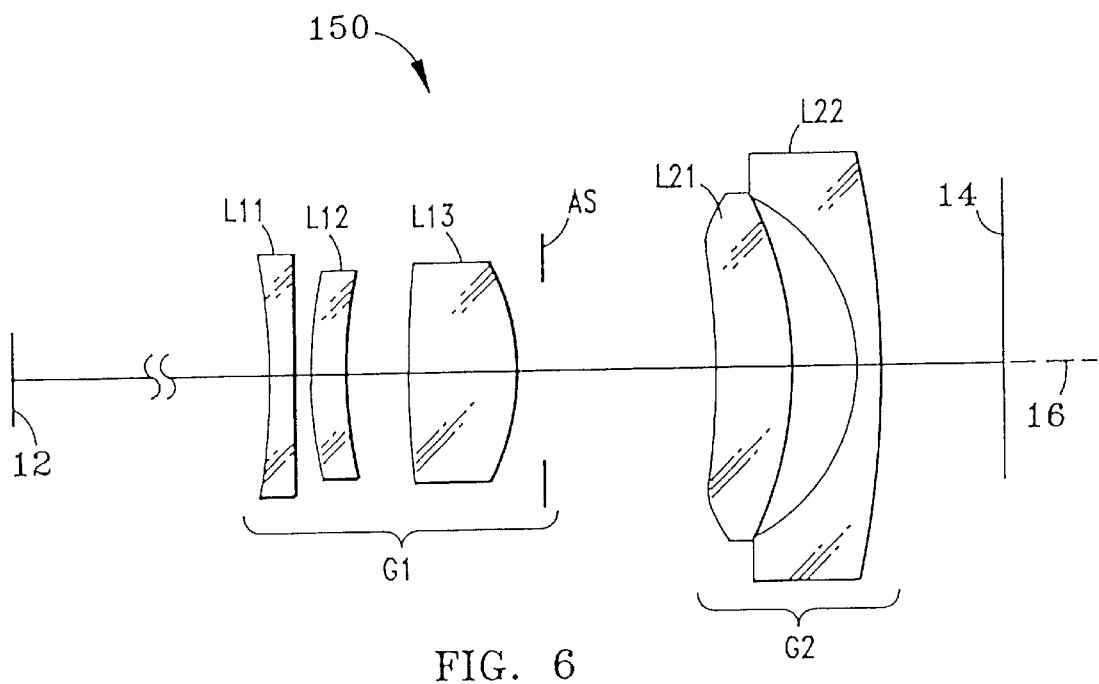
FIG. 6 is an optical diagram of Working Example 1 and is a preferred embodiment for a two-group zoom lens for the zoom lens system of the present invention.

FIG. 6 is a sectional view of an exemplary two-group zoom lens 150 (shown in the extreme wide-angle positional state), as might be included in zoom lens system 130 of FIGS. 4(a) and 4(b). Lens group G1 comprises a negative meniscus lens element L11 having an objectwise concave surface, a positive meniscus lens element L12 having an objectwise convex surface, and a biconvex lens element L13. Lens group G2 comprises a positive meniscus lens element L21 having an objectwise concave surface and a negative meniscus lens element L22 having an objectwise concave surface. An aperture stop AS is located immediately imagewise of lens element L13 and moves together with lens group G1 when the positional state of the lens changes (a specific design for zoom lens 150 is provided in Working Example 1, below).

Figure 7:
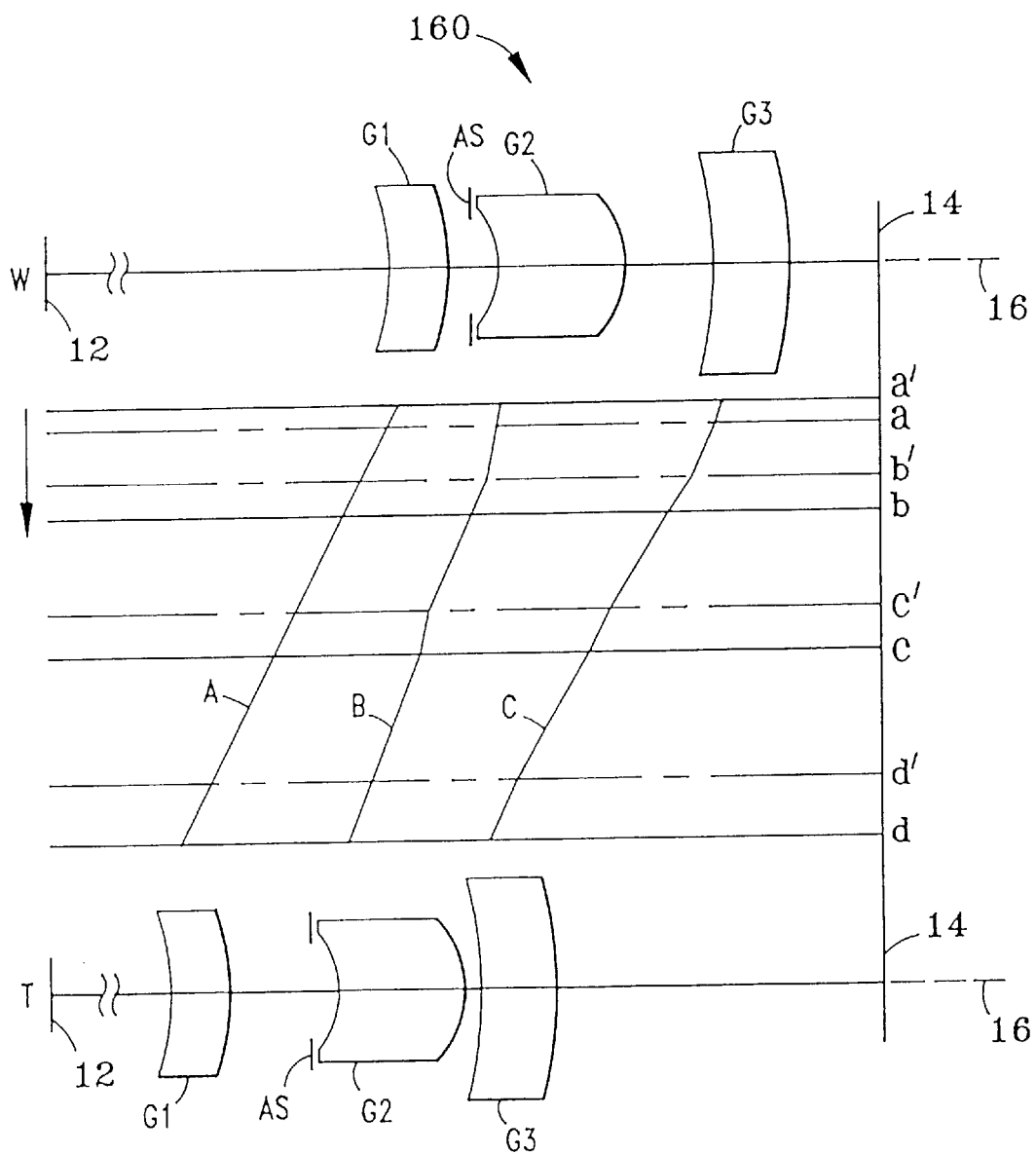
FIG. 7 is a schematic optical diagram of the lens groups comprising a three-group zoom lens of the present invention, wherein lines A, B and C indicated motion of the lens groups from the extreme wide-angle positional state (W) to the extreme telephoto positional state (T), and the parameters a–d and a'–d' represent the positional states for focus at an infinite distance and short distance, respectively.

FIG. 7 shows the directions of motion of a three-group zoom lens 160 as might be included in another preferred embodiment of the zoom lens system present invention. Zoom lens 160 comprises, from object plane 12 to image plane 14 along optical axis 16, a lens group G1 having positive refractive power, a lens group G2 having positive refractive power, a lens group G3 having negative refractive power, and an aperture stop AS. Aperture stop AS, as before, serves the twin functions of diaphragm and shutter element. The positional relationships of the lens groups in the extreme wide-angle positional state is indicated by W, and in the extreme telephoto positional state is indicated by T. The direction of motion of lens group G1 is indicated by A, the direction of motion of lens group G2 is indicated by B, and the direction of motion of lens group G3 is indicated by C.

Also, as discussed above in connection with the first preferred embodiment of the present invention, the parameters "a"–"d" correspond to the positional states of the lens when focused on an object at an infinite distance, at which zoom lens 160 can stop in going from the extreme wide angle state to the extreme telephoto positional state. The parameters "a'"–"d'" correspond to the positional states of the lens, when focused on a short-distance object, at which zoom lens 160 can stop in going from the extreme wide-angle positional state to the extreme telephoto positional state. Angular displacement of the lens barrel increases in accordance with the change in the positional state of the lens from position a to position d. That is, the position states of the lens corresponding to a–a', b–b', c–c', d–d' are the ranges utilized in effecting short-distance focusing at lens positional states a, b, c and d, respectively.

Figure 8A:
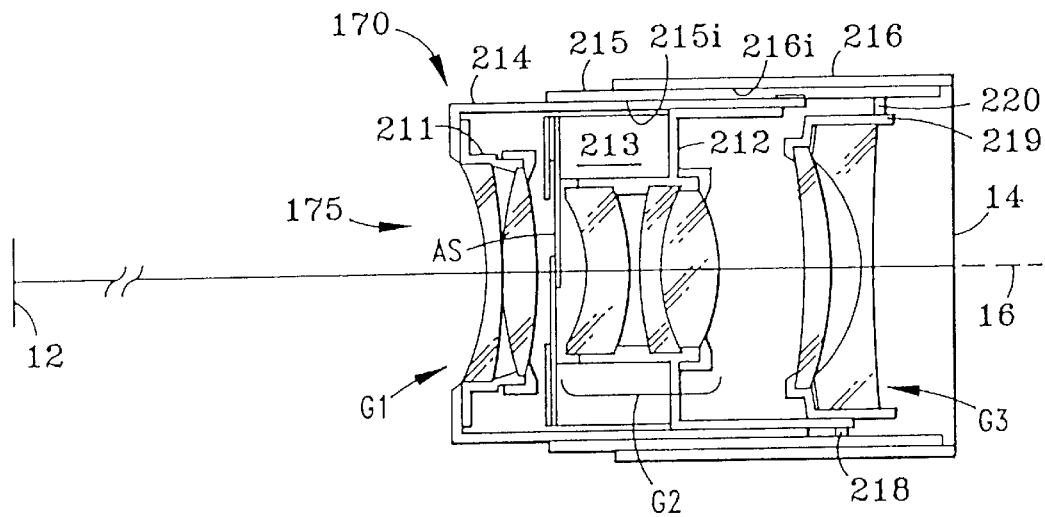
FIGS. 8a–8c are cross-sectional views, in different positional states, of a zoom lens system of the present invention, which includes a three-group zoom lens similar to that shown in FIG. 7.
Figure 8B:
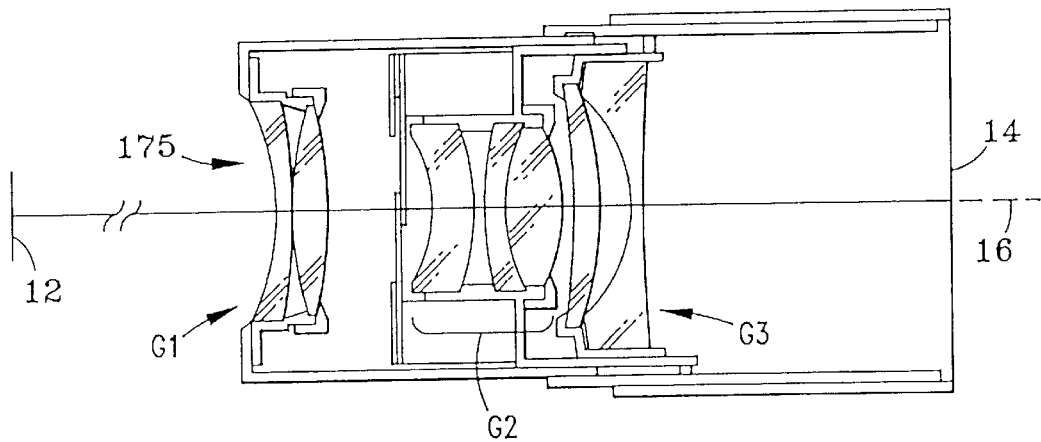
Figure 8C:
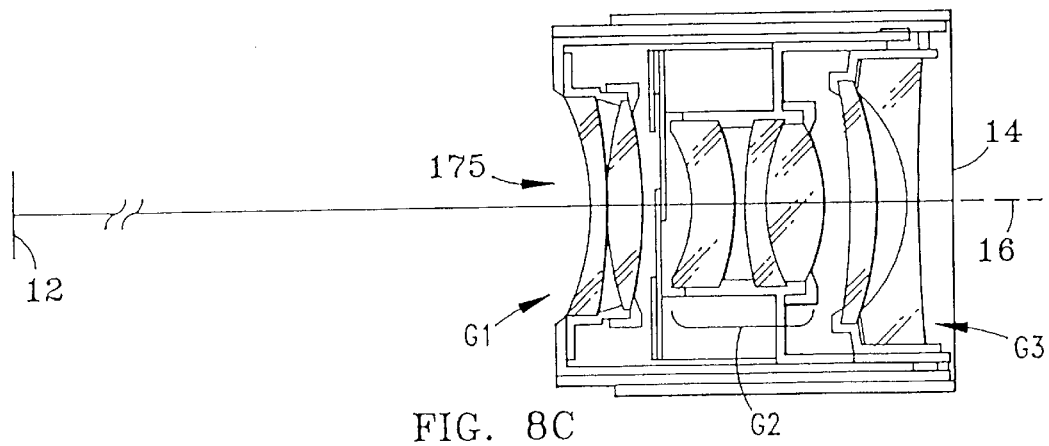

FIGS. 8a–8c show sectional views of a zoom lens system 170 according to a second preferred embodiment of the present invention. Zoom lens system 170 includes a zoom lens 175, which is a specific embodiment of zoom lens 160 shown in FIG. 7. FIG. 8a shows zoom lens system 170 in the extreme wide-angle positional state, FIG. 8b shows zoom lens system 170 in extreme telephoto positional state, and FIG. 8c shows zoom lens system 170 in a fully retracted state, which is assumed during storage.

Zoom lens system 170 includes a first lens holder 211 which retains lens group G1, and a second lens holder 212 which retains lens group G2. A shutter unit 213 drives aperture stop (i.e., shutter) AS and is attached to lens holder 212. Shutter unit 213 is attached to a moveable lens barrel 214 surrounding lens holders 211 and 212. A rotating lens barrel 215 surrounds lens barrel 214 is also included, and has a helicoid track (not shown) provided on its inner surface 215i which mates with a helicoid track (not shown) on the outer surface of lens barrel 214. A holder 216 surrounds lens barrel 215 and includes a helicoid track (not shown) on its inner surface 216i which mates with a helicoid track (not shown) on the outer surface of lens barrel 215. Three follower pins 218 (only one is shown) are provided at the outside of lens holder 212. A third lens holder 219 retains lens group G3. Three follower pins 220 (only one is shown) are provided at the outside of third lens holder 219.

A toothed wheel (not shown), through which the driving force of a motor (not shown) is delivered, meshes with a gear (not shown) provided at the outside of lens barrel 215. Rotation of lens barrel 215 via rotation of the toothed wheel causes lens barrel 214 to advance along optical axis 16 as it rides along the helicoid track on the interior wall of lens barrel 215, while being restrained from rotating by straight grooves (not shown) provided at the outside diameter of second lens holder 212. Follower pins 218 and 220 mate with the straight grooves provided at the interior of holder 216 by way of cam grooves (not shown) provided in the inner surface of 215i of lens barrel 215, and move in the direction of optical axis 16 in accordance with the rotation of rotating lens barrel 215.

Figure 9:
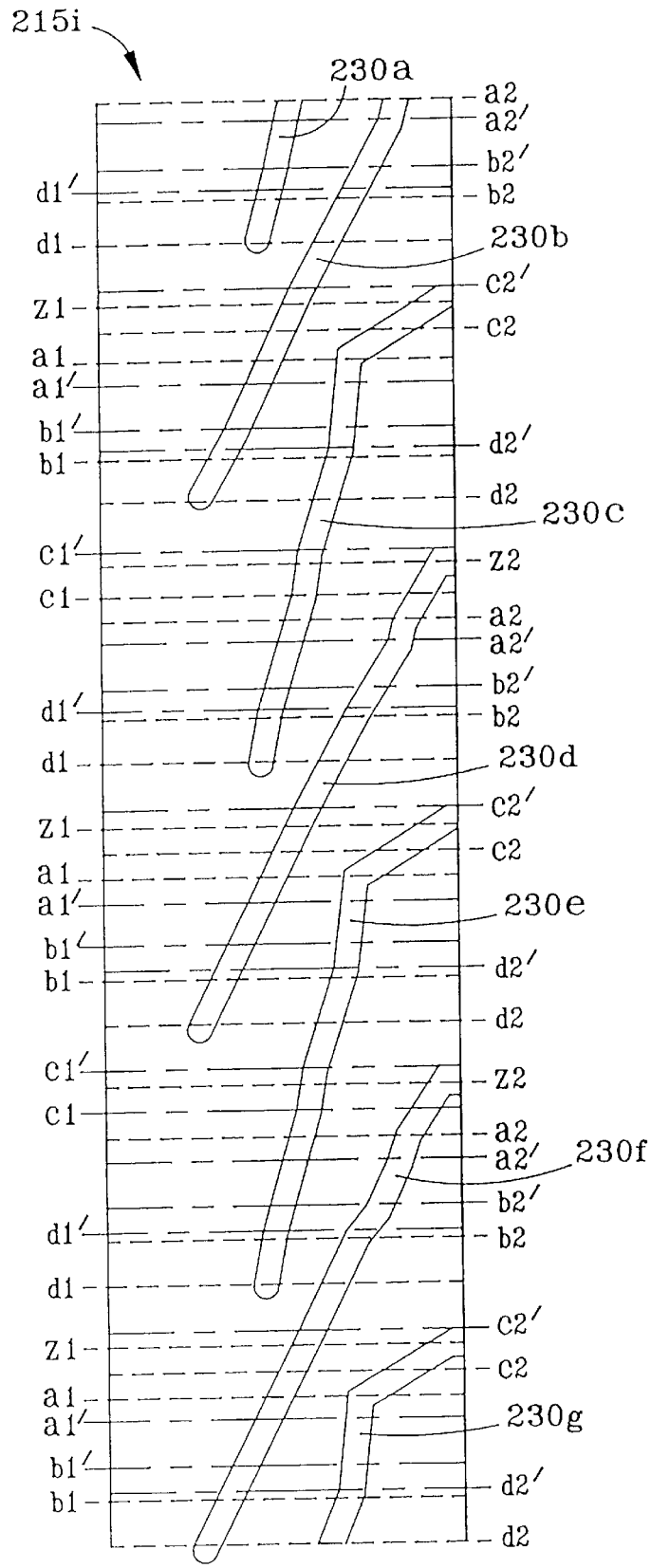
FIG. 9 is a simplified diagram of a portion of the interior wall of the second lens barrel shown in FIG. 8.

FIG. 9 is a simplified diagram of a portion of the interior surface 215i of lens barrel 215 of FIGS. 8a–8c, and shows cam grooves 230a–230g which guide second lens holder 212 and third lens holder 219 along optical axis 16. In FIG. 9, cam groove 230e is the groove along which follower pins 218 ride. Cam groove 230f represents the groove for follower pins 220. Lens group G2 is guided in the direction of optical axis 16 by cam groove 230e. Also, Z1 represents the storage state position, and a1–d1 corresponded to the respective lens positional states a–d of lens group G2. The parameter Z2 represents the storage state position and a2–d2 correspond to the respective lens positional states a–d of lens group G3.

Figure 10:
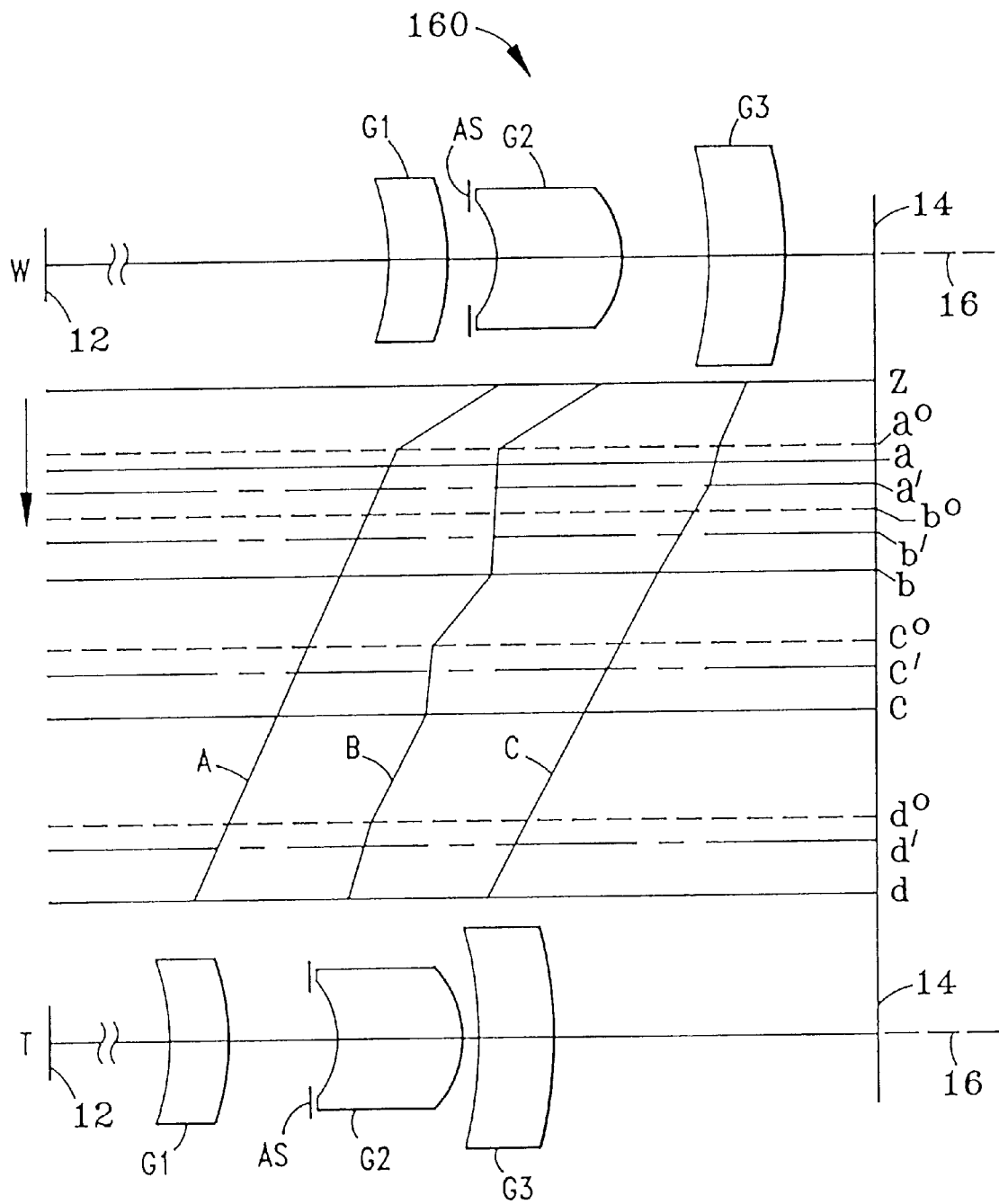
FIG. 10 is a schematic optical diagram of the lens groups comprising a three-group zoom lens of the present invention, as shown in FIG. 7, wherein lines A, B and C indicate lens motion of the lens groups from the extreme wide-angle positional state (W) to the extreme telephoto positional state (T), and the parameters a–d and a'–d' represent the positional states for focus at an infinite distance and short distance, respectively, and a0–d0 represent reference positional states.

FIG. 10 shows the directions of motion in three-group zoom lens 160 (see FIG. 7) which is retained by a zoom lens barrel (not shown) in another preferred embodiment of the present invention. The positional relationships are shown for lens groups G1 through G3 in the extreme wide-angle positional state W and in the extreme telephoto positional state T. The direction of motion of the lens group G1 is indicated by A, the direction of motion of lens group G2 is indicated by B, and the direction of motion of lens group G3 is indicated by C. The parameter "Z" corresponds to the storage state and "a"–"d" and "a'"–"d'" are the same as discussed above with respect to the previous preferred embodiments.

In changing the positional state (i.e., in changing focal length), zoom lens 160 is first positioned at one of the positional reference states a0 through d0. Next, when carrying out short-distance focusing, the lens barrel (not shown) is made to rotate in the direction of lens positional states a'–d' from positional reference states a0 through d0. Accordingly, in this third preferred embodiment, zoom lens 160 moves from positional reference states a0–d0 to lens positional states a–d even when focused on an object at an infinite distance.

Figure 11:
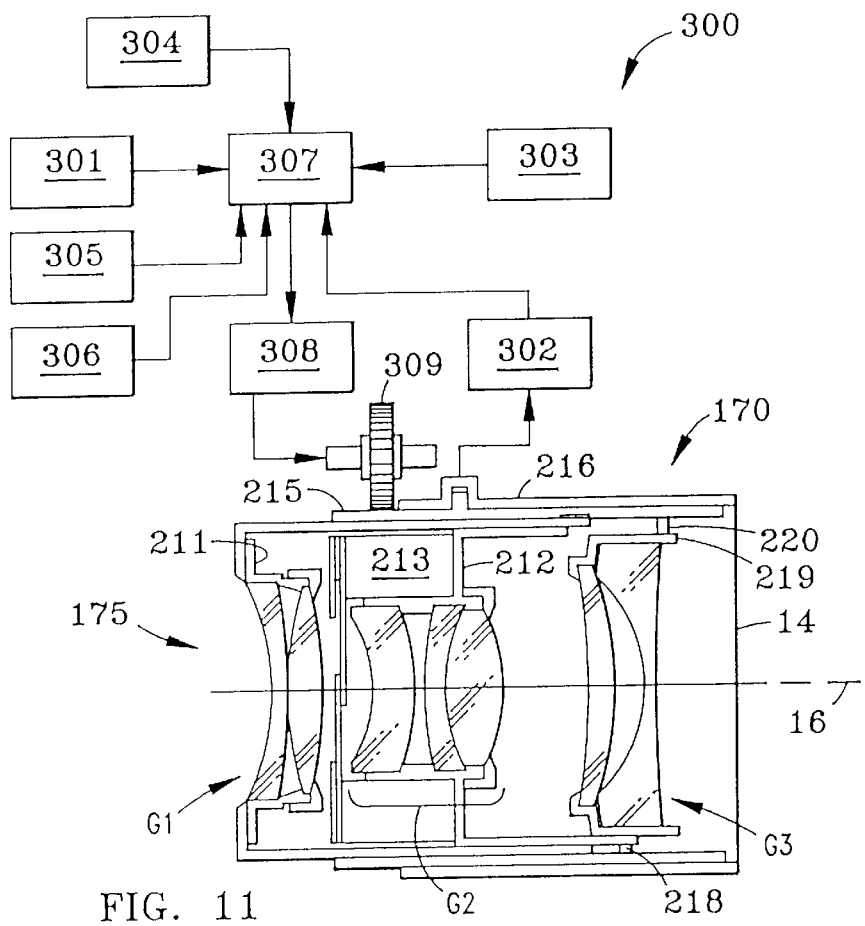
FIG. 11 shows the zoom lens system of FIGS. 8a–8c combined with a zoom lens control system.
Figure 12:
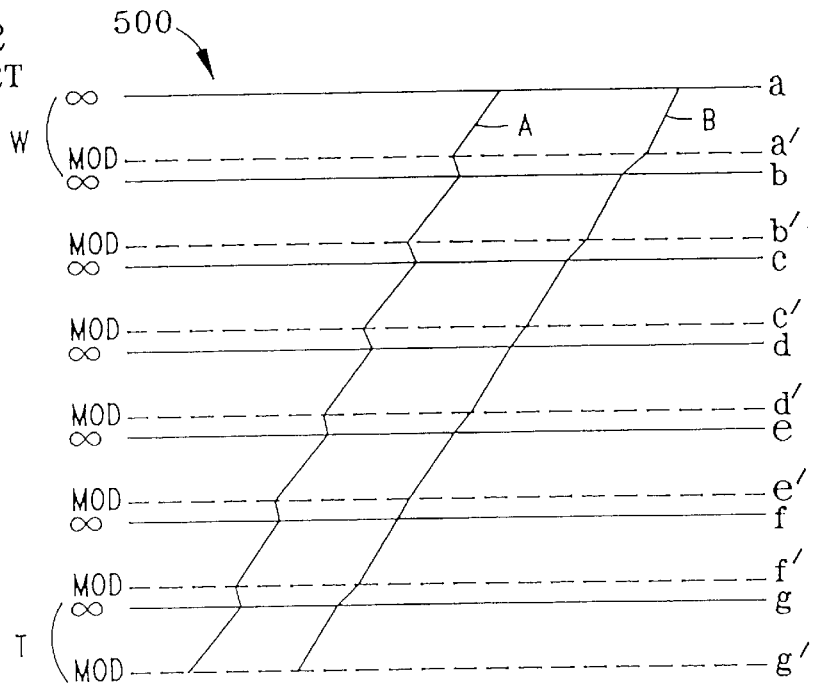
FIG. 12 is a schematic optical diagram of the lens group motions in a prior art zoom lens system which includes a two group zoom lens, wherein lines A and B indicates lens motion of the lens groups from the extreme wide-angle positional state (W) to the extreme telephoto positional state (T), and the parameters a–g and a'–g' represent the positional states for focus at an infinite distance and short distance, respectively.

FIG. 11 shows zoom lens system 170 (which includes zoom lens 175) combined with a control system 300. In FIG. 11, a zooming actuation unit 301 is provided for detecting a positional state change initiated by the operator. A lens position detection unit 302 is also provided for detecting the amount of rotation of lens barrel 215 from a given positional reference state. A range measurement unit 303 is provided for detecting the location of the photographic subject (object). A release button 304 is also provided for detecting shutter actuation (i.e., the taking of a picture) by the operator. Moreover, a magnification drive quantity storage unit 306 and focusing drive factor storage unit 305 store prescribed values. A controller 307 controls the movement of zoom lens barrel 215, a motor 308 drives rotating lens barrel 215, and a gear 309 mated with a threaded surface (not shown) on the outside position of lens barrel 215 delivers the driving force from motor 308 to lens barrel 215.

Actuation of zooming actuation unit 301 causes controller 307, based on lens position information output from lens position detection unit 302, to obtain from magnification drive quantity storage unit 305 the amount of travel required to achieve a particular positional reference state, and to deliver the appropriate drive quantity (i.e., instruction to move a given distance) to motor 308. Actuation of release button 304 causes controller 307, based on lens position information output from lens position detection unit 302, to obtain the appropriate focusing drive factor from focusing drive factor storage unit 306, and to calculate the appropriate drive quantity based on photographic subject location information output from range measurement unit 303. The appropriate drive quantity (i.e., instruction to move a given distance) is then delivered to motor 308.

Zoom Lenses for the Zoom Lens System of the Present Invention

Several zoom lens barrel embodiments and characteristics for the zoom lens system of the present invention were discussed above in connection with several different types of zoom lenses. These zoom lenses are now discussed in more detail, and Working Examples of these zoom lenses are set forth in the Tables below.

Figure 13:
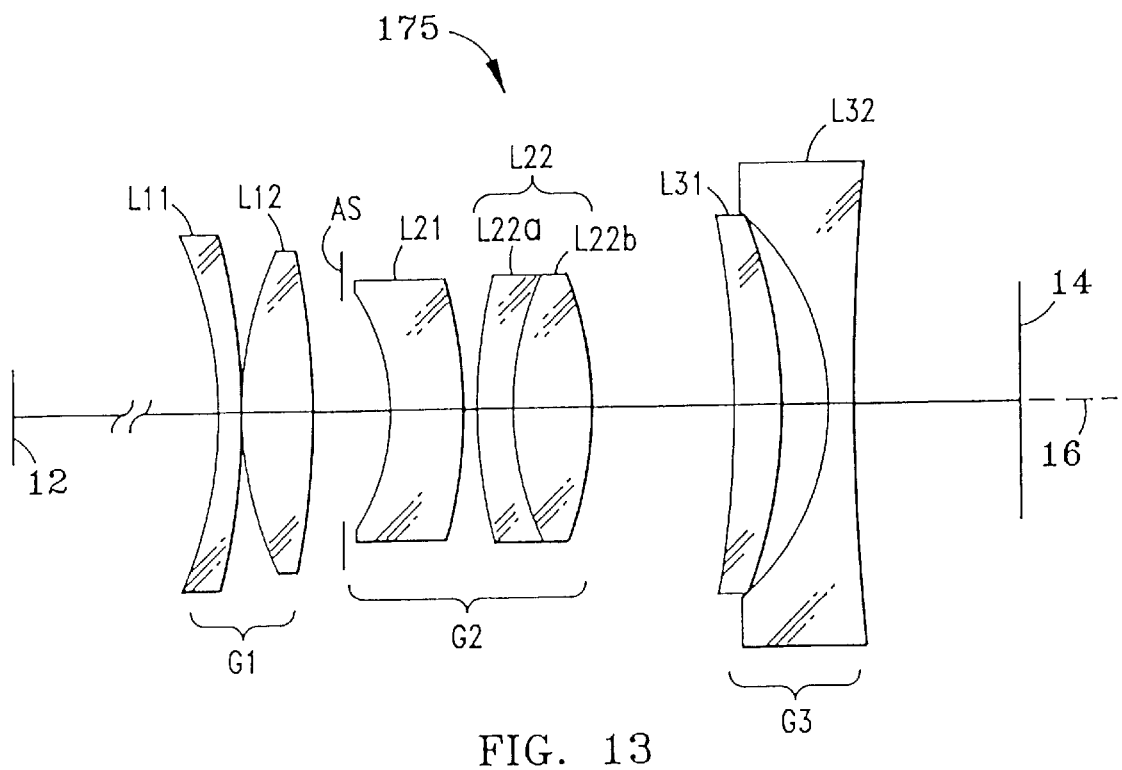
FIG. 13 is an optical diagram of Working Example 2 and Working Example 3, and is a preferred embodiment for a three-group zoom lens for the zoom lens system of the present invention.

Referring now to FIG. 13, zoom lens 175, which is a specific example of the generic three group zoom lens 20 shown in FIG. 2, includes a lens group G1 comprising a negative meniscus lens element L11 having an objectwise concave surface, and a biconvex lens element L12. Zoom lens 175 further includes a lens group G2 comprising a negative meniscus lens element L21 having an objectwise concave surface, and a cemented positive lens L22 having an objectwise convex contact service (i.e., interface) and which comprises a negative meniscus lens element L22a having an objectwise convex service and a biconvex lens element L22b. Lenses L21 and L22 can be considered lens "subgroups", each comprising one or more lens elements. Zoom lens 175 further includes a lens group G3 comprising a positive meniscus lens element L31 having an objectwise concave surface, and a negative meniscus lens element L32 having an objectwise concave surface. An aperture stop AS is located immediately objectwise of lens element L21 and moves together with lens group G2 when the positional state of zoom lens 175 changes. As shown in FIG. 2, lens groups G1–G3 are all axially movable along optical axis 16. When zoom lens 175 is adjusted from the extreme wide-angle positional state to the extreme telephoto positional state (see FIG. 2) the distance between lens group G1 and G2 increases, and the distance between lens groups G2 and G3 decreases.

Aperture stop AS is located between lens groups G1 and G2. If it were placed at the image side of lens group G2, it would be difficult to correct coma produced at the periphery of image plane 14. This is due to off-axis light rays passing through lens element (subgroup) L21 of lens group G2 being removed from optical axis 16 when zoom lens 175 is in the extreme wide-angle positional state.

Next, with continuing reference to FIG. 13, the specific functions of the lens groups in zoom lens 175 are described. Lens group G1, having positive refractive power, converges light rays passing therethrough. This convergence is particularly strong when zoom lens 175 is in the extreme telephoto positional state. It is desirable that lens group G1 comprise a negative subgroup (L11) arranged nearest object plane 12 and a positive subgroup (L12) arranged nearest image plane 14 to correct for positive distortion in the extreme wide-angle positional state.

Because aperture stop AS is arranged immediately objectwise of lens group G2, there is little difference in the location at which on-axis light rays and off-axis light rays pass through lens group G2. Accordingly, lens group G2 primarily corrects on-axis aberrations. Lens group G3 enlarges the image formed by lens groups G1 and G2. This enlargement (i.e., lateral magnification) increases in accordance with the change in the positional state of zoom lens 175 from the extreme wide-angle positional state to the extreme telephoto positional state because distance between lens group G2 and lens group G3 decreases.

In the extreme wide-angle positional state, there is independent correction for on-axis aberrations and off-axis aberrations as a result of the shortening of the back-focus distance, which causes the light rays passing through lens group G3 to recede from optical axis 16. Because the height at which off-axis light ray pass through the lens group G3 is closer to optical axis 16 as the back-focus distance is lengthened as all three lens groups move toward object plane 12 when zooming from the extreme wide-angle positional state to the extreme telephoto positional state, the accompanying variation in off-axis aberrations is readily controlled. However, making the back-focus distance too short in the extreme wide-angle positional state increases the likelihood of shadows being projected onto image plane 14 from foreign material adhering to the most-imagewise lens surface of lens group G3. Also, a short back focal distance requires a large lens diameter to ensure that a sufficient amount of light reaches the periphery of the image field. Thus, an appropriate back-focus distance must be employed.

In the present invention, introduction of an aspheric surface at the most imagewise lens surface of lens group G2 makes it possible to achieve a zoom lens which is small in size and that has a large aperture in the extreme telephoto positional state. This allows for correcting coma produced at the periphery of the image plane when the zoom lens is in the extreme wide-angle positional state. The farther the most imagewise lens surface of lens group G2 is from aperture stop AS, the farther the off-axis light rays passing therethrough will be from optical axis 16. Accordingly, introducing an aspheric surface at this lens surface also permits independent correction of off-axis aberrations and on-axis aberrations.

Zoom Lens Design Conditions

There are several design conditions which are preferably satisfied by the zoom lenses retained in the zoom lens barrels, discussed above, to meet the goals of achieving a compact, low-cost zoom lens system. These design conditions are set forth immediately below.

In a preferred embodiment, the zoom lenses of the present invention satisfy the design condition $$0.1 < (f_a \cdot |f_b|)^{1/2} f_t < 1.0. \tag{1}$$

Condition (1) defines the appropriate ranges for the focal lengths of the most imagewise negative lens group and the lens groups located objectwise of this negative lens group, when the zoom lens is in the extreme telephoto positional state. Here, $f_a$ is the combined focal length of all of the lens groups located objectwise of the aforesaid negative lens group, when in the extreme telephoto positional state, $f_b$ is the focal length of the negative lens group, and $f_t$ is the zoom lens focal length in the extreme telephoto positional state. If the upper limit of condition (1) is exceeded, it will be difficult to move the negative lens group toward the image during short-distance focusing. Conversely, below the lower limit of condition (1), the lateral magnification of the negative lens group will be too large, dramatically increasing the need for accuracy in positioning the lenses of the negative lens group, and causing a marked deterioration in imaging performance as a function of lens-positioning precision.

To achieve a zoom lens system which is small in size, it is preferable that the focal lengths of the negative lines group and the lens groups located objectwise thereof be made small. Thus, in a preferred embodiment of the present invention, the upper limit of condition (1) is set to 0.5.

In another preferred embodiment of the present invention, the zoom lens barrel of the present invention is furnished with a zoom lens satisfying the design condition $$0.35 < D2A/f_w < 0.55 \tag{2}$$

wherein D2A is the distance along optical axis 16 from aperture stop AS to the most imagewise lens surface in lens group G2, and $f_w$ is the zoom lens focal length in the extreme wide-angle positional state. Condition (2) defines a suitable lens thickness for lens group G2 which allows for attaining a wide-field angle and a large aperture, while maintaining a high level of imaging performance.

Below the lower limit of condition (2), off-axis light beams passing through lens group G3 will be too far from optical axis 16 in the extreme wide-angle positional state. Consequently there will be a deterioration in imaging performance due to coeccentricity produced at the time of manufacture.

Conversely, above the upper limit of condition (2), when aperture stop AS is arranged objectwise of lens group G2, off-axis light rays passing through lens group G3 when the zoom lens is in the extreme wide-angle positional state will be too far from optical axis 16, leading to an undesirable increase in lens diameter.

In another preferred embodiment of the present invention, to obtain an adequate back-focus distance in the extreme wide-angle positional state, lens group G2 comprises a negative subgroup L21 and a positive subgroup L22, the latter being arrange imagewise of the former (see, e.g., FIG. 13). In addition, it is preferred that a negative lens element be placed most objectwise nearest to the negative subgroup, and that a positive lens element be placed most imagewise of the positive subgroup. These lenses should respectively satisfy the following design conditions:

$$-0.60 < (RN1-RN2)/(RN1+RN2) < -0.05 \quad (3)$$

$$0.2 < (RP1+RP2)/(RP1-RP2) < 0.7 \quad (4)$$

wherein RN1 is the radius of curvature of the objectwise surface of the negative lens element, RN2 is the radius of curvature of the imagewise surface of the negative lens element, RP1 is the radius of curvature of the objectwise surface of the positive lens element, and RP2 is the radius of curvature of the imagewise surface of the positive lens element.

Below the lower limit of condition (3), off-axis light rays passing through positive subgroup L22 are too far removed from optical axis 16. Thus, it is difficult to correct the variation in coma that accompanies a change in the field angle.

Conversely, above the upper limit of the condition (3), it is difficult to obtain an adequate back-focus distance in the extreme wide-angle positional state.

Below the lower limit of condition (4), it is difficult to correct coma produced at the periphery of the image plane when the lens is in the extreme wide-angle positional state.

Conversely, above the upper limit of condition (4), a large deterioration in imaging performance due to coeccentricity between negative subgroup L21 and the positive subgroup L22 produced at the time of manufacture makes the goal of a low cost lens having high imaging performance difficult to achieve.

To ensure a suitable back-focus distance in the extreme wide-angle positional state and to reduce the size of the lens diameter, it is preferable that the upper limit of conditional expression (3) be made −0.15. Also, to improve on-axis imaging performance, it is preferred that the lower limit of condition (3) be made −0.50.

Moreover, to satisfactorily control variations in off-axis aberrations accompanying a change in the positional state of the lens, it is desirable that the upper limit of condition (4) be made 0.6. Also, to more satisfactorily correct for negative distortion produced in the extreme wide-angle positional state, it is preferred that the lower limit of condition (4) be made 0.3.

To control deterioration in imaging performance occurring as a result of coeccentricity among lenses elements and to achieve reduction in cost, in a further preferred embodiment of the present invention, it is desirable that the zoom lens of the present invention satisfy the design condition $$0.25 < f_2/(|f_2N| + f_2P) < 0.50 \quad (5)$$

wherein $f_2$ is the overall focal length of lens group G2, $f_2N$ is the focal length of negative ubgroup L21 in lens group G2, and $f_2P$ is the focal length of positive subgroup L22 in lens roup G2. Condition (5) defines suitable focal lengths of negative subgroup L21 and positive subgroup L22 which make up lens group G2.

If the upper limit of condition (5) is exceeded, the focal lengths of negative subgroup L21 and the positive subgroup L22 will be too short, increasing the likelihood of poor imaging performance as a result of coeccentricity. Conversely, for values below the lower limit, it will be difficult to obtain an adequate back-focus distance in the extreme wide-angle positional state.

In a further preferred embodiment of the present invention, it is desirable that the zoom lens satisfy at least one of the design conditions.

$$0.30 < |f_3|/(f_w \cdot f_t)^{1/2} < 0.45 \quad (6)$$

$$0.17 < D2/f_w < 0.35 \quad (7)$$

wherein $f_3$ is the focal length of lens group G3, ft is the focal length of the zoom lens in the extreme telephoto positional state and D2 is the thickness of lens group G2 measured along optical axis 16. Design conditions (6) and (7) are for striking a good balance between small size and a high degree of imaging performance.

Above the upper limit of condition (6), the refractive power lens group G3 will be too weak, leading to an increase the diameter of the lens group G3. Conversely, below the lower limit, the refractive power of lens group G3 will be too strong, making it difficult to correct positive distortion produced in the extreme wide-angle positional state.

Above the upper limit of condition (7), off-axis light rays passing through the lens group(s) removed from aperture stop AS will be too far from the optical axis. Thus, it will be difficult to achieve a small lens diameter. Conversely, below the lower limit, the refractive power of the respective lenses making up lens group G2 will be too strong. Thus, it will be difficult to correct variations in off-axis aberrations produced when the positional state of the lens is changed.

In another preferred embodiment of the zoom lens of the present invention, to simultaneously attain both a high zoom ratio and high-quality imaging performance, it is desirable that the zoom lens satisfy at least one of the design conditions $$v3 > 50 \quad (8)$$

$$0.15 < n4N - n4P \quad (9)$$

$$v4N < 45 \quad (10)$$

wherein v3 is the Abbe number of the most objectwise negative lens in lens group G2, n4N is the refractive index at the D-line of the negative lens element making up the cemented lens in lens group G2, n4P is the refractive index at the D-line of the positive lens element making up the cemented lens in lens group G2, and v4N is the Abbe number of the negative lens element making up the cemented lens in lens group G2.

Condition (8) defines the Abbe number of the negative lens element that is among the lens elements making up lens group G2. Below the lower limit of design condition (8), there is too much variation in coma produced at the periphery of the image plane as a function of wavelength in the extreme wide-angle positional state.

Conditions (9) and (10) define the difference in indices of refraction and the difference in Abbe numbers, respectively, of the lens elements making up the cemented lens in lens group G2. Below the lower limit of condition (9), it is difficult to correct coma produced in the extreme wide-angle positional state. Above the upper limit of condition (10), it is difficult to correct variations in axial chromatic aberration produced when the positional state of the zoom lens changes from the extreme wide-angle positional state to the extreme telephoto positional state.

In the present invention, it is desirable to achieve a small lens diameter in lens group G3. Thus, another preferred embodiment, the zoom lens of the present invention satisfies the design condition $$0.75 < DA/\beta 3_w \cdot f_w) < 0.95 \quad (11)$$

wherein DA is the distance along optical axis 18 from aperture stop AS to image plane 16 in the extreme wide-angle positional state, and $\beta 3_w$ is the lateral magnification of lens group G3 in the extreme wide-angle positional state.

Above the upper limit of conditional expression (11), off-axis light rays passing through lens group G3 in the extreme wide-angle positional state will be too far removed from optical axis 16, preventing attainment of a small lens diameter. Conversely, below the lower limit, independent correction of on-axis aberrations and off-axis aberrations will be difficult in the extreme wide-angle positional state.

In addition to the preferred design conditions set forth above, there are several other desirable attributes for the zoom lenses of the present invention. For example, it is preferable, to ensure an adequate back-focus distance in the extreme wide-angle positional state, that the negative lens in subgroup L21 have a strongly concave objectwise surface. Here, if a material that tends to produce high-order spherical aberration, such as high-dispersion glass, is used for the negative lens element, then the degree to which spherical aberration is corrected will vary greatly with wavelength.

Also, it is important to correct for chromatic aberration produced by each of the lens groups separately However, when low-dispersion glass used for the negative lens, it is difficult to correct chromatic aberration produced by lens group G2. To address this problem, and to obtain good imaging performance at any positional state, it is preferred to correct chromatic aberration by using a positive cemented lens in subgroup L22.

In addition, to control deterioration in imaging performance due to coeccentricity between the positive cemented lens and the convex lens while maintaining small lens thickness of lens group G2, it is desirable, as indicated by condition (4), to reduce the radius of curvature of the imagewise lens surface of the positive lens element in positive subgroup L22.

Further, to ensure that the zoom lens of the present invention comprises a small number of lens elements, it is desirable that an aspheric surface be introduced at a lens surface other than the lens surface in the lens group farthest from the aperture stop. In particular, to provide effective correction of off-axis aberrations in the extreme wide-angle positional state, it is preferred that lens group G3 comprise a positive lens element and a negative lens element, and that the objectwise lens surface of the positive lens element be aspheric.

Moreover, in the zoom lenses of the present invention, independent movement of aperture stop AS and the lens group G2 when the positional state of the lens is changed allows alteration of the height of off-axis light rays passing through lens group G2. This increases the degree of freedom that can be exercised to correct aberrations. On the other hand, this tends to increase the complexity of the lens barrel structure. Accordingly, when using the zoom lenses of the present invention as a photographic lens for a lens-shutter-type camera, it is preferable that aperture stop AS and the lens group G2 move together when the positional state of the lens changes. This allows for simplification of the lens barrel structure and of reduction of the size of the camera overall.

Trying to maintain a constant aperture stop diameter and constant F-number as the lens changes its positional state increases the number of constraints present in the optical design. Thus, in the present invention, it is preferable that the aperture stop diameter increase as the positional state of the lens changes from the extreme wide-angle positional state to the extreme telephoto positional state.

In lens-shutter-type cameras, it is common for the same component to serve the functions of both the aperture stop and the lens shutter, as mentioned above. Also the shape of the aperture need not be circular. Because F-number is typically determined as a function of focal length and the cross-sectional area of the light rays incident on the lens, the present invention may have a non-circular aperture.

In addition, it is desirable to prevent blurring of the image due to unsteadiness in grip or the like which is apt to occur with zoom lenses that have a high zoom ratio. It is possible to make the zoom lens resistant to the effects of vibration by incorporating a vibration detection system, which detects small amounts of lens motion. A drive system in the lens that makes all or part of one of the lens groups eccentric (i.e., decentered or tilted with respect to the optical axis) in response to the output of the vibration detection system, corrects for blurring by shifting the image to counter the image shift caused by vibration.

Working Examples

Design values for working examples of the present invention are set forth in the Tables below. In the design tables set forth below, F represents the focal length, FNO represents the F-number, $2\omega$ represents the angular field of view, n represents the refractive index at the D-line ($\lambda$=587.6 nm), and Bf is the back focus distance.

The aberration plots for spherical aberration, astigmatism, distortion, and coma for Working Examples 4–9 are set forth in FIGS. 15A–15D, 17A–17D, 19A–19D, 21A–21D, 23A–23H, 25A–25H, 27A–27H, 29A–29H. In the aberration plots for spherical aberration (FIGS. 15A(I)–29A(I)), the solid line indicates spherical aberration, and the dash lines indicates the sine condition. In the aberration plots for astigmatism (FIGS. 15A(II)–29A(II)), the solid line indicates the sagittal image plane, and the dash line indicates the meridional image plane. In the aberration plots for coma (FIGS. 15A(IV)–29A(IV)), Y is the image height and A represents the angle of incidence. Also, aspheric surfaces in the several embodiments are as indicated by the formula $$x = cy^2/\{1+(1-\kappa c^2 y^2)^{1/2}\} + C_4 y^4 + \ldots + C_{10} y^{10}$$

where y is height from the optical axis, x is the amount of sag, c is curvature, $\kappa$ is the conic constant, and $C_4$, $C_6$, ... $C_{10}$ are the aspheric coefficients.

Working Example 1

Zoom lens 150 of FIG. 6, described above, represents Working Example 1. Tables 1a–1d, below, list the design values.

TABLE 1a

DESIGN TABLE

| f | 30.90 | 41.39 | 50.65 | 59.16 | 67.92 | 82.38 |
|---|---|---|---|---|---|---|
| FNO | 4.00 | 5.36 | 6.56 | 7.66 | 8.79 | 10.66 |
| $2\omega$ | 56.070 | 44.154 | 37.044 | 32.172 | 28.288 | 23.532° |

| S | r | d | n | v |
|---|---|---|---|---|
| 1 | −54.3647 | 1.00 | 1.77520 | 27.53 |
| 2 | −244.1037 | 0.80 | 1.0 | |
| 3 | 24.0722 | 1.50 | 1.58518 | 30.24 |
| 4 | 20.0351 | 2.80 | 1.0 | |
| 5 | 59.3499 | 5.00 | 1.48749 | 70.45 |
| 6 | −9.8674 | 1.00 | 1.0 | |
| 7 | 0.0000 | (D7) | 1.0 | |
| 8 | −46.4513 | 3.00 | 1.58518 | 30.24 |
| 9 | −19.1470 | 3.10 | 1.0 | |
| 10 | −8.8305 | 1.00 | 1.78590 | 43.93 |
| 11 | −47.9595 | (Bf) | 1.0 | |

TABLE 1b

ASPHERIC COEFFICIENTS

| S3 | $\kappa$ = 1.0000 | $C_4 = -2.17730 \times 10^{-4}$ | $C_6 = -2.96510 \times 10^{-6}$ |
|---|---|---|---|

TABLE 1b-continued

ASPHERIC COEFFICIENTS

| /// | $C_8 = -2.67780 \times 10^{-8}$ | $C_{10} = +8.53970 \times 10^{-13}$ | |
|---|---|---|---|
| S8 | $\kappa = 1.0000$ | $C_4 = +8.62470 \times 10^{-4}$ | $C_6 = +2.33470 \times 10^{-6}$ |
| /// | $C_8 = -4.71990 \times 10^{-8}$ | $C_{10} = +6.11920 \times 10^{-10}$ | |

TABLE 1c

TABLE OF VARIABLE DISTANCES

FOCUSED ON OBJECT AT ∞

| Lens Position | a | b | c | d | e | f |
|---|---|---|---|---|---|---|
| f | 30.9000 | 41.3912 | 50.6476 | 59.1623 | 67.9160 | 82.3809 |
| Angular displacement of 2$^{nd}$ lens group cylinder | 0.000 | 25.750 | 31.813 | 49.875 | 68.250 | 99.750 |
| Travel of 1$^{st}$ lens group | 0.0000 | 6.0000 | 12.5000 | 19.0000 | 26.0000 | 38.0000 |
| Travel of 2$^{nd}$ lens group | 0.0000 | 9.5049 | 17.8917 | 25.6059 | 33.5368 | 46.6414 |
| D7 | 10.8800 | 7.3750 | 5.4883 | 4.2741 | 3.3432 | 2.2385 |
| Bf | 8.2498 | 17.7549 | 26.1413 | 33.8556 | 41.7865 | 54.8918 |

SHORT-DISTANCE (1 m) FOCUS

| Lens Position | a' | b' | c' | d' | e' | f' |
|---|---|---|---|---|---|---|
| Angular displacement of 2$^{nd}$ lens group cylinder | 13.125 | 28.875 | 45.938 | 63.000 | 81.375 | 86.625 |
| Travel of 1$^{st}$ lens group | 5.0000 | 11.0000 | 17.5000 | 24.0000 | 31.0000 | 33.0000 |
| Travel of 2$^{nd}$ lens group | 7.3870 | 16.0362 | 23.2780 | 30.7369 | 38.5070 | 40.6922 |

Note that extreme wide-angle state "a" is taken as the zero-point for measurement of angular displacement and travel.

TABLE 1d

DESIGN CONDITION VALUES:

$f_a = +1.7040$
$f_b = -19.6756$
(1) $(f_a \cdot |f_b|)^{1/2}/f_t = 0.251$

Working Example 2

Zoom lens 160 of FIG. 13, described above, represents Working Example 2. Tables 2a–2d, below, list the design values.

TABLE 2a

DESIGN TABLE

| f | 23.10 | 28.00 | 35.00 | 43.65 |
|---|---|---|---|---|
| FNO | 3.70 | 3.70 | 3.70 | 3.70 |
| 2ω | 75.18 | 62.91 | 51.52 | 42.23° |
| Aperture Diameter | 6.20 | 7.20 | 8.67 | 10.40 |

| S | r | d | n | ν |
|---|---|---|---|---|
| 1 | −17.9278 | 0.900 | 1.83400 | 37.35 |

TABLE 2a-continued

DESIGN TABLE

| 2 | −31.4473 | 0.100 | 1.0 | |
| 3 | 18.1450 | 3.050 | 1.48749 | 70.45 |
| 4 | −27.4423 | (D4) | 1.0 | |
| 5 | 0.0000 | 2.494 | 1.0 | (aperture stop) |
| 6 | −10.3613 | 3.000 | 1.62041 | 60.35 |
| 7 | −20.9447 | 0.750 | 1.0 | |
| 8 | 30.5367 | 1.500 | 1.80518 | 25.46 |
| 9 | 14.5636 | 3.800 | 1.69680 | 55.48 |
| 10 | −14.3256 | (D10) | 1.0 | |
| 11 | −28.9565 | 2.000 | 1.80518 | 25.46 |
| 12 | −23.0685 | 2.250 | 1.0 | |
| 13 | −10.7370 | 0.900 | 1.69680 | 55.48 |
| 14 | 133.4647 | (Bf) | 1.0 | |

TABLE 2b

ASPHERIC COEFFICIENTS

| S10 | $\kappa = +3.5603$ | $C_4 = +1.78012 \times 10^{-4}$ | $C_6 = +6.82210 \times 10^{-7}$ |
|---|---|---|---|
| /// | $C_8 = +3.37043 \times 10^{-10}$ | $C_{10} = +8.14521 \times 10^{-11}$ | |
| S11 | $\kappa = +3.7882$ | $C_4 = +1.06766 \times 10^{-4}$ | $C_6 = +1.96526 \times 10^{-7}$ |
| /// | $C_8 = -1.98577 \times 10^{-9}$ | $C_{10} = +4.28900 \times 10^{-11}$ | |

TABLE 2c

TABLE OF VARIABLE DISTANCES

FOCUSED ON OBJECT AT ∞

| Lens Position | a | b | c | d |
|---|---|---|---|---|
| f | 23.1000 | 28.0000 | 35.0000 | 43.6500 |
| Angular displacement of lens barrel | 0.000 | 11.3133 | 26.7759 | 46.3860 |
| Travel of 1$^{st}$ group | 0.0000 | 3.7711 | 8.9253 | 15.4620 |
| Travel of 2$^{nd}$ group | 0.0000 | 1.9089 | 5.7135 | 11.1720 |
| Travel of 3$^{rd}$ group | 0.0000 | 3.7991 | 9.5199 | 16.5816 |
| D4 | 1.2009 | 3.0630 | 4.4126 | 5.4909 |
| D9 | 6.5334 | 4.6433 | 2.7270 | 1.1237 |
| Bf | 6.4276 | 10.2266 | 15.9475 | 23.0092 |

SHORT-DISTANCE (0.8 m) FOCUS

| Lens Position | a' | b' | c' | d' |
|---|---|---|---|---|
| Angular displacement of lens barrel | 2.4000 | 7.7133 | 21.9759 | 40.3860 |
| Travel of 1$^{st}$ group | 0.8000 | 2.5711 | 7.3253 | 13.4620 |
| Travel of 2$^{nd}$ group | 0.4302 | 1.3788 | 4.9942 | 9.8370 |
| Travel of 3$^{rd}$ group | 0.2919 | 2.1920 | 7.8321 | 14.3283 |

Note that extreme wide-angle state "a" is taken as the zero-point for measurement of angular displacement and travel.

TABLE 2d

DESIGN CONDITION VALUES:

$f_a = 17.5164$
$f_b = -15.8792$
(1) $(f_a \cdot |f_b|)^{1/2}/f_t = 0.382$

Working Example 3

Zoom lens 160 of FIG. 13, described above and set forth in Working Example 2 also represents Working Example 3, except that the positional states of the lens differ from those in Working Example 2. Table 3, below, lists the position reference state for this Working Example.

TABLE 3

TABLE OF VARIABLE DISTANCES POSITIONAL REFERENCE STATES

| Positional State | a0 | b0 | c0 | d0 |
|---|---|---|---|---|
| f | 23.1000 | 28.0000 | 35.0000 | 43.6500 |
| Angular displacement of lens bariel | −2.2446 | 5.5365 | 19.6017 | 38.1561 |
| Travel of 1$^{st}$ group | −0.7482 | 1.8455 | 6.5339 | 12.7187 |
| Travel of 2$^{nd}$ group | −0.4033 | 1.0649 | 4.6364 | 7.3684 |
| Travel of 3$^{rd}$ group | −0.2737 | 1.2176 | 7.0126 | 13.5230 |
| D4 | 0.8560 | 1.9814 | 3.0984 | 4.5512 |
| D9 | 6.4437 | 6.3806 | 4.1571 | 2.3787 |
| Bf | 6.1539 | 7.6266 | 13.4402 | 19.9506 |

Working Example 4

Figure 14:
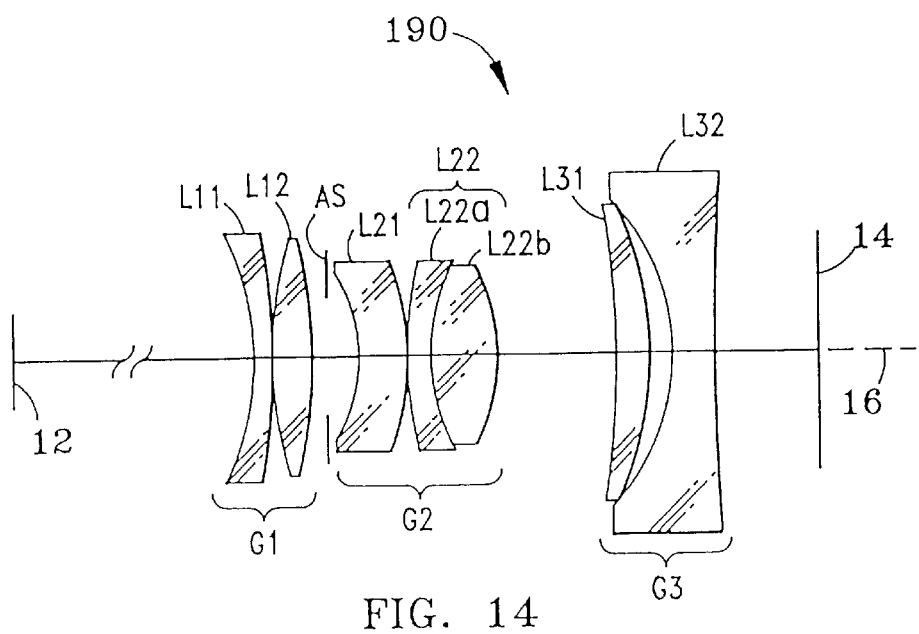
FIG. 14 is an optical diagram of Working Example 4 and is a preferred embodiment for a three-group zoom lens for the zoom lens system of the present invention.

Zoom lens 190 of FIG. 14 represents Working Example 4 and comprises from object plane 12 to image plane 14 along optical axis 16 a lens group G1 comprising a negative meniscus lens element L11 having an objectwise concave surface and biconvex lens element L12, a lens group G2 comprising a negative meniscus lens element L21 having an objectwise concave surface, and a cemented positive lens L22 comprising a negative meniscus lens element L22$a$ having an objectwise convex surface, and a biconvex lens element L22$b$. Also included is a lens group G3 comprising a positive meniscus lens element L31 having an objectwise concave surface and biconcave lens element L32. An aperture stop AS is located immediately objectwise of lens L21 and moves in together with lens group G2 when the positional state of zoom lens 190 changes.

Design values for zoom lens 190 are presented in Tables 4a–4d, below.

TABLE 4a

DESIGN TABLE

| f | 28.84 | 34.96 | 43.70 | 54.50 |
|---|---|---|---|---|
| FNO | 3.60 | 3.60 | 3.60 | 3.80 |
| 2ω | 75.59 | 63.31 | 51.88 | 42.54 |
| Aperture Diameter | 8.03 | 9.31 | 11.16 | 12.76 |

| S | r | d | n | ν |
|---|---|---|---|---|
| 1 | −21.9551 | 1.124 | 1.80610 | 33.27 |
| 2 | −55.8857 | 0.125 | 1.0 | |
| 3 | 29.2848 | 2.996 | 1.65160 | 58.44 |
| 4 | −34.8723 | (D4) | 1.0 | |
| 5 | 0.0000 | 2.497 | 1.0 | (aperture stop) |
| 6 | −12.3396 | 3.746 | 1.62041 | 60.35 |
| 7 | −25.6332 | 0.125 | 1.0 | |
| 8 | 35.2613 | 1.873 | 1.80610 | 33.27 |
| 9 | 14.0210 | 4.994 | 1.66547 | 55.18 |
| 10 | −16.2504 | (D10) | 1.0 | |
| 11 | −35.3452 | 2.497 | 1.68893 | 31.16 |
| 12 | −28.0856 | 2.747 | 1.0 | |
| 13 | −13.6763 | 1.124 | 1.76935 | 53.31 |
| 14 | 311.8111 | (Bf) | 1.0 | |

TABLE 4b

ASPHERIC COEFFICIENTS

| S10 | κ = 2.4876 | $C_4$ = +9.94177 × 10$^{-5}$ | $C_6$ = +4.55246 × 10$^{-7}$ |
|---|---|---|---|
| /// | $C_8$ = −3.21845 × 10$^{-9}$ | $C_{10}$ = +5.95439 × 10$^{-13}$ | |

TABLE 4b-continued

ASPHERIC COEFFICIENTS

| S11 | κ = −2.5856 | $C_4$ = +4.19305 × 10$^{-5}$ | $C_6$ = +1.01180 × 10$^{-8}$ |
|---|---|---|---|
| /// | $C_8$ = +3.50672 × 10$^{-10}$ | $C_{10}$ = +6.34925 × 10$^{-13}$ | |

TABLE 4c

TABLE OF VARIABLE DISTANCES

| f | 28.8409 | 34.9575 | 43.6967 | 54.4958 |
|---|---|---|---|---|
| D4 | 1.4982 | 3.6970 | 5.4706 | 6.9324 |
| D9 | 9.4277 | 6.9076 | 4.3696 | 2.2473 |
| BF | 7.8654 | 12.9336 | 20.3810 | 29.5356 |

TABLE 4d

DESIGN CONDITION VALUES

(2) D2A/f$_w$ = 0.459
(3) (RN1 − RN2)/(RN1 + RN2) = −0.350
(4) (RP1 + RP2)/(RP1 − RP2) = 0.369
(5) f$_2$/(|f$_2$N| + f$_2$P) = 0.422

As is clear from aberration plots in FIGS. 15A–15D, this Working Example is well-corrected for aberrations from the extreme wide-angle positional state to the extreme telephoto positional state.

Working Example 5

Figure 16:
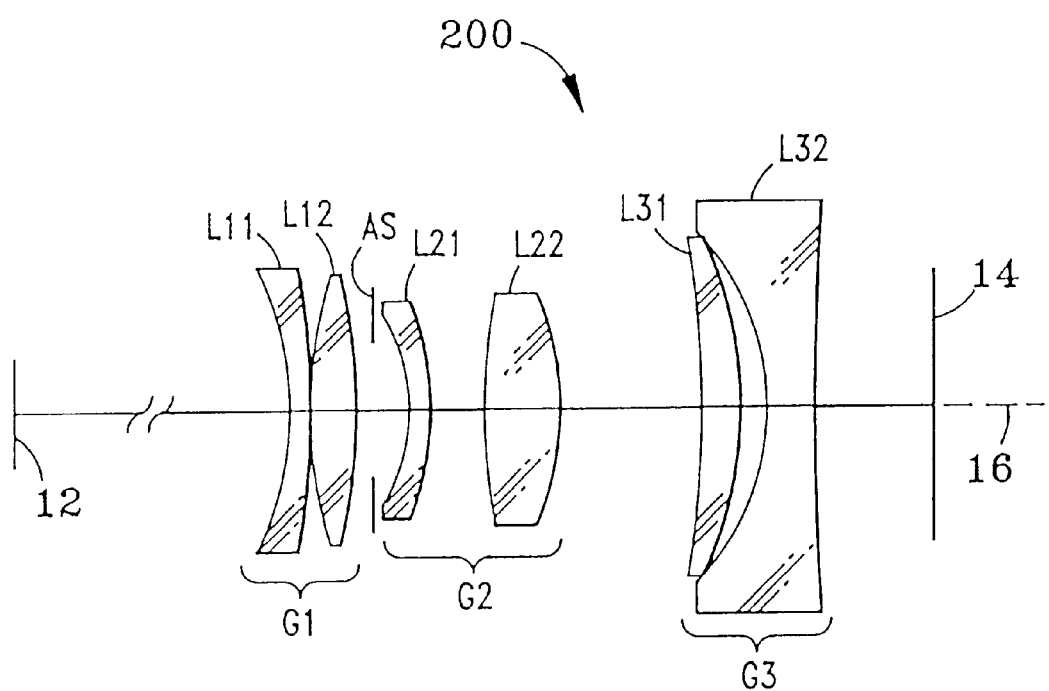
FIG. 16 is an optical diagram of Working Example 5 and is a preferred embodiment for a three-group zoom lens for the zoom lens system of the present invention.

Zoom lens 200 of FIG. 16, which has the same general configuration as zoom lens 190 of FIG. 14, except that lens L22 is a single biconvex lens element, represents Working Example 5. Tables 5a–5d, below, lists the design values.

TABLE 5a

DESIGN TABLE

| f | 28.81 | 34.92 | 43.65 | 54.44 |
|---|---|---|---|---|
| FNO | 3.60 | 3.60 | 3.60 | 3.80 |
| 2ω | 75.98 | 63.66 | 52.11 | 42.66 |
| Aperture Diameter | 8.12 | 9.46 | 11.40 | 13.04 |

| S | r | d | n | ν |
|---|---|---|---|---|
| 1 | −21.2751 | 1.121 | 1.74400 | 44.90 |
| 2 | −48.0246 | 0.125 | 1.0 | |
| 3 | 30.6483 | 2.940 | 1.49749 | 70.45 |
| 4 | −27.8946 | (D4) | 1.0 | |
| 5 | 0.0000 | 2.494 | 1.0 | (aperture stop) |
| 6 | −11.7752 | 1.122 | 1.84666 | 23.83 |
| 7 | −16.8054 | 3.740 | 1.0 | |
| 8 | 59.9733 | 4.987 | 1.69680 | 55.48 |
| 9 | −16.5312 | (D10) | 1.0 | |
| 10 | −63.9046 | 2.494 | 1.48749 | 70.45 |
| 11 | −37.0279 | 2.814 | 1.0 | |
| 12 | −14.7891 | 1.122 | 1.77250 | 49.61 |
| 13 | 144.7541 | (Bf) | 1.0 | |

TABLE 5b

ASPHERIC COEFFICIENTS

| S10 | κ = +2.1891 | $C_4$ = +9.36147 × 10$^{-5}$ | $C_6$ = +1.01251 × 10$^{-7}$ |

TABLE 5b-continued

ASPHERIC COEFFICIENTS

| | | | |
|---|---|---|---|
| /// | $C_8 = +2.46693 \times 10^{-11}$ | $C_{10} = +7.81924 \times 10^{-14}$ | |
| S11 | $\kappa = +1.2997$ | $C_4 = +4.19305 \times 10^{-5}$ | $C_6 = +1.01180 \times 10^{-8}$ |
| /// | $C_8 = +3.50672 \times 10^{-10}$ | $C_{10} = +6.34925 \times 10^{-13}$ | |

TABLE 5c

TABLE OF VARIABLE DISTANCES

| f | 28.8076 | 34.9185 | 43.6483 | 54.4362 |
|---|---|---|---|---|
| D4 | 1.4961 | 4.0516 | 6.2758 | 7.9927 |
| D9 | 9.5998 | 7.3693 | 5.1213 | 3.2416 |
| BF | 7.8552 | 12.6369 | 19.5661 | 28.1593 |

TABLE 5d

DESIGN CONDITION VALUES (2) $D2A/f_w = 0.428$
(3) $(RN1 - RN2)/(RN1 + RN2) = -0.176$
(4) $(RP1 + RP2)/(RP1 - RP2) = 0.568$
(5) $f_2/(|f_2N| + f_2P) = 0.340$

As is clear from aberrations plots in FIGS. 17A–17D, the configuration of this Working Example is well corrected for aberrations over the positional states ranging from the extreme wide-angle positional state to the extreme telephoto positional state.

Working Example 6

Figure 18:
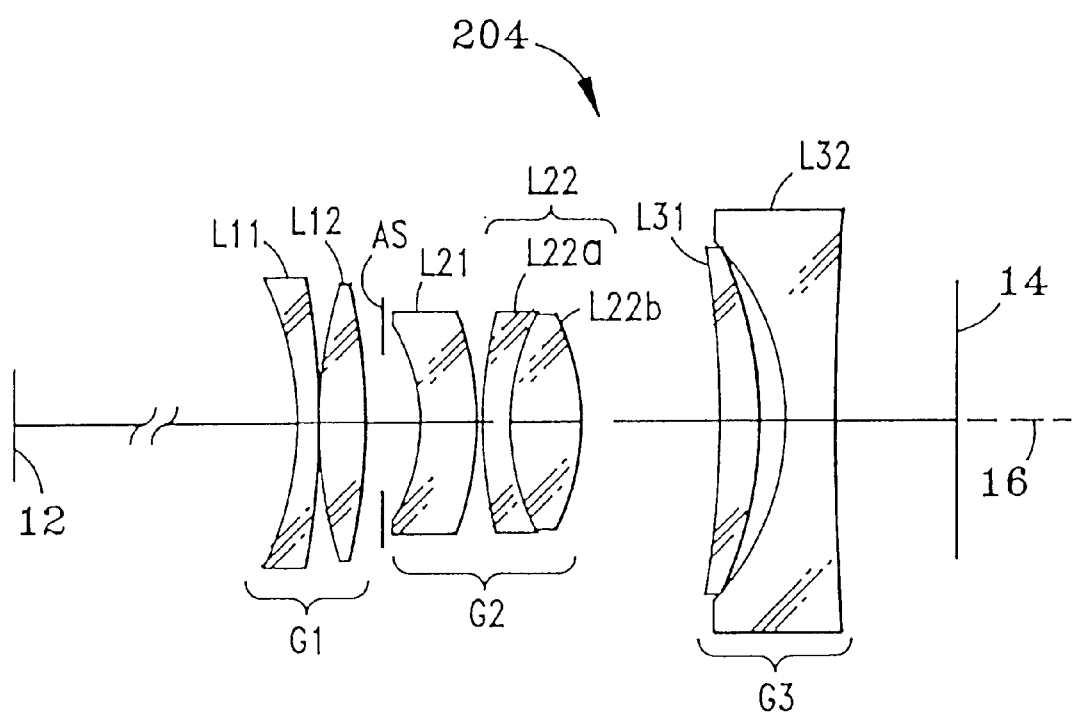
FIG. 18 is an optical diagram of Working Example 6 and is a preferred embodiment for a three-group zoom lens for the zoom lens system of the present invention.

Zoom lens 204 of FIG. 18 represents Working Example 6 and has the same general configuration as zoom lens 190 of FIG. 14. Table 6a–6d, below, list the design values.

TABLE 6a

DESIGN TABLE

| f | 28.80 | 34.91 | 43.64 | 54.42 |
|---|---|---|---|---|
| FNO | 3.70 | 3.70 | 3.70 | 3.70 |
| 2ω | 75.59 | 63.51 | 52.02 | 42.62 |
| Aperture Diameter | 7.73 | 8.98 | 10.80 | 12.97 |

| S | r | d | n | ν |
|---|---|---|---|---|
| 1 | -22.7251 | 1.122 | 1.83400 | 37.35 |
| 2 | -43.6376 | 0.125 | 1.0 | |
| 3 | 23.3116 | 3.740 | 1.48749 | 70.45 |
| 4 | -33.2582 | (D4) | 1.0 | |
| 5 | 0.0000 | 2.494 | 1.0 | (aperture stop) |
| 6 | -12.4066 | 3.740 | 1.48749 | 70.45 |
| 7 | -35.0871 | 0.436 | 1.0 | |
| 8 | 33.3344 | 1.870 | 1.80610 | 33.27 |
| 9 | 13.4682 | 4.925 | 1.69680 | 55.48 |
| 10 | -16.6331 | (D10) | 1.0 | |
| 11 | -34.8565 | 2.494 | 1.80518 | 25.46 |
| 12 | -31.6620 | 2.743 | 1.0 | |
| 13 | -13.8860 | 1.122 | 1.69680 | 55.48 |
| 14 | 193.6885 | (Bf) | 1.0 | |

TABLE 6b

ASPHERIC COEFFICIENTS

| | | | |
|---|---|---|---|
| S10 | $\kappa = +2.6993$ | $C_4 = +1.10555 \times 10^{-4}$ | $C_6 = +3.35123 \times 10^{-7}$ |
| /// | $C_8 = -2.67452 \times 10^{-10}$ | $C_{10} = +4.18290 \times 10^{-11}$ | |
| S11 | $\kappa = +0.0055$ | $C_4 = +4.70710 \times 10^{-5}$ | $C_6 = +1.43544 \times 10^{-8}$ |
| /// | $C_8 = -3.11084 \times 10^{-10}$ | $C_{10} = +3.43313 \times 10^{-12}$ | |

TABLE 6c

TABLE OF VARIABLE DISTANCES

| f | 28.8000 | 34.9095 | 43.6369 | 54.4215 |
|---|---|---|---|---|
| D4 | 1.4961 | 3.6316 | 5.4939 | 7.1302 |
| D9 | 8.6430 | 6.3995 | 4.1413 | 2.2442 |
| BF | 7.8548 | 12.7029 | 19.7281 | 28.2781 |

TABLE 6d

DESIGN CONDITION VALUES f2N = -41.6208
f2P = +18.1372
f2 = +19.6009
(1) $D2A/f_w = 0.468$
(2) $(RN1 - RN2)/(RN1 + RN2) = -0.478$
(3) $(RP1 + RP2)/(RP1 - RP2) = 0.334$
(4) $f_2/(|f_2N| + f_2P) = 0.409$

As is clear from the aberration plots in FIGS. 19A–19D, this Working Example is well-corrected for aberrations from the extreme wide-angle positional state to the extreme telephoto positional state.

Working Example 7

Figure 20:
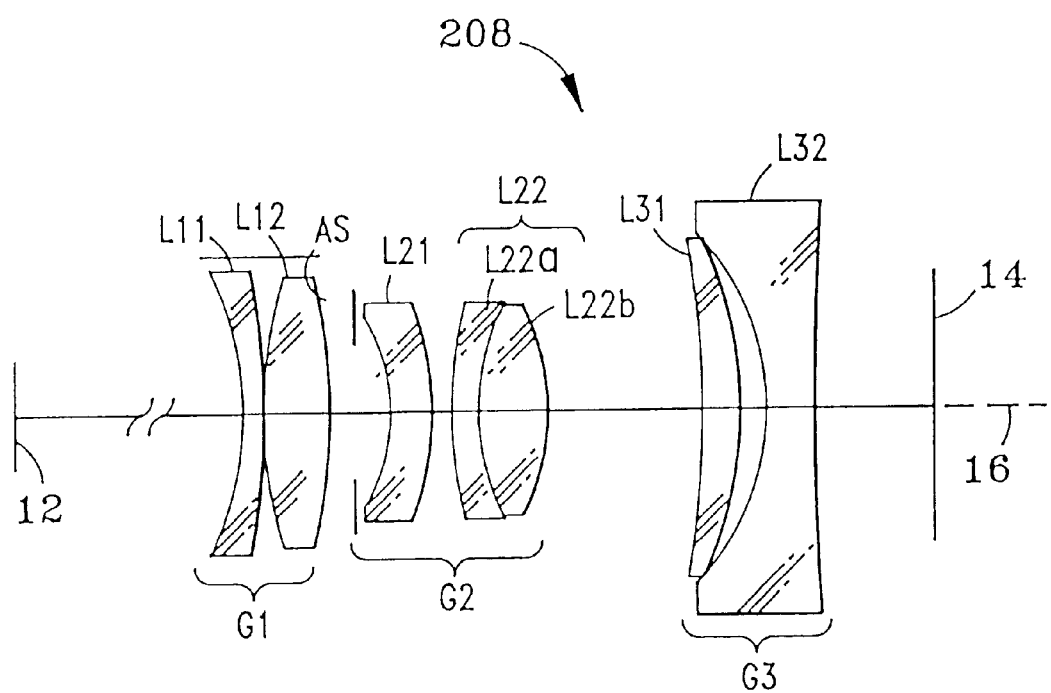
FIG. 20 is an optical diagram of Working Example 7 and is a preferred embodiment for a three-group zoom lens for the zoom lens system of the present invention.

Zoom lens 208 of FIG. 20 represents Working Example 7 and has the same general configuration as zoom lens 190 of FIG. 14. Table 7a–7d, below, lists the design values.

TABLE 7a

DESIGN TABLE

| f | 32.50 | 37.86 | 40.49 | 61.21 |
|---|---|---|---|---|
| FNO | 3.70 | 3.70 | 3.70 | 3.70 |
| 2ω | 68.61 | 59.25 | 45.54 | 38.18 |
| Aperture Diameter | 8.49 | 9.50 | 12.04 | 14.14 |

| S | r | d | n | ν |
|---|---|---|---|---|
| 1 | -25.7525 | 1.136 | 1.83400 | 37.35 |
| 2 | -45.0155 | 0.126 | 1.0 | |
| 3 | 21.8849 | 5.049 | 1.48749 | 70.45 |
| 4 | -44.1037 | (D4) | 1.0 | |
| 5 | 0.0000 | 2.524 | 1.0 | (aperture stop) |
| 6 | -15.5003 | 2.651 | 1.62041 | 60.35 |
| 7 | -33.7500 | 2.840 | 1.0 | |
| 8 | 40.4452 | 1.010 | 1.75520 | 27.53 |
| 9 | 16.4018 | 4.733 | 1.69350 | 50.77 |
| 10 | -20.9607 | (D10) | 1.0 | |
| 11 | -33.4310 | 2.524 | 1.80518 | 25.46 |
| 12 | -29.6758 | 2.777 | 1.0 | |
| 13 | -14.6741 | 1.136 | 1.65160 | 58.44 |
| 14 | 140.6212 | (Bf) | 1.0 | |

TABLE 7b

ASPHERIC COEFFICIENTS

| S10 | $\kappa = +1.2920$ | | $C_4 = +4.49480 \times 10^{-5}$ | $C_6 = +8.10133 \times 10^{-8}$ |
|---|---|---|---|---|
| /// | $C_8 = -1.19523 \times 10^{-9}$ | | $C_{10} = +4.15271 \times 10^{-12}$ | |
| S11 | $\kappa = +0.9278$ | | $C_4 = +3.48076 \times 10^{-5}$ | $C_6 = +8.51815 \times 10^{-8}$ |
| /// | $C_8 = -6.72791 \times 10^{-10}$ | | $C_{10} = +3.91672 \times 10^{-12}$ | |

TABLE 7c

TABLE OF VARIABLE DISTANCES

| f | 32.5005 | 37.8647 | 50.5864 | 61.2149 |
|---|---|---|---|---|
| D4 | 1.5146 | 3.4586 | 5.8346 | 7.0978 |
| D9 | 9.8680 | 7.7135 | 4.2220 | 2.2718 |
| BF | 8.2345 | 12.2526 | 22.1307 | 30.5145 |

TABLE 7d

DESIGN CONDITION VALUES f2N = −52.1279
f2P = +20.4644
f2 = +29.5714
(1) D2A/$f_w$ = 0.423
(2) (RN1 − RN2)/(RN1 + RN2) = −0.371
(3) (RP1 + RP2)/(RP1 − RP2) = 0.317
(4) $f_2$/(|$f_2$N| + $f_2$P) = 0.419

As is clear from the aberration plots in FIGS. 21a–21d, this working example is well corrected for aberrations from the extreme wide-angle positional state to the extreme telephoto positional state.

Working Example 8

Figure 22:
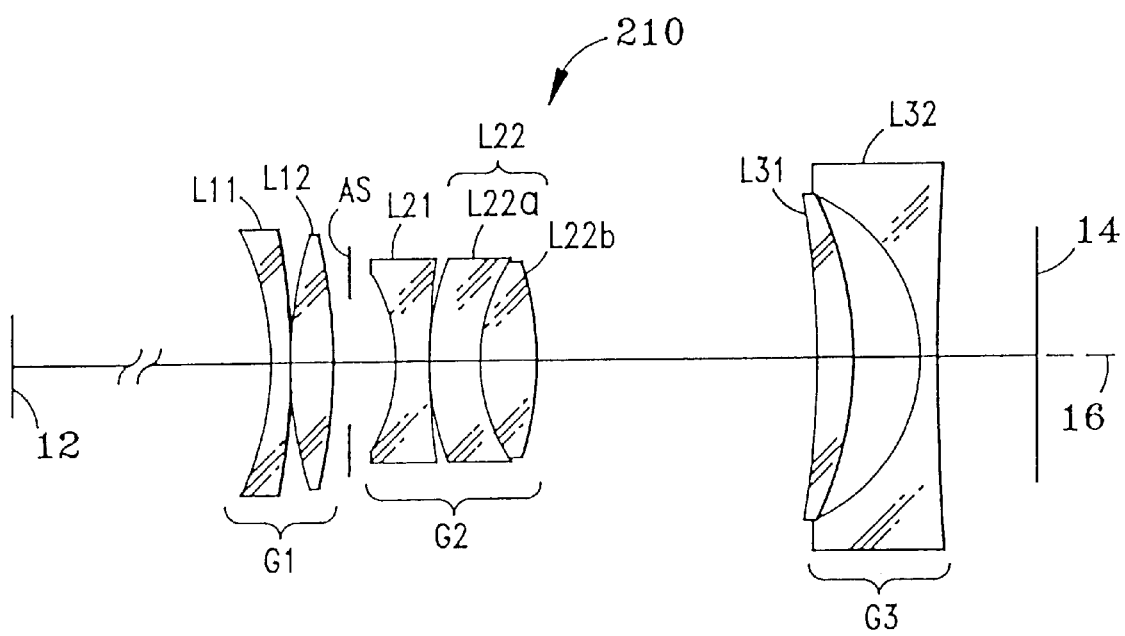
FIG. 22 is an optical diagram of Working Example 8 and is a preferred embodiment for a three-group zoom lens for the zoom lens system of the present invention.

Zoom lens 210 of FIG. 22 represents Working Example 8 and has the same general configuration as zoom lens 175 of FIG. 13, with the exception that lens element L21 is biconcave instead of positive meniscus. Tables 8a–8d, below, list the design values.

TABLE 8a

DESIGN TABLE

| f | 39.00 | 70.00 | 100.00 | 136.00 |
|---|---|---|---|---|
| FNO | 4.34 | 6.76 | 8.60 | 11.01 |
| 2ω | 55.77 | 33.14 | 23.81 | 17.77° |

| S | r | d | n | v |
|---|---|---|---|---|
| 1 | −32.6598 | 1.000 | 1.80610 | 33.27 |
| 2 | −59.9918 | 0.100 | 1.0 | |
| 3 | 39.5881 | 2.300 | 1.48749 | 70.45 |
| 4 | −49.8392 | (D4) | 1.0 | |
| 5 | 0.0000 | 2.500 | 1.0 | (aperture stop) |
| 4 | −13.1469 | 2.000 | 1.48749 | 70.45 |
| 7 | 34.1057 | 0.100 | 1.0 | |
| 8 | 14.5238 | 3.000 | 1.80450 | 39.63 |
| 9 | 8.2641 | 3.200 | 1.60602 | 57.44 |
| 10 | −14.8825 | (D10) | 1.0 | |
| 11 | −48.5641 | 2.000 | 1.82027 | 29.69 |
| 12 | −36.6651 | 3.800 | 1.0 | |
| 13 | −14.9764 | 1.000 | 1.62041 | 60.35 |
| 14 | 635.3229 | (Bf) | 1.0 | |

TABLE 8b

ASPHERIC COEFFICIENTS

| S10 | $\kappa = 0.9212$ | | $C_4 = +6.05640 \times 10^{-5}$ | $C_6 = +4.77080 \times 10^{-8}$ |
|---|---|---|---|---|
| /// | $C_8 = +4.12340 \times 10^{-9}$ | | $C_{10} = -3.95960 \times 10^{-10}$ | |
| S11 | $\kappa = -9.0000$ | | $C_4 = +1.78120 \times 10^{-5}$ | $C_6 = -6.22970 \times 10^{-8}$ |
| /// | $C_8 = +6.92360 \times 10^{-10}$ | | $C_{10} = -7.08940 \times 10^{-13}$ | |

TABLE 8c

TABLE OF VARIABLE DISTANCES

| f | 38.9997 | 69.9993 | 99.9990 | 135.9985 |
|---|---|---|---|---|
| D4 | 1.5000 | 12.1119 | 19.6406 | 23.3780 |
| D9 | 17.9270 | 8.4813 | 4.1993 | 1.3000 |
| BF | 8.0829 | 30.8947 | 50.1885 | 74.3211 |

Movement Δ 2 of second lens group during short-distance (1 m) focusing.

| f | 38.9997 | 69.9993 | 99.9990 | 135.9985 |
|---|---|---|---|---|
| D0 | 951.4911 | 927.5122 | 904.9716 | 880.0009 |
| Δ 2 | 1.0493 | 1.3188 | 1.5836 | 1.7700 |

$f_1 = 88.1932$  $f_2 = 39.4924$  $f_3 = -27.4999$  $\beta 3_w = 1.312$

TABLE 8d

DESIGN CONDITION VALUES (6) $|f_3|/(f_w \cdot f_t)^{1/2}$ = 0.378
(7) D2/$f_w$ = 0.213
(8) v3 = 70.45
(9) n4N − n4P = 0.198
(10) v4N = 39.63
(11) $DAl_w/(\beta 3_w \cdot f_w)$ = 0.852

As is clear from the aberration plots in FIGS. 23A–23H, this Working Example is well-corrected for aberrations from the extreme wide-angle positional state to the extreme telephoto positional state.

Working Example 9

Figure 24:
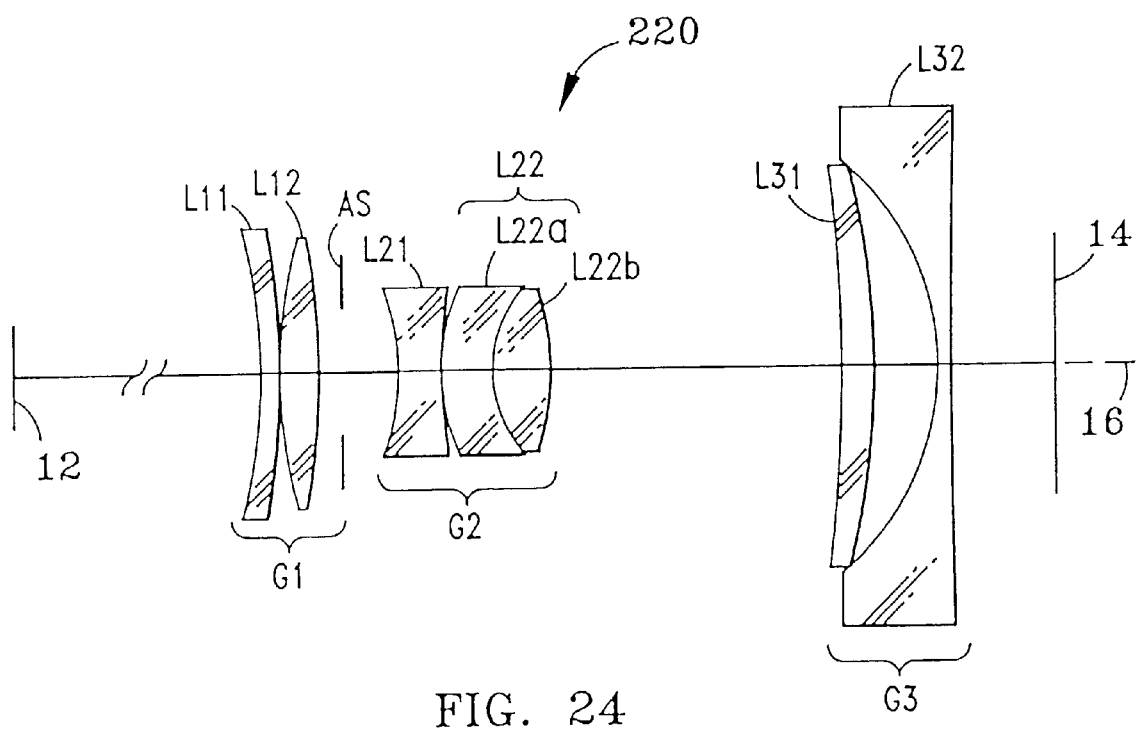
FIG. 24 is an optical diagram of Working Example 9 and is a preferred embodiment for a three-group zoom lens for the zoom lens system of the present invention.

Zoom lens 220 of FIG. 24 has the same general configuration as zoom lens 210 of FIG. 22, and represents Working Example 9. Tables 9a–9d, below, lists the design values.

TABLE 9a

DESIGN TABLE

| f | 39.00 | 70.00 | 100.00 | 136.00 |
|---|---|---|---|---|
| FNO | 4.33 | 6.68 | 8.59 | 10.99 |
| 2ω | 56.12 | 33.14 | 23.82 | 17.77° |

| S | r | d | n | v |
|---|---|---|---|---|
| 1 | −35.8631 | 1.000 | 1.80610 | 33.27 |
| 2 | −68.7903 | 0.100 | 1.0 | |
| 3 | 36.6795 | 2.200 | 1.48749 | 70.45 |
| 4 | −58.0225 | (D4) | 1.0 | |
| 5 | 0.0000 | 3.000 | 1.0 | (aperture stop) |
| 6 | −13.6114 | 2.550 | 1.48749 | 70.45 |
| 7 | 33.2098 | 0.100 | 1.0 | |
| 8 | 14.3999 | 3.000 | 1.80450 | 39.63 |
| 9 | 8.1914 | 3.300 | 1.60602 | 57.44 |
| 10 | −15.4342 | (D10) | 1.0 | |
| 11 | −55.7284 | 2.000 | 1.82027 | 29.69 |
| 12 | −43.9229 | 4.000 | 1.0 | |
| 13 | −15.5603 | 1.000 | 1.61800 | 63.38 |
| 14 | 671.4646 | (Bf) | 1.0 | |

TABLE 9b

ASPHERIC COEFFICIENTS

| S10 | $\kappa = 1.06300$ | $C_4 = +6.72630 \times 10^{-5}$ | $C_6 = -9.08840 \times 10^{-7}$ |
|---|---|---|---|
| /// | $C_8 = +6.09950 \times 10^{-8}$ | $C_{10} = -1.43980 \times 10^{-9}$ | |
| S11 | $\kappa = -3.0744$ | $C_4 = +2.27110 \times 10^{-5}$ | $C_6 = -4.83630 \times 10^{-8}$ |
| /// | $C_8 = +4.51230 \times 10^{-10}$ | $C_{10} = -2.74230 \times 10^{-13}$ | |

TABLE 9c

TABLE OF VARIABLE DISTANCES

| f | 38.9997 | 69.9994 | 99.9992 | 135.9990 |
|---|---|---|---|---|
| D4 | 1.0000 | 12.1212 | 18.9293 | 22.8092 |
| D9 | 18.0031 | 8.5086 | 4.2247 | 1.3000 |
| BF | 8.0829 | 30.8947 | 50.1885 | 74.3211 |

Movement $\Delta 2$ of second lens group during short-distance (1 m) focusing.

| f | 38.9997 | 69.9994 | 99.9992 | 135.9990 |
|---|---|---|---|---|
| D0 | 950.9159 | 926.9149 | 904.8074 | 880.0007 |
| $\Delta 2$ | 1.0604 | 1.3492 | 1.5903 | 1.6650 |

$f_1 = 88.2096$  $f_2 = 39.3418$  $f_3 = -27.4999$  $\beta 3_w = 1.306$

TABLE 9d

DESIGN CONDITION VALUES (6) $|f_3|/(f_w \cdot f_t)^{1/2} = 0.378$
(7) $D2/f_w = 0.229$
(8) $v3 = 70.45$
(9) $n4N - n4P = 0.198$
(10) $v4N = 39.63$
(11) $DAI_w/(\beta 3_w \cdot f_w) = 0.882$ As is clear from aberration plots in FIGS. 25A–25H, this Working Example is well-corrected for aberrations from the extreme wide-angle positional state to the extreme telephoto positional state.

Working Example 10

Figure 26:
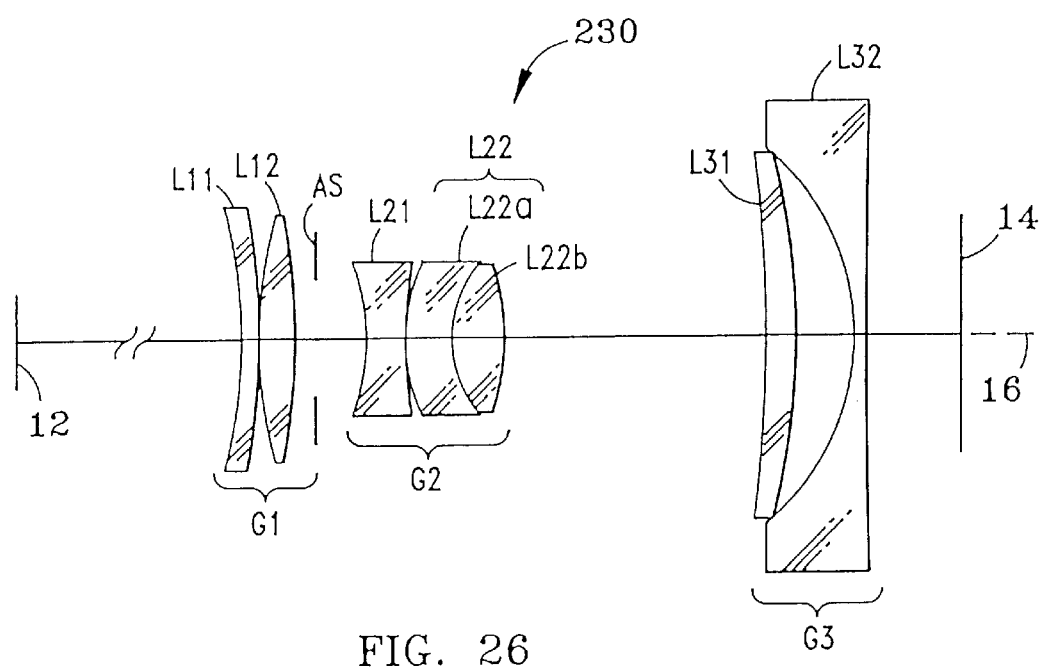
FIG. 26 is an optical diagram of Working Example 10 and is a preferred embodiment for a three-group zoom lens for the zoom lens system of the present invention.

Zoom lens 230 of FIG. 26, which has the same general configuration as zoom lens 220 of FIG. 24, represents Working Example 10. Tables 10a–10d, below, list the design values.

TABLE 10a

DESIGN TABLE

| f | 39.00 | 70.00 | 100.00 | 141.00 |
|---|---|---|---|---|
| FNO | 4.21 | 6.50 | 8.39 | 11.01 |
| 2ω | 55.77 | 33.14 | 23.82 | 17.16° |

| S | r | d | n | v |
|---|---|---|---|---|
| 1 | −38.1462 | 0.900 | 1.80610 | 33.27 |
| 2 | −71.8252 | 0.100 | 1.0 | |
| 3 | 38.0670 | 2.250 | 1.48749 | 70.45 |
| 4 | −63.4307 | (D4) | 1.0 | |
| 5 | 0.0000 | 2.000 | 1.0 | (aperture stop) |
| 6 | −13.6870 | 2.600 | 1.48749 | 70.45 |
| 7 | 39.4587 | 0.250 | 1.0 | |
| 8 | 14.9555 | 3.000 | 1.83400 | 37.35 |
| 9 | 8.6443 | 3.350 | 1.60602 | 57.44 |
| 10 | −15.4581 | (D10) | 1.0 | |
| 11 | −45.1130 | 2.050 | 1.82027 | 29.69 |

TABLE 10a-continued

DESIGN TABLE

| 12 | −34.5223 | 3.800 | 1.0 | |
|---|---|---|---|---|
| 13 | −14.8782 | 1.000 | 1.61800 | 63.38 |
| 14 | 475.6232 | (Bf) | 1.0 | |

TABLE 10b

ASPHERIC COEFFICIENTS

| S10 | $\kappa = 0.15330$ | $C_4 = +3.37741 \times 10^{-5}$ | $C_6 = -7.14968 \times 10^{-7}$ |
|---|---|---|---|
| /// | $C_8 = +4.16856 \times 10^{-8}$ | $C_{10} = -9.59376 \times 10^{-13}$ | |
| S11 | $\kappa = -9.0000$ | $C_4 = +1.46141 \times 10^{-5}$ | $C_6 = -2.41367 \times 10^{-8}$ |
| /// | $C_8 = +3.45157 \times 10^{-10}$ | $C_{10} = +4.52606 \times 10^{-13}$ | |

TABLE 10c

TABLE OF VARIABLE DISTANCES

| f | 39.0001 | 70.0004 | 100.0008 | 141.0016 |
|---|---|---|---|---|
| D4 | 2.0000 | 13.6030 | 20.8991 | 25.6110 |
| D9 | 17.9784 | 8.6935 | 4.4959 | 1.3000 |
| BF | 8.0035 | 30.1522 | 49.3249 | 75.7899 |

Movement $\Delta 2$ of second lens group during short-distance (1 m) focusing.

| f | 39.0001 | 70.0004 | 100.0008 | 141.0016 |
|---|---|---|---|---|
| D0 | 950.7181 | 926.2514 | 903.9793 | 875.9992 |
| $\Delta 2$ | 1.0381 | 1.3250 | 1.5786 | 1.8067 |

$f_1 = 91.7431$  $f_2 = 38.3275$  $f_3 = -27.2552$  $\beta 3_w = 1.313$

TABLE 10d

DESIGN CONDITION VALUES (6) $|f_3|/(f_w \cdot f_t)^{1/2} = 0.368$
(7) $D2/f_w = 0.287$
(8) $v3 = 70.45$
(9) $n4N - n4P = 0.228$
(10) $v4N = 37.35$
(11) $DAI_w/(\beta 3_w \cdot f_w) = 0.860$ As is clear from aberration plots in FIGS. 27A–27H, this Working Example is well-corrected for aberrations from the extreme wide-angle positional state to the extreme telephoto positional state.

Working Example 11

Figure 28:
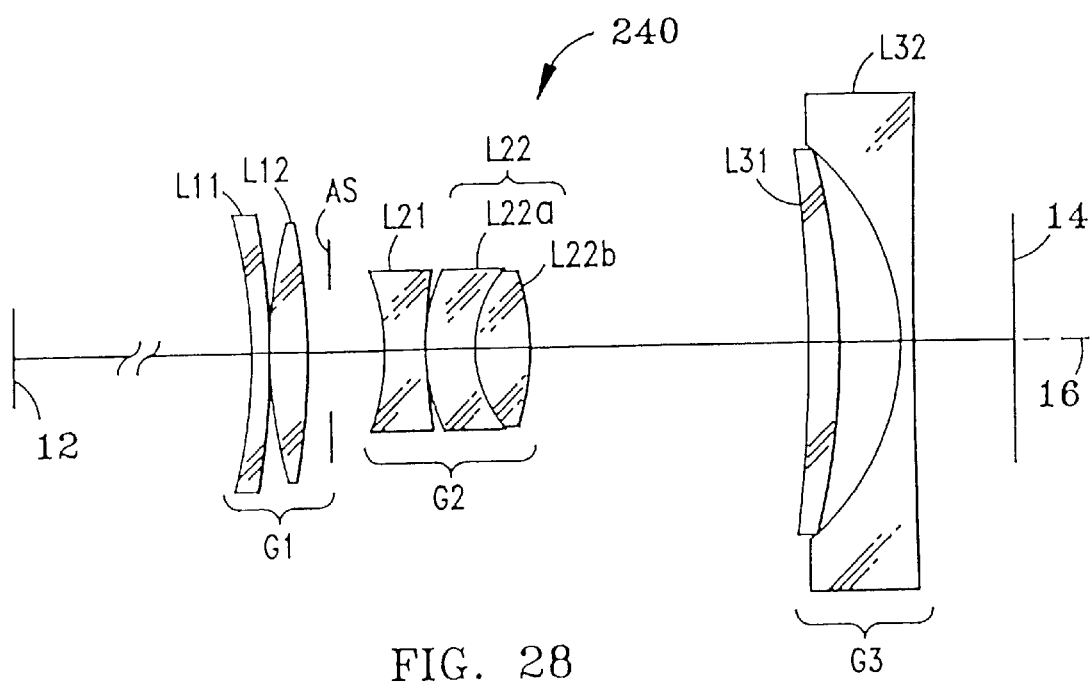
FIG. 28 is an optical diagram of Working Example 11 and is a preferred embodiment for a three-group zoom lens for the zoom lens system of the present invention.

Zoom lens 240 of FIG. 28, which has the same configuration as zoom lens 230 of FIG. 26, represents Working Example 11. Tables 11a–11d, below, list the design values.

TABLE 11a

DESIGN TABLE

| f | 39.00 | 70.00 | 100.00 | 136.00 |
|---|---|---|---|---|
| FNO | 4.36 | 6.74 | 8.77 | 10.99 |
| 2ω | 55.77 | 33.15 | 23.82 | 17.15° |

| S | r | d | n | v |
|---|---|---|---|---|
| 1 | −133.1775 | 1.000 | 1.80610 | 33.27 |
| 2 | −4463.4485 | 0.100 | 1.0 | |
| 3 | 30.0030 | 2.000 | 1.48749 | 70.45 |
| 4 | 3003.3616 | (D4) | 1.0 | |
| 5 | 0.0000 | 3.000 | 1.0 | (aperture stop) |

TABLE 11a-continued

DESIGN TABLE

| 6 | −12.7635 | 2.200 | 1.48749 | 70.45 |
|---|---|---|---|---|
| 7 | 51.5501 | 0.700 | 1.0 | |
| 8 | 16.2554 | 3.000 | 1.83400 | 37.35 |
| 9 | 9.2523 | 3.100 | 1.60602 | 57.44 |
| 10 | −14.3657 | (D10) | 1.0 | |
| 11 | −44.4282 | 2.200 | 1.58518 | 30.24 |
| 12 | −31.9350 | 3.400 | 1.0 | |
| 13 | −14.4166 | 1.000 | 1.61800 | 63.38 |
| 14 | 1430.2792 | (Bf) | 1.0 | |

TABLE 11b

ASPHERIC COEFFICIENTS

| S10 | κ = 1.14520 | $C_4 = +7.25721 \times 10^{-5}$ | $C_6 = -1.98550 \times 10^{-7}$ |
|---|---|---|---|
| /// | $C_8 = +1.94540 \times 10^{-8}$ | $C_{10} = -5.22530 \times 10^{-10}$ | |
| S11 | κ = 0.6746 | $C_4 = +4.30080 \times 10^{-5}$ | $C_6 = -1.05740 \times 10^{-7}$ |
| /// | $C_8 = +8.63540 \times 10^{-10}$ | $C_{10} = -4.17190 \times 10^{-13}$ | |

TABLE 11c

TABLE OF VARIABLE DISTANCES

| f | 39.0000 | 70.0000 | 100.0000 | 136.0000 |
|---|---|---|---|---|
| D4 | 1.0000 | 12.8034 | 19.5290 | 24.8597 |
| D9 | 16.6297 | 7.9976 | 4.0932 | 1.3000 |
| BF | 8.9947 | 30.8973 | 50.2383 | 72.1400 |

Movement Δ 2 of second lens group during short-distance (1 m) focusing.

| f | 39.0000 | 70.0000 | 100.0000 | 136.0000 |
|---|---|---|---|---|
| D0 | 951.6763 | 926.6017 | 904.4395 | 880.0027 |
| Δ 2 | 0.9550 | 1.2357 | 1.4635 | 1.7008 |

$f_1 = 91.2609$  $f_2 = 35.4782$  $f_3 = −26.4513$  $β3_w = 1.363$

TABLE 11d

DESIGN CONDITION VALUES (6) $|f_3|/(f_w \cdot f_t)^{1/2} = 0.363$
(7) $D2/f_w = 0.230$
(8) v3 = 70.45
(9) n4N − n4P = 0.228
(10) v4N = 37.35
(11) $DAI_w/(β3_w \cdot f_w) = 0.832$ As is clear from aberration plots in FIGS. 29A–29H, this Working Example is well-corrected for aberrations from the extreme wide-angle positional state to the extreme telephoto positional state.

While the present invention has been described in connection with preferred embodiments, it will be understood that it is not limited to those embodiments. On the contrary, it is intended to cover all alternatives, modifications and equivalents as may be included within the spirit and scope of the invention as defined in the appended claims.

What is claimed is:

1. A zoom lens system comprising:
   a) a zoom lens for forming a real image of an object and having a plurality of lens groups movable along an optical axis;
   b) a zoom lens barrel, housing said zoom lens, for moving said plurality of lens groups into three or more positional states, including an extreme wide-angle positional state, an extreme telephoto positional state, and an intermediate positional state located therebetween; and
   c) means for guiding said plurality of lens groups along said optical axis such that when said plurality of lens groups is in said extreme telephoto positional state, at least one of said plurality of lens groups moves toward the image, and when said plurality of lens groups is in said extreme wide-angle positional state, said at least one of said movable lens groups moves toward the object when focus is adjusted from an object at an infinite distance to an object at a short distance.

2. A zoom lens system according to claim 1, wherein said zoom lens includes a negative lens group on the most imagewise position of said zoom lens and further wherein said guiding means guides said negative lens group toward the object when said plurality of lens groups from said extreme wide-angle positional state to said extreme telephoto positional state.

3. A zoom lens system according to claim 2, wherein:
   a) in said zoom lens, all lens groups in said plurality of lens groups located objectwise of said negative lens group have a combined refractive power that is overall positive and a combined focal length $f_a$;
   b) said negative lens group has a focal length $f_b$, and the overall focal length of said zoom lens in the extreme telephoto positional state is $f_t$; and
   c) wherein the design condition $$0.1 < (f_a \cdot |f_b|)^{1/2}/f_t < 1.0$$

is satisfied.

4. A zoom lens system according to claim 1, further including a drive system for driving said plurality of lens groups along said optical axis.

5. A zoom lens system according to claim 3, wherein said means for guiding guides at least one of said lens groups in said plurality of lens groups linearly between said three or more positional states.

6. A zoom lens system according to claim 1, wherein said means for guiding guides at least one of said lens groups in said plurality of lens groups over an axial distance to achieve short-distance focus that is larger in said extreme telephoto positional state than in said extreme wide-angle positional state.

7. A zoom lens system comprising:
   (a) a zoom lens for forming an image of an object over a range of positional states, the zoom lens comprising objectwise to imagewise along an optical axis:
   i) a first lens group having positive refractive power and being movable along said optical axis;
   ii) a second lens group having positive refractive power and including a most imagewise lens element having a most imagewise surface that is aspheric, said second lens group being movable along said optical axis and separated from said first lens group by a first axial distance;
   iii) a third lens group having negative refractive power and being movable along said optical axis and separated from said second lens group by a second axial distance;
   iv) an aperture stop located between said first and second lens groups;
   b) guiding means for guiding said first, second and third lens groups, such that when said zoom lens changes from an extreme wide-angle positional state to an extreme telephoto positional state, said first, second and third lens groups move objectwise such that said first axial distance increases, and said second axial distance decreases; and c) said zoom lens satisfies the condition $$0.35 < D2A/f_w < 0.55$$

wherein D2A is the distance along said optical axis from said aperture stop to said most imagewise lens surface of said second lens group, and $f_w$ is the focal length of the zoom lens in said extreme wide-angle positional state.

8. The zoom lens system according to claim 7, wherein said aperture stop is movable along said optical axis together with said second lens group.

9. A zoom lens system according to claim 8, wherein said aperture stop is variable in size such that it has an area that is greater when said zoom lens is in said extreme telephoto positional state than when in said extreme wide-angle positional state.

10. A zoom lens system according to claim 7, wherein said second lens group includes a negative lens element having an objectwise surface with a radius of curvature RN1 and an imagewise surface with a radius of curvature RN2, and located immediately adjacent said aperture stop on the image side, and a positive lens element, having an objectwise surface with a radius of curvature RP1 and an imagewise surface with a radius of curvature RP2, as the most imagewise lens element of said second lens group, and wherein said zoom lens satisfies at least one of the design conditions $$-0.60 < (RN1-RN2)/(RN1+RN2) < -0.05$$

$$0.2 < (RP1+RP2)/(RP1-RP2) < 0.7.$$

11. A zoom lens system according to claim 10, wherein said second lens group comprises a negative subgroup which includes said negative lens element, and a positive subgroup which includes said positive lens element, and which satisfies the design condition $$0.25 < f_2/(f_2N|+f_2P) < 0.50$$

wherein $f_2$ is the focal length of said second lens group, $f_2N$ is the focal length of said negative subgroup, and $f_2P$ is the focal length of said positive subgroup.

12. A zoom lens system according to claim 11, wherein said negative subgroup includes a negative meniscus lens element having an objectwise concave surface, and said positive subgroup includes a cemented positive lens comprising, objectwise to imagewise, a negative meniscus lens element having an objectwise convex surface, and a biconvex lens element.

13. A zoom lens system comprising:

(a) a zoom lens for forming an image of an object over a range of positional states, the zoom lens comprising objectwise to imagewise along an optical axis:

i) a first lens group having positive refractive power and being movable along said optical axis;

ii) a second lens group having positive refractive power and being movable along said optical axis, said second lens group including, objectwise to imagewise, a biconcave lens element, and a cemented positive lens, said second lens group being separated from said first lens group by a first axial distance;

iii) a third lens group having negative refractive power and being movable along said optical axis and separated from said second lens group by a second axial distance; and b) guiding means for guiding said first, second and third lens groups, such that when said zoom lens changes from an extreme wide-angle positional state to an extreme telephoto positional state, said first, second and third lens groups move objectwise such that said first axial distance increases, and said second axial distance decreases.

14. A zoom lens system according to claim 13, further comprising an aperture stop between said first and second lens groups.

15. A zoom lens system according to claim 14, wherein said third lens group has a focal length $f_3$, and said second lens group has an axial length D2, and which satisfies at least one of the design conditions $$0.30 < |f_3|/(f_w \cdot f_t)^{1/2} < 0.45,$$

$$0.17 < D2/f_w < 0.35.$$

16. A zoom lens system according to claim 14, wherein:

a) said biconcave lens element of said second lens group has an Abbe number v3;

b) said cemented positive lens includes a negative lens element having a D-line wavelength refractive index of n4N and an Abbe number v4N;

c) said cemented positive lens includes a positive lens element having a D-line wavelength refractive index of n4P; and d) wherein the zoom lens satisfies at least one of the design conditions $$v3<50$$

$$0.15<n4N-n4P,$$

$$v4N<45.$$

17. A zoom lens system according to claim 16, wherein in said extreme wide angle positional state said aperture stop and said image plane have an axial separation $DAI_W$ and said third lens group has a lateral magnification $\beta3_W$, and which satisfies the design condition $$0.75 < DAI_W/(\beta3_W \cdot f_w) < 0.95.$$

* * * * *